US012641588B2

(12) United States Patent
Rastegardoost et al.

(10) Patent No.: US 12,641,588 B2
(45) Date of Patent: May 26, 2026

(54) PRIORITIES IN MULTIPLE DOWNLINK AND UPLINK SCHEDULING

(71) Applicant: Ofinno, LLC, Reston, VA (US)

(72) Inventors: Nazanin Rastegardoost, McLean, VA (US); Yunjung Yi, Vienna, VA (US); Esmael Hejazi Dinan, McLean, VA (US); Ali Cagatay Cirik, Chantilly, VA (US); Hua Zhou, Vienna, VA (US); Hyoungsuk Jeon, Centreville, VA (US); Kai Xu, Great Falls, VA (US)

(73) Assignee: Ofinno, LLC, Reston, VA (US)

( * ) Notice: Subject to any disclaimer, the term of this patent is extended or adjusted under 35 U.S.C. 154(b) by 496 days.

(21) Appl. No.: 18/118,554

(22) Filed: Mar. 7, 2023

(65) Prior Publication Data

US 2023/0209530 A1    Jun. 29, 2023

Related U.S. Application Data

(63) Continuation of application No. PCT/US2022/022859, filed on Mar. 31, 2022.
(Continued)

(51) Int. Cl.
*H04W 72/12*      (2023.01)
*H04W 72/232*     (2023.01)
*H04W 72/563*     (2023.01)

(52) U.S. Cl.
CPC ......... *H04W 72/12* (2013.01); *H04W 72/232* (2023.01); *H04W 72/563* (2023.01)

(58) Field of Classification Search
CPC .. H04W 72/12; H04W 72/563; H04W 72/232
See application file for complete search history.

(56) References Cited

U.S. PATENT DOCUMENTS

2018/0368137 A1* 12/2018 Yin ...................... H04L 5/0091
2020/0059327 A1*  2/2020 Kini ..................... H04L 1/1812
(Continued)

FOREIGN PATENT DOCUMENTS

WO      2019/028844 A1    2/2019
WO      2020/146247 A2    7/2020
(Continued)

OTHER PUBLICATIONS

3GPP TS 38.212 V16.3.0 (Sep. 2020); Technical Specification; 3rd Generation Partnership Project; Technical Specification Group Radio Access Network; NR; Multiplexing and channel coding; (Release 16).
(Continued)

*Primary Examiner* — Jael M Ulysse
(74) *Attorney, Agent, or Firm* — Matthew Fernandez; Kavon Nasabzadeh; Jacob L. Mangan

(57)          ABSTRACT
A wireless device receives a downlink control information (DCI) indicating time resources for receiving a plurality of physical downlink control channels (PDSCHs) across slots in a cell, a first priority index, and a first physical uplink control channel (PUCCH) for transmitting feedback information of PDSCHs associated with the first priority index. One or more first PDSCHs are determined from the plurality of PDSCHs as being associated with the first priority index, based on a time resource of each PDSCH of the plurality of PDSCHs. The wireless device may also transmit first feedback information of the one or more first PDSCHs via the first PUCCH of the first priority index, based on the first priority index.

20 Claims, 29 Drawing Sheets

Related U.S. Application Data

(60) Provisional application No. 63/168,323, filed on Mar. 31, 2021.

(56) References Cited

U.S. PATENT DOCUMENTS

| | | | | |
|---|---|---|---|---|
| 2020/0213981 A1* | 7/2020 | Park | | H04W 72/23 |
| 2020/0296701 A1* | 9/2020 | Park | | H04L 1/1887 |
| 2020/0313793 A1* | 10/2020 | Jung | | H04L 1/0013 |
| 2021/0014026 A1* | 1/2021 | Papasakellariou | | H04L 1/1861 |
| 2021/0021382 A1* | 1/2021 | Chien | | H04L 1/1861 |
| 2021/0050955 A1* | 2/2021 | Park | | H04B 7/0456 |
| 2021/0144688 A1* | 5/2021 | Lin | | H04W 72/23 |
| 2021/0218504 A1* | 7/2021 | Wang | | H04L 1/1812 |
| 2021/0266941 A1* | 8/2021 | Park | | H04L 1/1861 |
| 2021/0391955 A1* | 12/2021 | He | | H04L 5/0053 |
| 2022/0039029 A1* | 2/2022 | Zhang | | H04W 52/281 |
| 2022/0053489 A1* | 2/2022 | Li | | H04L 5/0094 |
| 2022/0095337 A1* | 3/2022 | Wang | | H04L 5/0053 |
| 2022/0116153 A1* | 4/2022 | Hosseini | | H04L 5/0053 |
| 2022/0116962 A1* | 4/2022 | Zhang | | H04L 5/0044 |
| 2022/0124775 A1* | 4/2022 | Zhang | | H04L 1/1854 |
| 2022/0159692 A1* | 5/2022 | Lee | | H04W 72/23 |
| 2022/0166591 A1* | 5/2022 | Aiba | | H04L 1/1864 |
| 2022/0167383 A1* | 5/2022 | Aiba | | H04L 5/0053 |
| 2022/0183032 A1* | 6/2022 | Papasakellariou | | H04L 1/1861 |
| 2022/0191839 A1* | 6/2022 | Ying | | H04W 72/56 |
| 2022/0191882 A1* | 6/2022 | Lee | | H04W 72/56 |
| 2022/0201726 A1* | 6/2022 | Papasakellariou | | |
| | | | | H04W 72/1273 |
| 2022/0225400 A1* | 7/2022 | Wong | | H04W 72/0446 |
| 2022/0232598 A1* | 7/2022 | Lee | | H04W 72/569 |
| 2022/0232610 A1* | 7/2022 | Lee | | H04L 1/1812 |
| 2022/0248410 A1* | 8/2022 | Lee | | H04L 5/0064 |
| 2022/0264563 A1* | 8/2022 | Choi | | H04L 5/0055 |
| 2022/0279538 A1* | 9/2022 | Jung | | H04W 72/542 |
| 2022/0377717 A1* | 11/2022 | Park | | H04W 72/23 |
| 2022/0386331 A1* | 12/2022 | Aiba | | H04L 1/1854 |
| 2022/0399960 A1* | 12/2022 | Bae | | H04W 72/1273 |
| 2023/0036564 A1* | 2/2023 | Bae | | H04L 1/1861 |
| 2023/0041764 A1* | 2/2023 | Park | | H04W 72/0446 |
| 2023/0105294 A1* | 4/2023 | Park | | H04L 1/1819 |
| | | | | 370/329 |
| 2023/0125598 A1* | 4/2023 | Sun | | H04W 72/543 |
| | | | | 370/329 |
| 2023/0179342 A1* | 6/2023 | Zhang | | H04W 72/232 |
| | | | | 370/329 |
| 2023/0262449 A1* | 8/2023 | Ying | | H04L 5/0044 |
| | | | | 370/329 |
| 2023/0283415 A1* | 9/2023 | Blankenship | | H04L 1/1854 |
| | | | | 370/329 |
| 2023/0299891 A1* | 9/2023 | Kittichokechai | | H04L 1/1896 |
| | | | | 370/336 |
| 2023/0379961 A1* | 11/2023 | Muruganathan | | H04L 1/1671 |
| 2023/0389066 A1* | 11/2023 | Yang | | H04L 1/1887 |
| 2023/0422243 A1* | 12/2023 | Takeda | | H04W 72/56 |
| 2024/0259163 A1* | 8/2024 | Singh | | H04L 1/1861 |
| 2024/0313927 A1* | 9/2024 | Yoshioka | | H04W 28/04 |
| 2025/0261203 A1* | 8/2025 | Jung | | H04W 72/569 |

FOREIGN PATENT DOCUMENTS

| | | |
|---|---|---|
| WO | 2020/192741 A1 | 10/2020 |
| WO | 2021/006715 A1 | 1/2021 |
| WO | 2022/024033 A1 | 2/2022 |

OTHER PUBLICATIONS

3GPP TS 38.213 V16.4.0 (Dec. 2020); Technical Specification; 3rd Generation Partnership Project; Technical Specification Group Radio Access Network; NR; Physical layer procedures for control; (Release 16).

3GPP TS 38.214 V16.4.0 (Dec. 2020); Technical Specification; 3rd Generation Partnership Project; Technical Specification Group Radio Access Network; NR; Physical layer procedures for data; (Release 16).

3GPP TS 38.321 V16.3.0 (Dec. 2020); Technical Specification; 3rd Generation Partnership Project; Technical Specification Group Radio Access Network; NR; Medium Access Control (MAC) protocol specification; (Release 16).

3GPP TS 38.331 V16.3.1 (Jan. 2021); Technical Specification; 3rd Generation Partnership Project; Technical Specification Group Radio Access Network; NR; Radio Resource Control (RRC) protocol specification; (Release 16).

3GPP TR 38.808 V2.0.0 (Mar. 2021); Technical Report; 3rd Generation Partnership Project; Technical Specification Group Radio Access Network; Study on supporting NR from 52.6 GHz to 71 GHz; (Release 17).

R1-2100050; 3GPP TSG RAN WG1 #104-e; e-Meeting, Jan. 25-Feb. 5, 2021; Agenda Item: 8.2.5; Source: FUTUREWEI; Title: Considerations for higher SCS support in beyond 52.6GHz; Document for: Discussion/ Decision.

R1-2100061; 3GPP TSG RAN WG1 #104-e; e-meeting, Jan. 25-Feb. 5, 2021; Source: Lenovo, Motorola Mobility; Title: PDSCH/PUSCH scheduling enhancements for NR from 52.6 GHz to 71GHz; Agenda Item: 8.2.5; Document for: Discussion.

R1-2100077; 3GPP TSG RAN WG1 #104-e; e-Meeting, Jan. 25th-Feb. 5, 2021; Title: Discussion on the data channel enhancements for 52.6 to 71GHz; Source: ZTE, Sanechips; Agenda Item: 8.2.5; Document for: Discussion and Decision.

R1-2100153; 3GPP TSG RAN WG1 #104-e; e-Meeting, Jan. 25-Feb. 5, 2021; Source: OPPO; Title: Discussion on PDSCH/PUSCH enhancements; Agenda Item: 8.2.5; Document for: Discussion and Decision.

R1-2100201; 3GPP TSG RAN WG1 Meeting #104-e; E-meeting, Jan. 25-Feb. 5, 2021; Agenda Item: 8.2.5; Source: Huawei, HiSilicon; Title: PDSCH/PUSCH enhancements for 52-71GHz band; Document for: Discussion and Decision.

R1-2100261; 3GPP TSG RAN WG1 #104-e; e-Meeting, Jan. 25-Feb. 5, 2021; Agenda item: 8.2.5; Source: Nokia, Nokia Shanghai Bell; Title: PDSCH/PUSCH enhancements; Document for: Discussion and Decision.

R1-2100300; 3GPP TSG RAN WG1 #104-e; e-Meeting, Jan. 25-Feb. 5, 2021; Source: CAICT; Title: Discussions on PDSCH and PUSCH enhancements for 52.6-71GHz; Agenda Item: 8.2.5; Document for: Discussion / Decision.

R1-2100374; 3GPP TSG RAN WG1 #104-e; e-Meeting, Jan. 25-Feb. 5, 2021; Source: CATT; Title: PDSCH/PUSCH enhancements for up to 71GHz operation; Agenda Item: 8.2.5; Document for: Discussion and Decision.

R1-2100433; 3GPP TSG RAN WG1 #104-e; e-Meeting, Jan. 25-Feb. 5, 2021; Source: vivo; Title: Discussions on Pdsch Pusch enhancements for NR operation from 52.6GHz to 71GHz; Agenda Item: 8.2.5; Document for: Discussion and Decision.

R1-2100647; 3GPP TSG RAN WG1 Meeting #104-e; e-Meeting, Jan. 25-Feb. 5, 2021; Source: Intel Corporation; Title: Discussion on PDSCH/PUSCH enhancements for extending NR up to 71 GHz; Agenda item: 8.2.5; Document for: Discussion/Decision.

R1-2100840; 3GPP TSG RAN WG1 #104-e; e-Meeting, Jan. 25-Feb. 5, 2021; Agenda Item: 8.2.5; Source: InterDigital, Inc .; Title: Discussions on PDSCH/PUSCH enhancements; Document for: Discussion and Decision.

R1-2100853; 3GPP TSG RAN WG1 #104-e; e-Meeting, Jan. 25-Feb. 5, 2021; Agenda Item: 8.2.5; Source: Sony; Title: PDSCH/PUSCH enhancements for NR from 52.6 GHz to 71 GHz; Document for: Discussion / Decision.

R1-2100896; 3GPP TSG RAN WG1 #104-e; e-Meeting, Jan. 25-Feb. 5, 2021; Agenda Item: 8.2.5; Source: LG Electronics; Title: PDSCH/PUSCH enhancements to support NR above 52.6 GHz; Document for: Discussion and decision.

R1-2100940; 3GPP TSG RAN WG1 #104-e; e-Meeting, Jan. 25-Feb. 5, 2021; Source: NEC; Title: PDSCH enhancements on supporting NR from 52.6GHz to 71 GHz; Agenda Item: 8.2.5; Document for: Discussion and Decision.

R1-2101198; 3GPP TSG RAN WG1 #104-e; e-Meeting, Jan. 25-Feb. 5, 2021; Agenda item: 8.2.5; Source: Samsung; Title: PDSCH/

(56) References Cited

OTHER PUBLICATIONS

PUSCH enhancements for NR from 52.6 GHz to 71 GHz; Document for: Discussion and Decision.

R1-2101310; 3GPP TSG-RAN WG1 Meeting #104-e; Online, Jan. 25-Feb. 5, 2021; Agenda Item: 8.2.5; Source: Ericsson; Title: PDSCH/PUSCH enhancements; Document for: Discussion, Decision.

R1-2101376; 3GPP TSG RAN WG1 #104-e; e-Meeting, Jan. 25-Feb. 5, 2021; Agenda Item: 8.2.5; Source: Apple Inc.; Title: PDSCH/PUSCH enhancements for NR between 52.6GHz and 71 GHz; Document for: Discussion/Decision.

R1-2101457; 3GPP TSG-RAN WG1 #104-e; e-Meeting, Jan. 25-Feb. 5, 2021; Agenda item: 8.2.5; Source: Qualcomm Incorporated; Title: PDSCH and PUSCH enhancements for 52.6-71GHz band; Document for: Discussion/Decision.

R1-2101609; 3GPP TSG RAN WG1 Meeting #104-e; Electronic Meeting, Jan. 25-Feb. 5, 2021; Source: NTT DOCOMO, Inc.; Title: PDSCH/PUSCH enhancements for NR from 52.6 to 71 GHz; Agenda Item: 8.2.5; Document for: Discussion and Decision.

R1-2101819; 3GPP TSG RAN WG1 #104-e; e-Meeting, Jan. 25-Feb. 5, 2021; Title: Discussion on the data channel enhancements for 52.6 to 71GHz; Source: ZTE, Sanechips; Agenda Item: 8.2.5; Document for: Discussion and Decision.

R1-2102080; 3GPP TSG RAN WG1 #104-e; e-Meeting, Jan. 25-Feb. 5, 2021; Agenda Item: 8.2.5; Source: Moderator (LG Electronics); Title: Summary #4 of PDSCH/PUSCH enhancements (Scheduling/HARQ); Document for: Discussion and decision.

RP-202925; (previous version RP-201845); 3GPP TSG RAN Meeting #90-e; Electronic Meeting, Dec. 7-11, 2020; Source: Qualcomm-mCMCC; Title: Revised WID: Extending current NR operation to 71 GHz; Document for: Approval; Agenda Item: 9.8.2.

RP-210129; 3GPP TSG-RAN Meeting #91-e; e-Meeting, Mar. 16-26, 2021; Title: Presentation of Report to TSG:TR 38.808 v200: Study on supporting NR from 52.6 GHz to 71 GHz; Source: Intel Corporation; Agenda item: 9.6.11; Release: Rel-17; Work Item: FS_NR_52_to_71GHz; Responsible WG: WG1; Document for: Approval.

3GPP TSG RAN WG1 Meeting #104-e; e-Meeting, Jan. 25-Feb. 5, 2021; Title: RAN1 Chairman's Notes.

International Search Report and Written Opinion of the International Searching authority mailed Jul. 20, 2022, in International Application No. PCT/US2022/022859.

R1-2101612; 3GPP TSG RAN WG1 #104-e; e-Meeting, Jan. 25-Feb. 5, 2021; Source: NTT DOCOMO, Inc.; Title: Discussion on HARQ-ACK feedback enhancements for Rel. 17 URLLC; Agenda Item: 8.3.1.1; Document for: Discussion and Decision.

* cited by examiner

IP Packets

QoS Flows

SDAP
215/225

QoS Flow Handling

Radio
Bearers

PDCP
214/224

Header Comp.,
Ciphering

Header Comp.,
Ciphering

Reordering,
Retransmission

Reordering,
Retransmission

RLC
Channels

RLC
213/223

Segmentation,
ARQ

Segmentation,
ARQ

Logical
Channels

MAC
212/222

Multiplexing

HARQ

Transport
Channel

PHY
211/221

Coding, Resource Mapping

Uplink

FIG. 5B

Downlink

FIG. 5A

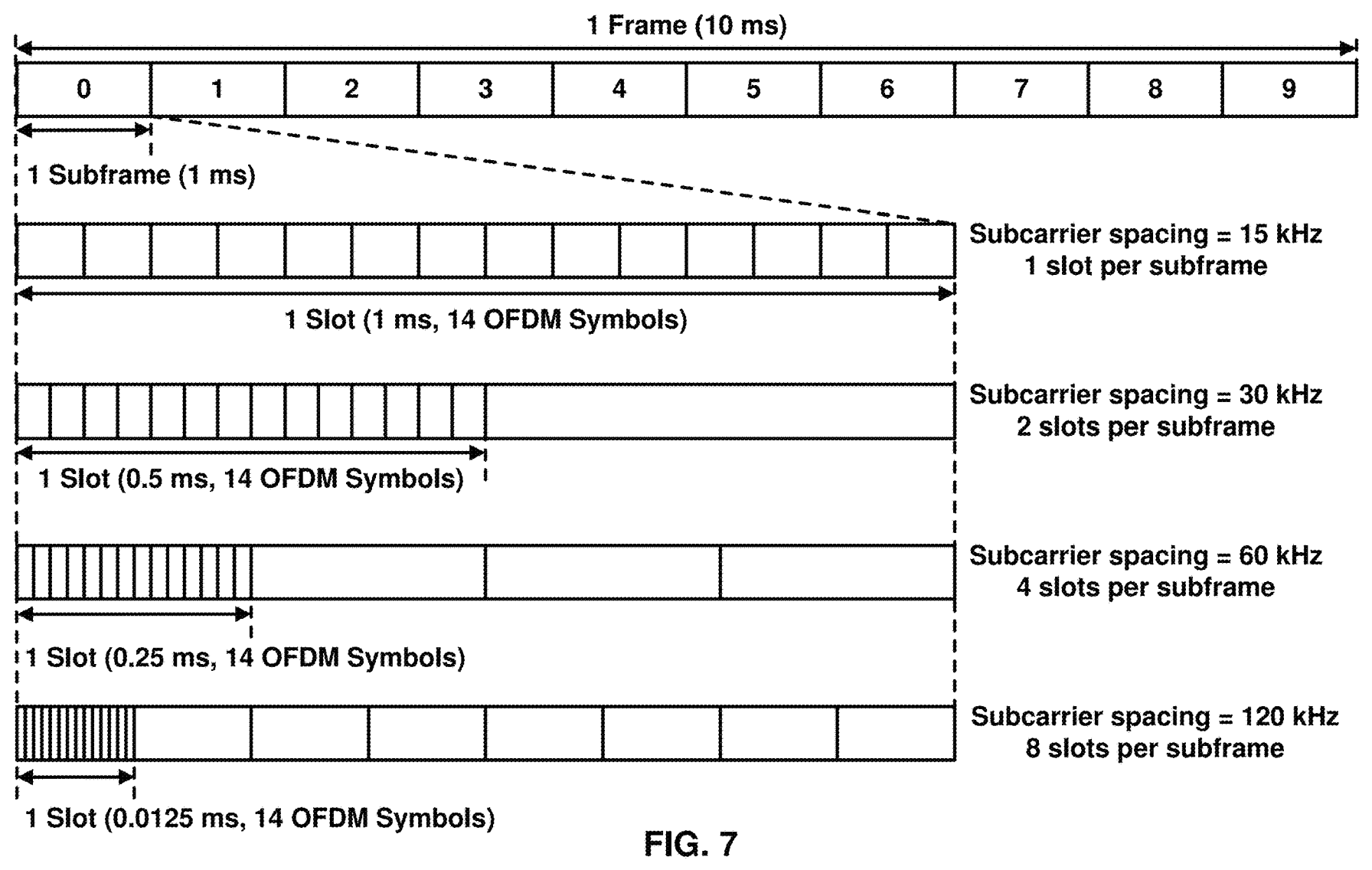

1 Frame (10 ms)

0  1  2  3  4  5  6  7  8  9

1 Subframe (1 ms)

Subcarrier spacing = 15 kHz
1 slot per subframe

1 Slot (1 ms, 14 OFDM Symbols)

Subcarrier spacing = 30 kHz
2 slots per subframe

1 Slot (0.5 ms, 14 OFDM Symbols)

Subcarrier spacing = 60 kHz
4 slots per subframe

1 Slot (0.25 ms, 14 OFDM Symbols)

Subcarrier spacing = 120 kHz
8 slots per subframe

1 Slot (0.0125 ms, 14 OFDM Symbols)

FIG. 7

Resource Element (RE)
1 Symbol x 1 Subcarrier

Resource Block (RB)
12 Subcarriers

One Slot (14 Symbols)

NR Carrier Bandwidth
(Up to 3300 Subcarriers)

Frequency

Time

| TDRA index | | PDSCH#0 | | | PDSCH#1 | | | ... | PDSCH#M | | |
| --- | --- | --- | --- | --- | --- | --- | --- | --- | --- | --- | --- |
| | k0 | Mapping type | SLIV | Priority index | Mapping type | SLIV | Priority index | ... | Mapping type | SLIV | Priority index |
| 0 | 0 | typeA | 8 | 0 | typeA | 8 | 0 | ... | - | - | - |
| 1 | 0 | typeA | 14 | 0 | typeA | 14 | 1 | ... | - | - | - |
| 2 | 1 | typeA | 28 | 0 | typeA | 28 | 0 | ... | typeA | 20 | 1 |
| ... | ... | ... | ... | ... | ... | ... | ... | ... | ... | ... | ... |
| 15 | 32 | typeB | 127 | 1 | typeB | 127 | 1 | ... | typeB | 100 | 0 |

FIG. 26

PRIORITIES IN MULTIPLE DOWNLINK AND UPLINK SCHEDULING

This application is a continuation of International Application No. PCT/US2022/022859, filed Mar. 31, 2022, which claims the benefit of U.S. Provisional Application No. 63/168,323, filed Mar. 31, 2021, all of which are hereby incorporated by reference in their entireties.

BRIEF DESCRIPTION OF THE DRAWINGS

Examples of several of the various embodiments of the present disclosure are described herein with reference to the drawings.

FIG. 5A and FIG. 5B respectively illustrate a mapping between logical channels, transport channels, and physical channels for the downlink and uplink.

FIG. 7 illustrates an example configuration of an NR frame into which OFDM symbols are grouped.

FIG. 26 shows an example of priority indication using RRC configuration for multi-PDSCH scheduling, according to some embodiments.

DETAILED DESCRIPTION

Figures 1A, 1B:
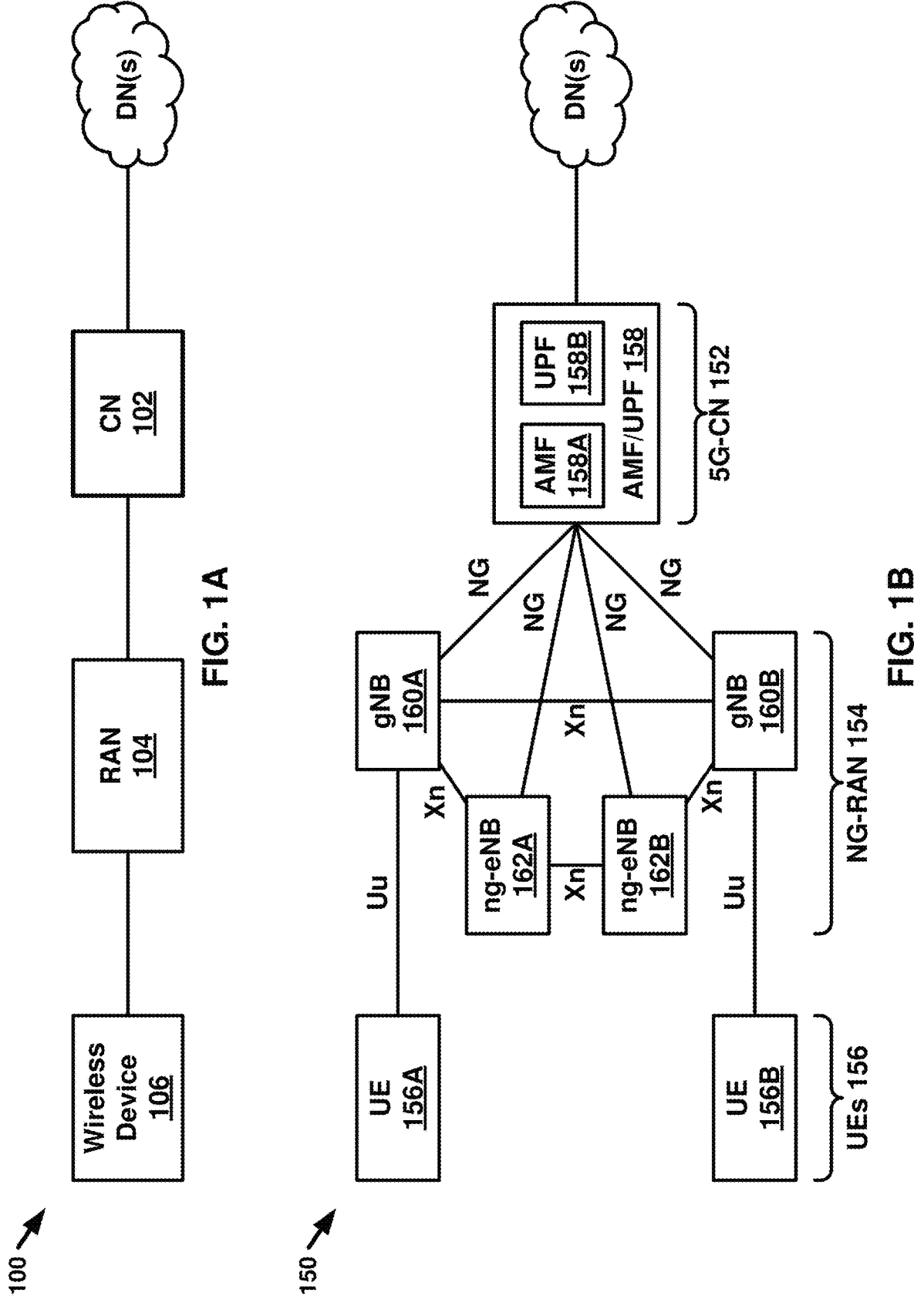
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
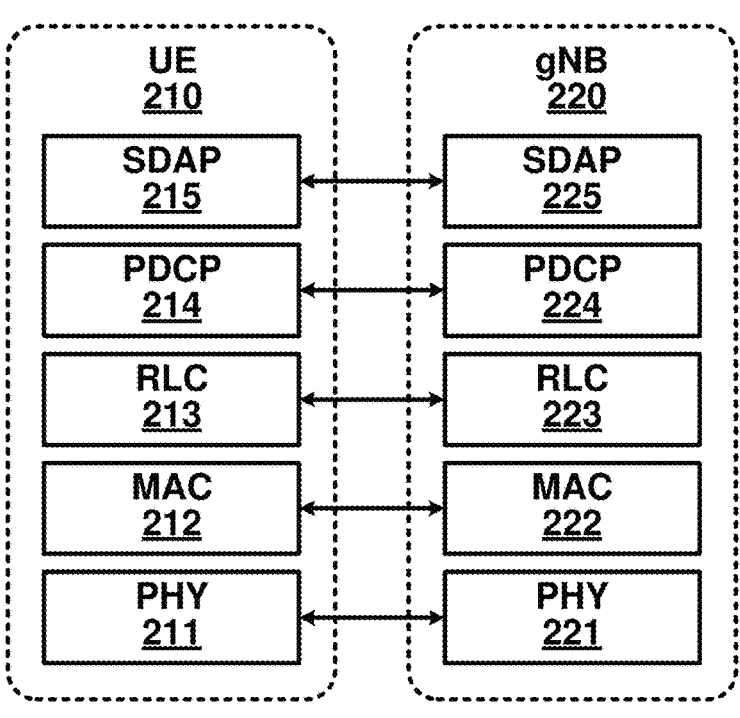
FIG. 2A and FIG. 2B respectively illustrate a New Radio (NR) user plane and control plane protocol stack.
Figure 2B:
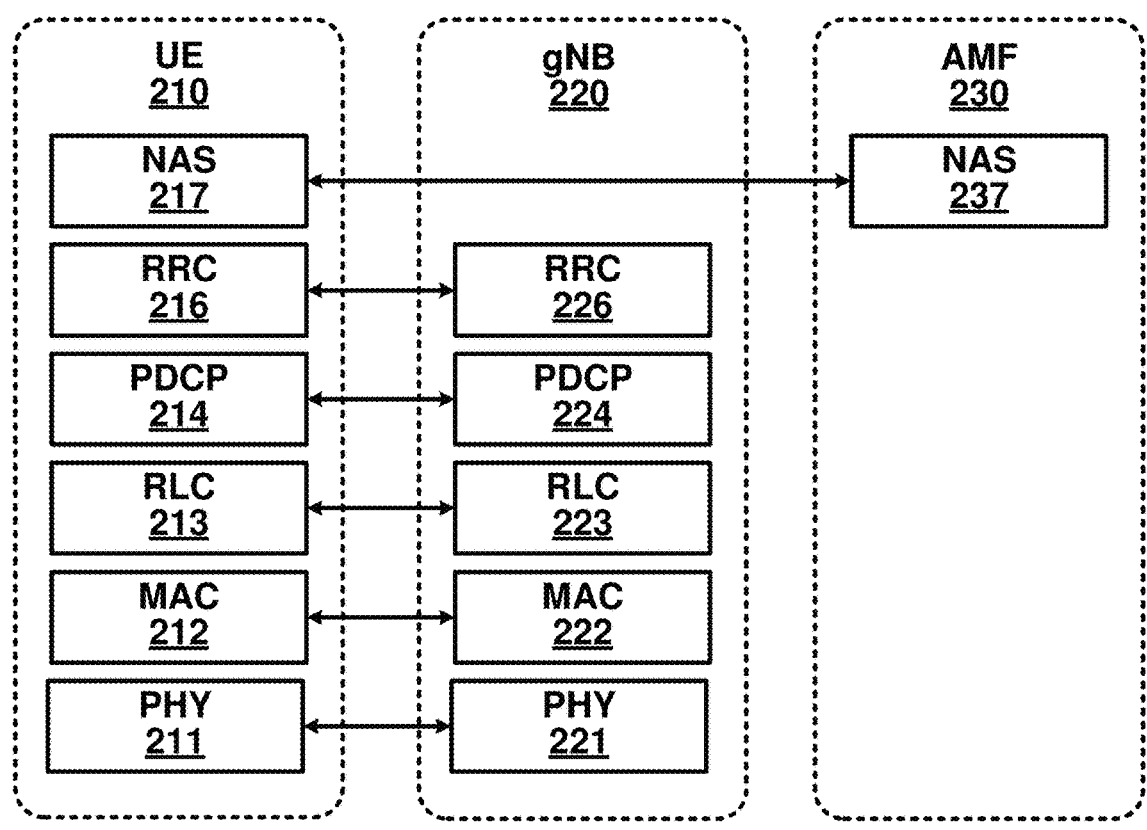
Figure 3:
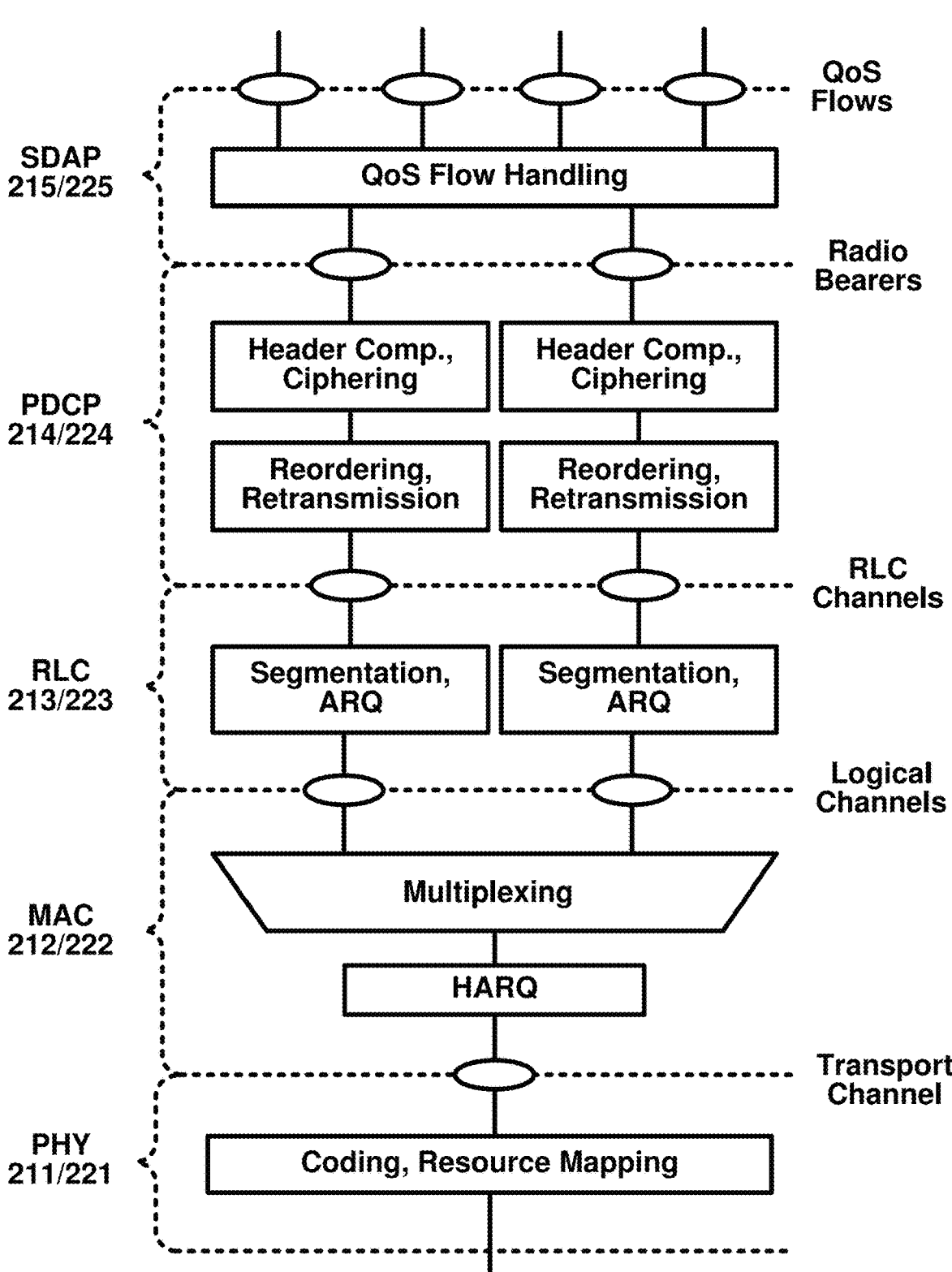
FIG. 3 illustrates an example of services provided between protocol layers of the NR user plane protocol stack of FIG. 2A.
Figures 4A, 4B:
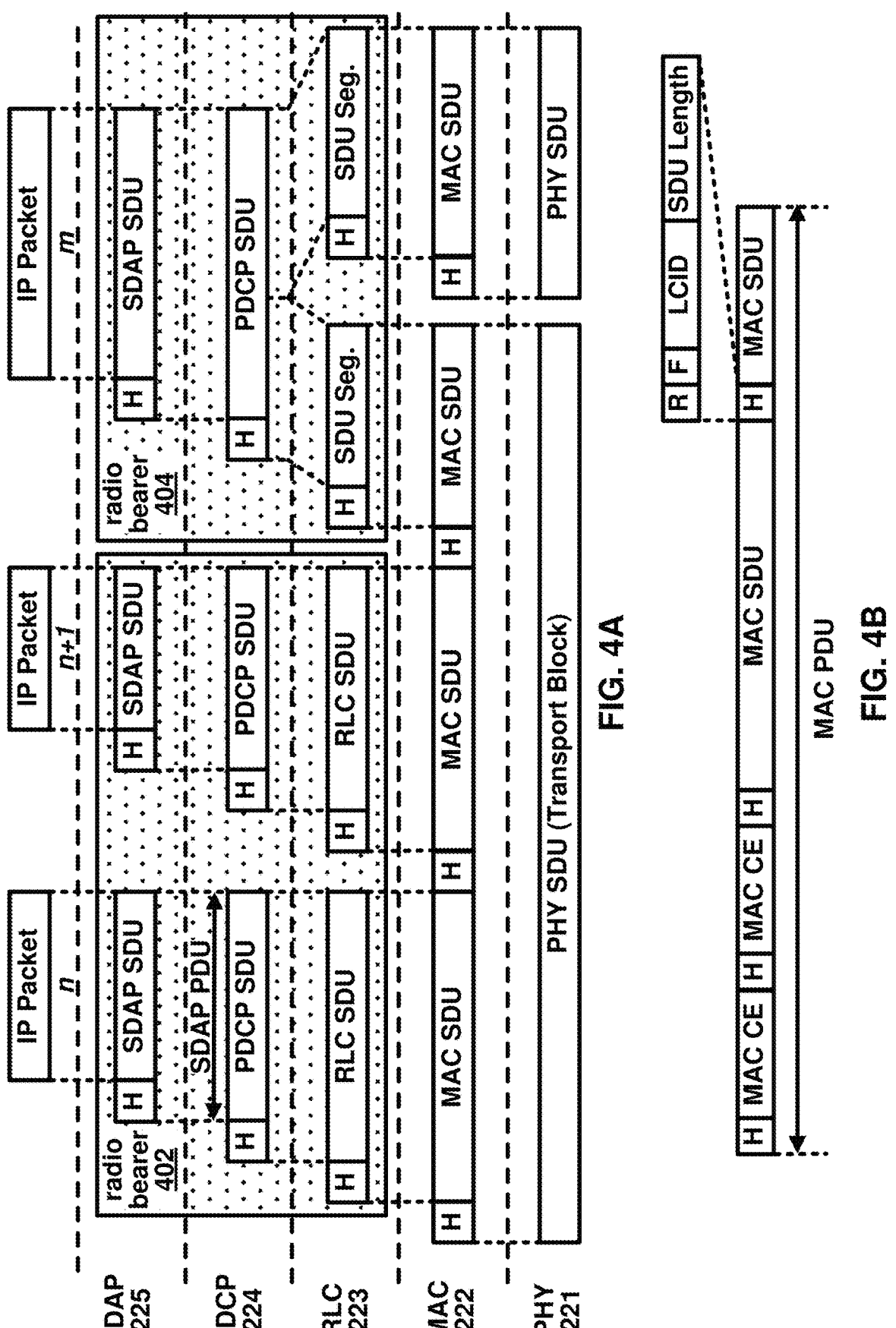
FIG. 4A illustrates an example downlink data flow through the NR user plane protocol stack of FIG. 2A.
FIG. 4B illustrates an example format of a MAC subheader in a MAC PDU.

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figures 5A, 5B:
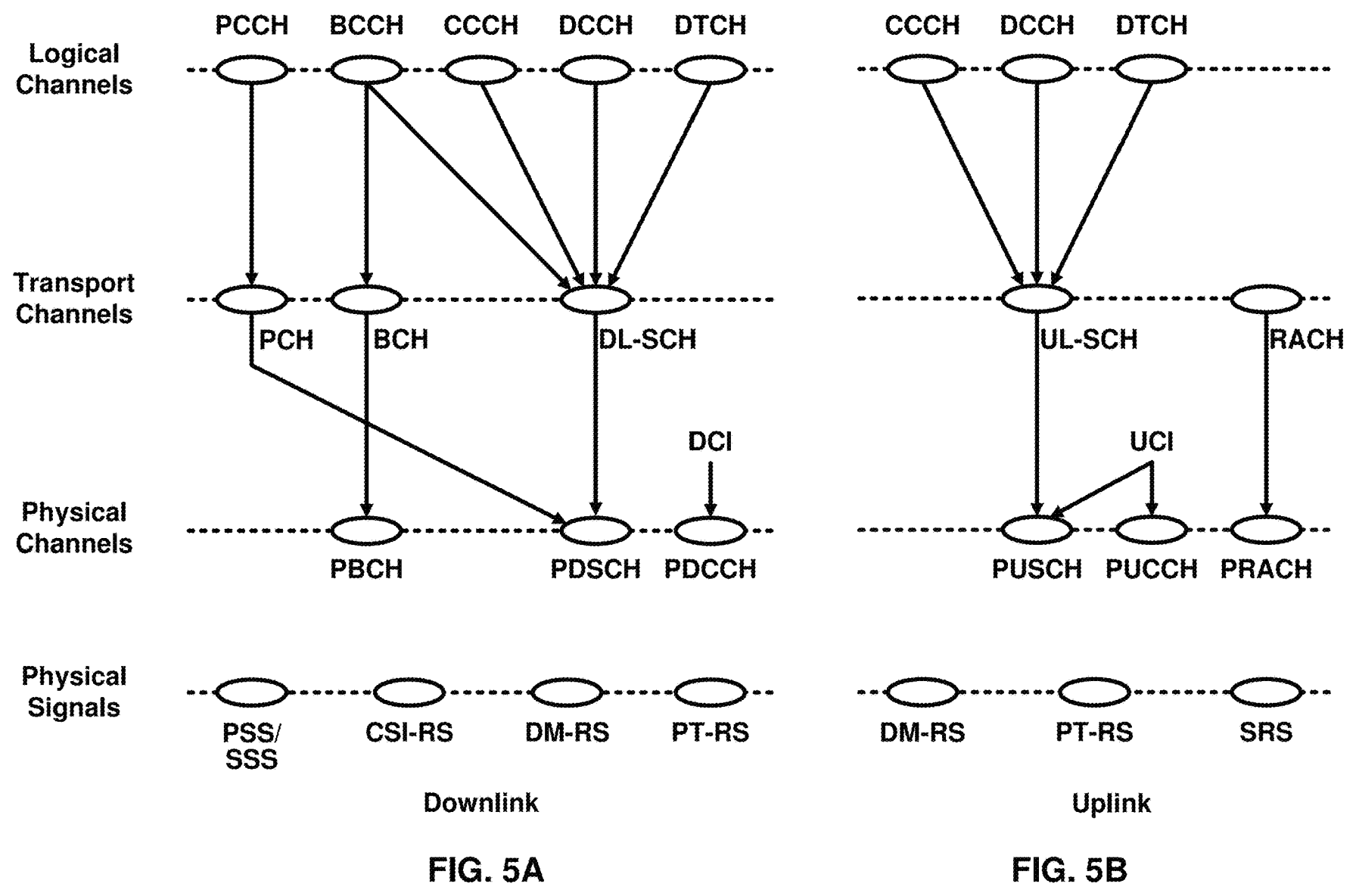

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
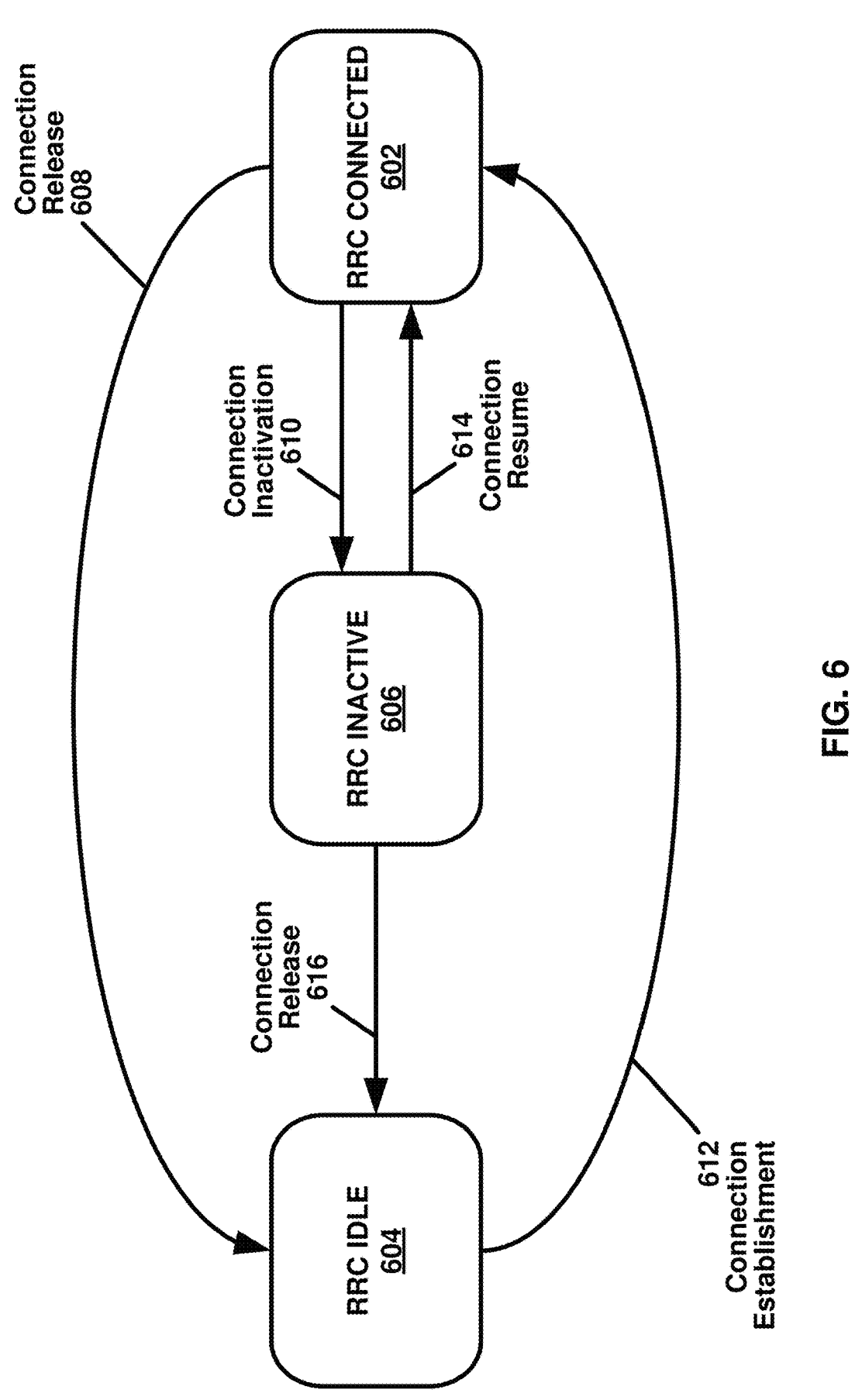
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts;

one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/ cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
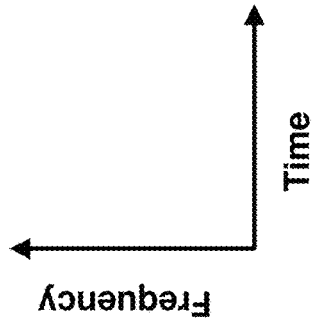
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORE-SETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
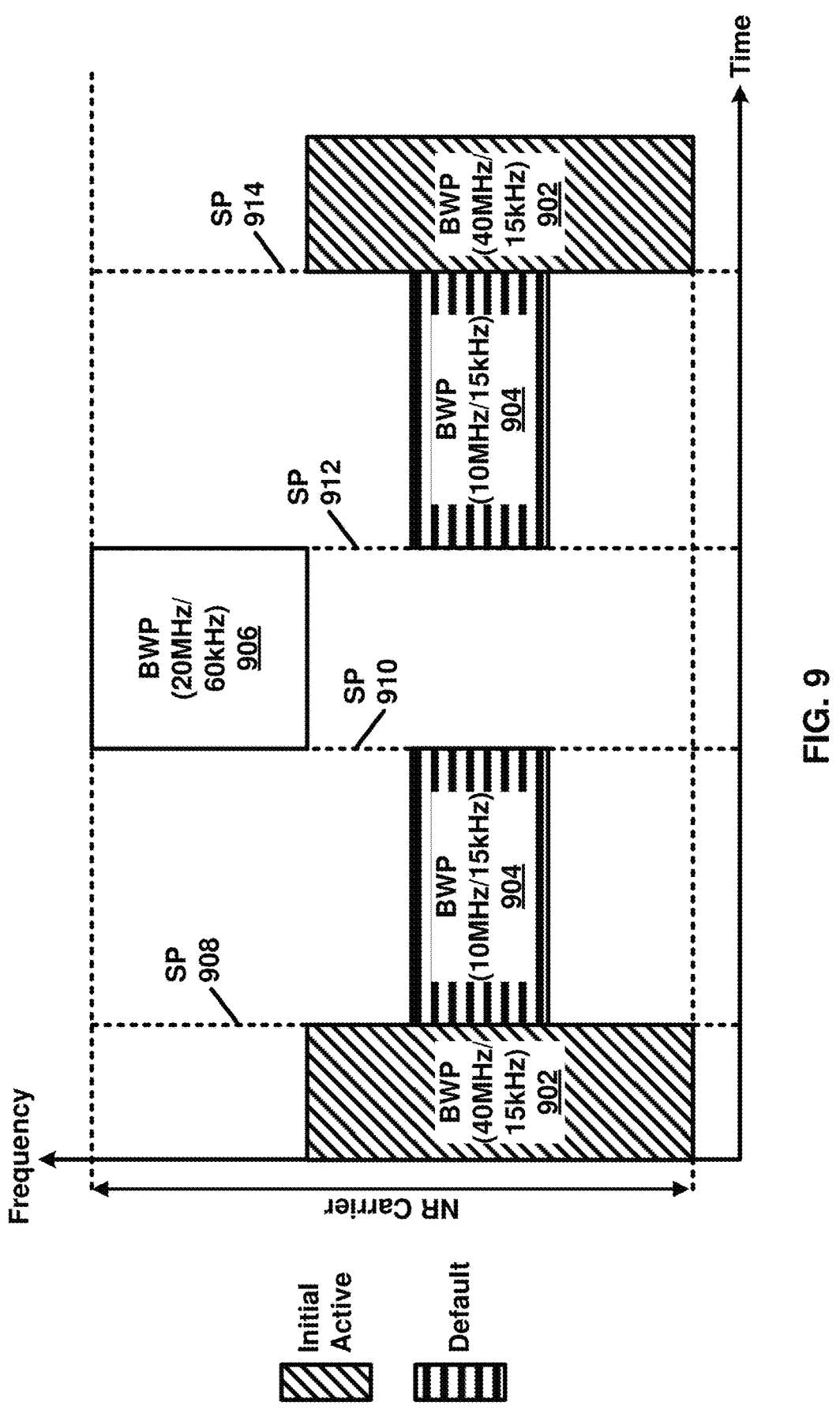
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
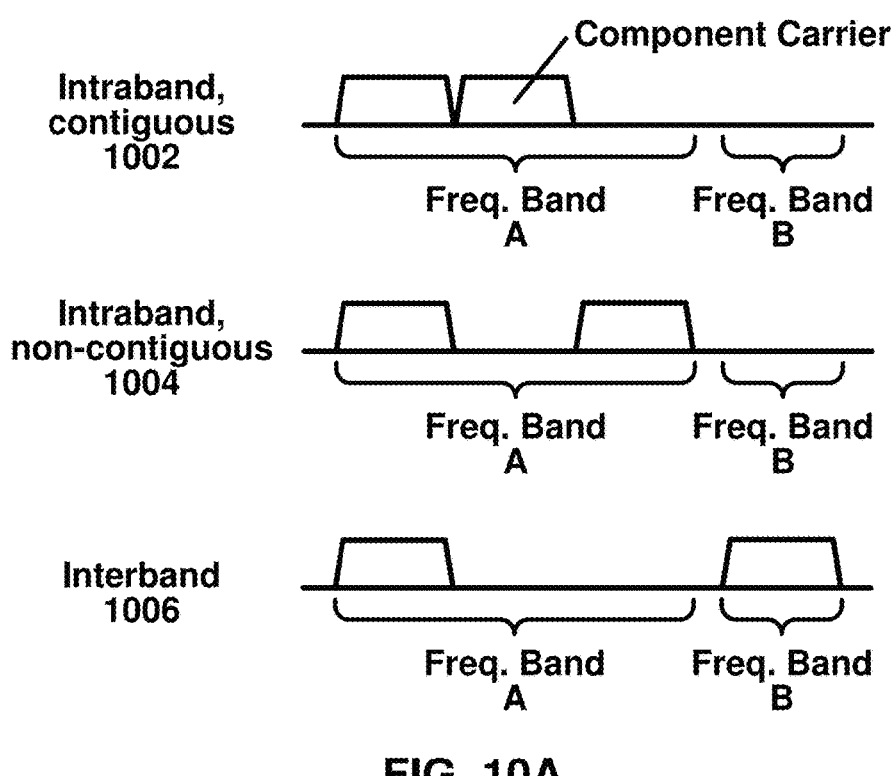
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
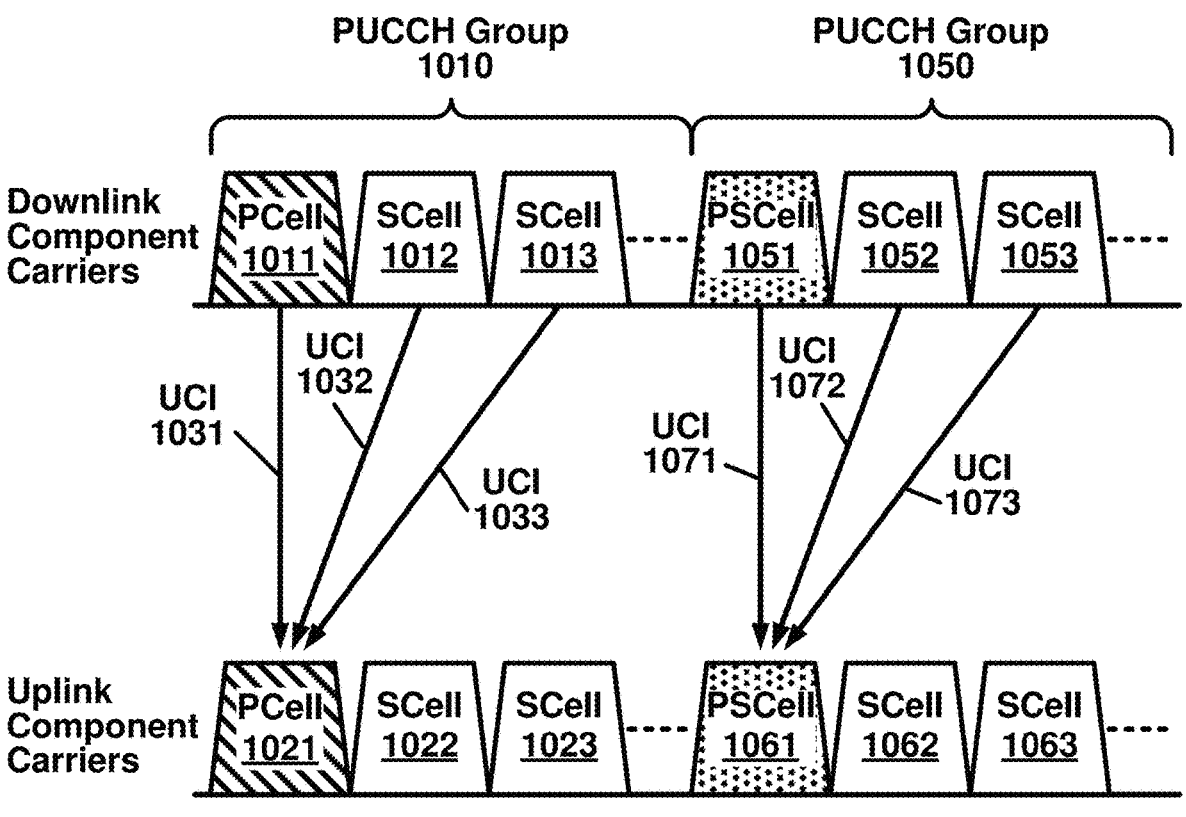
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/ physical broadcast channel (PBCH) block that includes the PSS, the SSS, and the PBCH. The base station may periodically transmit a burst of SS/PBCH blocks.

Figure 11A:
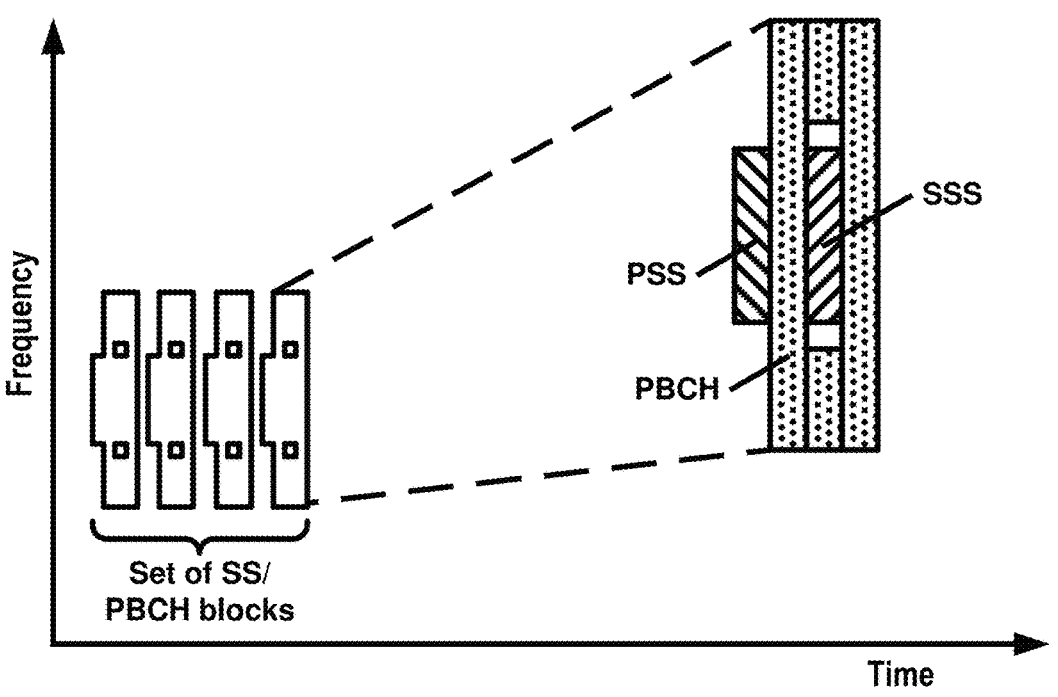
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB 1. The SIB1 may be decoded using parameters provided in the MIB. The PBCH may indicate an absence of SIB 1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
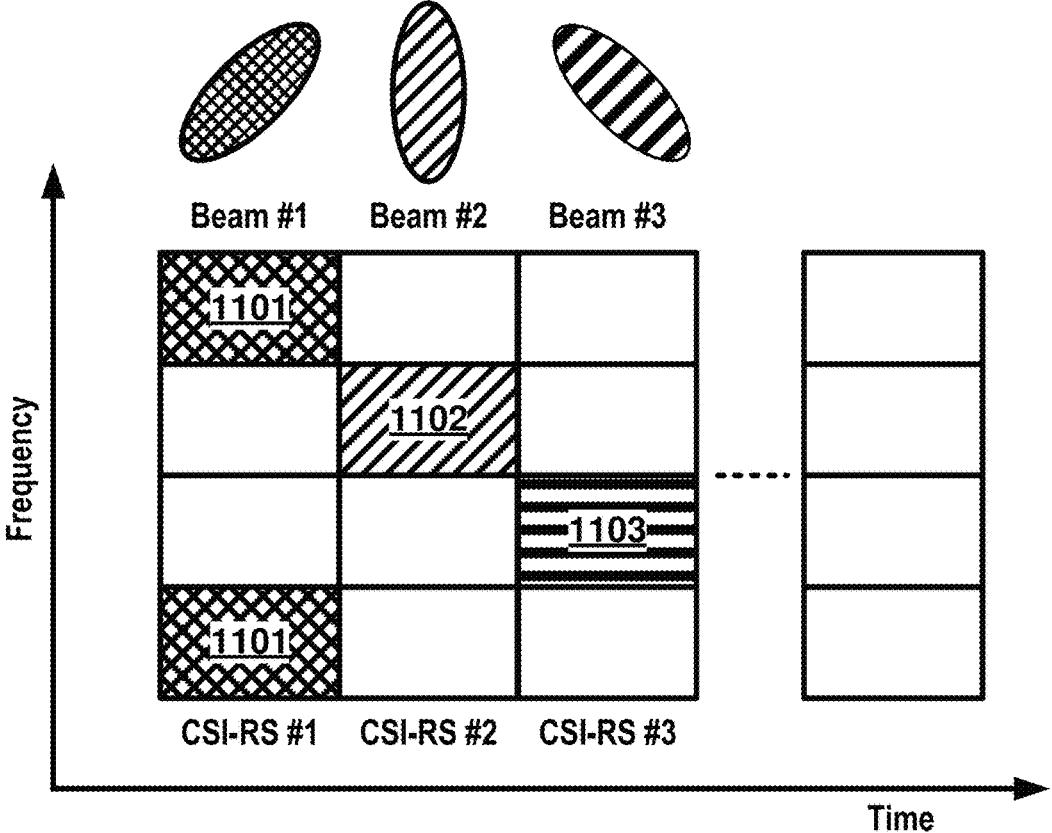
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

Figures 12A, 12B:
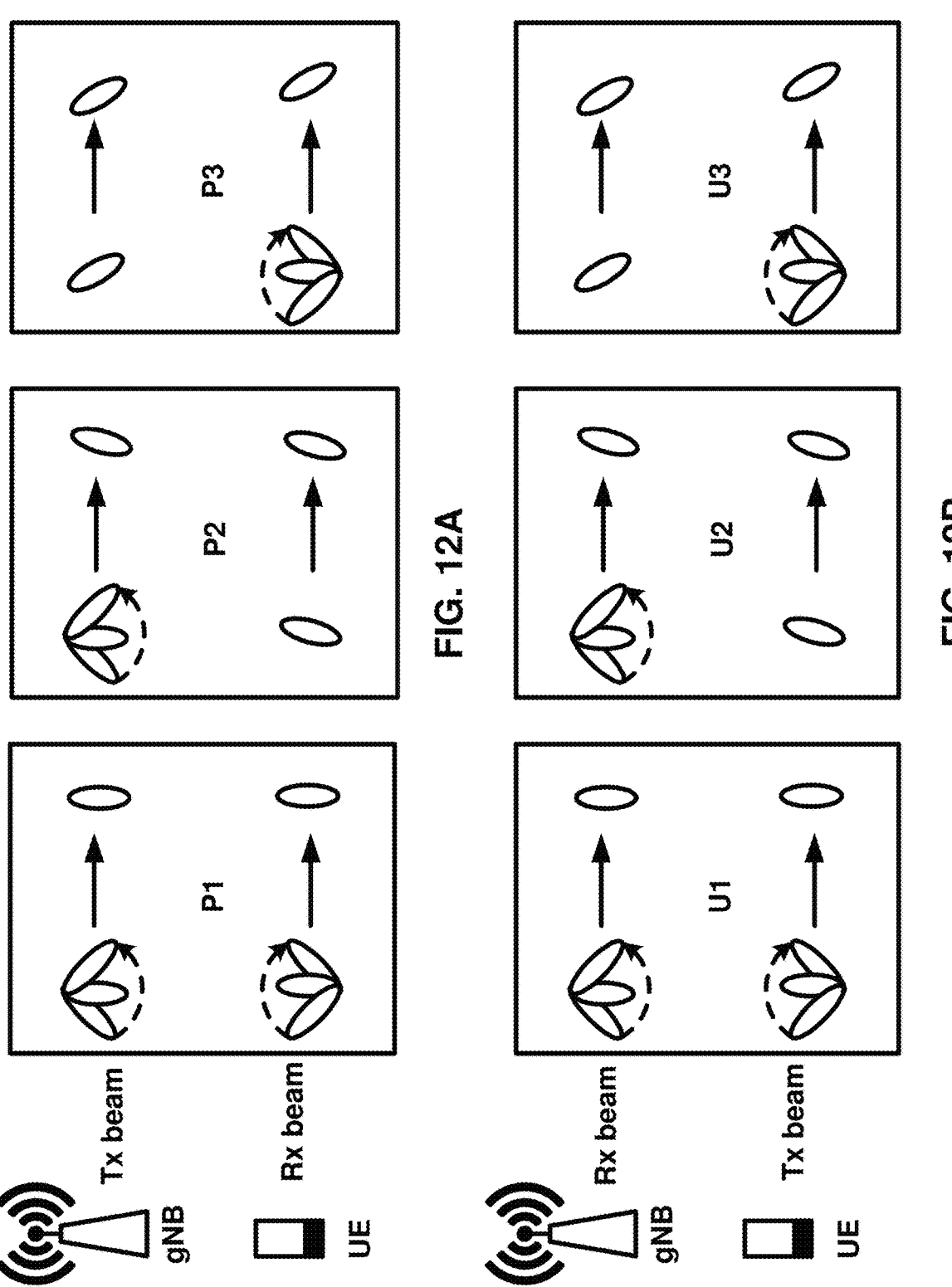
FIG. 12A and FIG. 12B respectively illustrate examples of three downlink and uplink beam management procedures.

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIB s) (e.g., other system information such as SIB2, SIB3, and/or the like). The UE may initiate the random access procedure for a beam failure recovery request. A network may initiate a random access procedure for a handover and/or for establishing time alignment for an SCell addition.

Figures 13A, 13B, 13C:
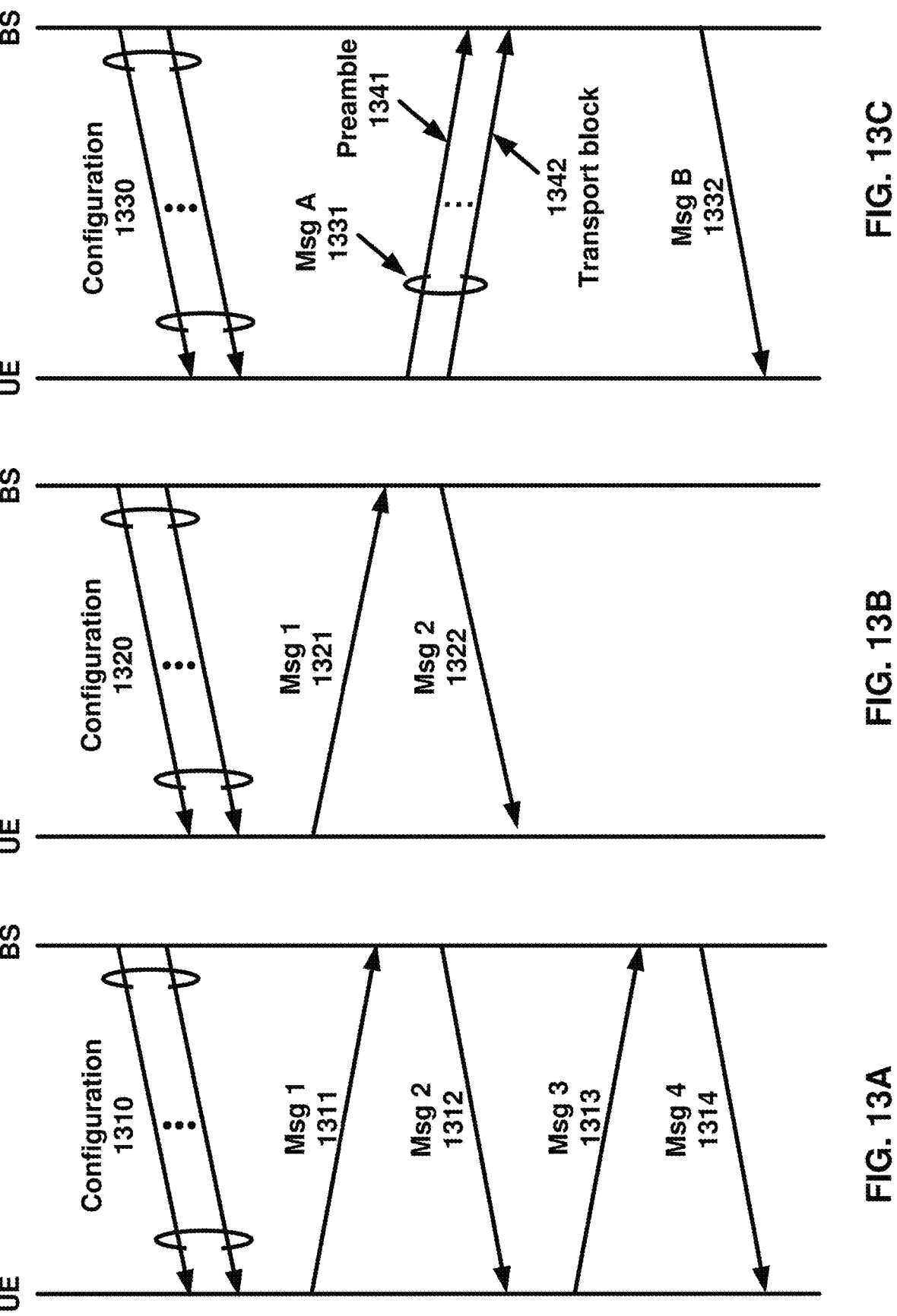
FIG. 13A, FIG. 13B, and FIG. 13C respectively illustrate a four-step contention-based random access procedure, a two-step contention-free random access procedure, and another two-step random access procedure.

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_I-NACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$\text{RA-RNTI} = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., $0 \le s\_id < 14$), t_id may be an index of a first slot of the PRACH occasion in a system frame (e.g., $0 \le t\_id < 80$), f_id may be an index of the PRACH occasion in the frequency domain (e.g., $0 \le f\_id < 8$), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figures 14A, 14B:
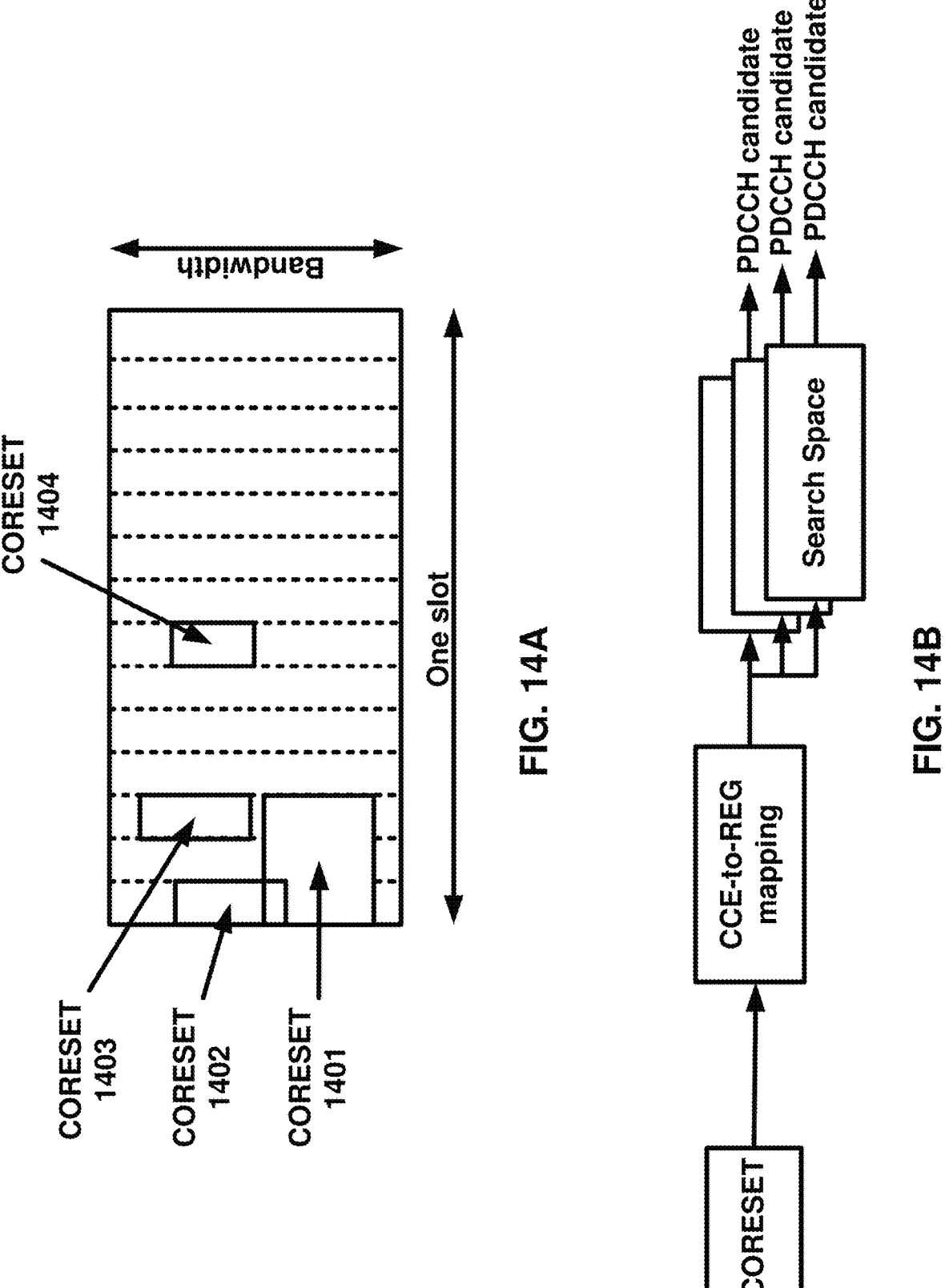
FIG. 14A illustrates an example of CORESET configurations for a bandwidth part.
FIG. 14B illustrates an example of a CCE-to-REG mapping for DCI transmission on a CORESET and PDCCH processing.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
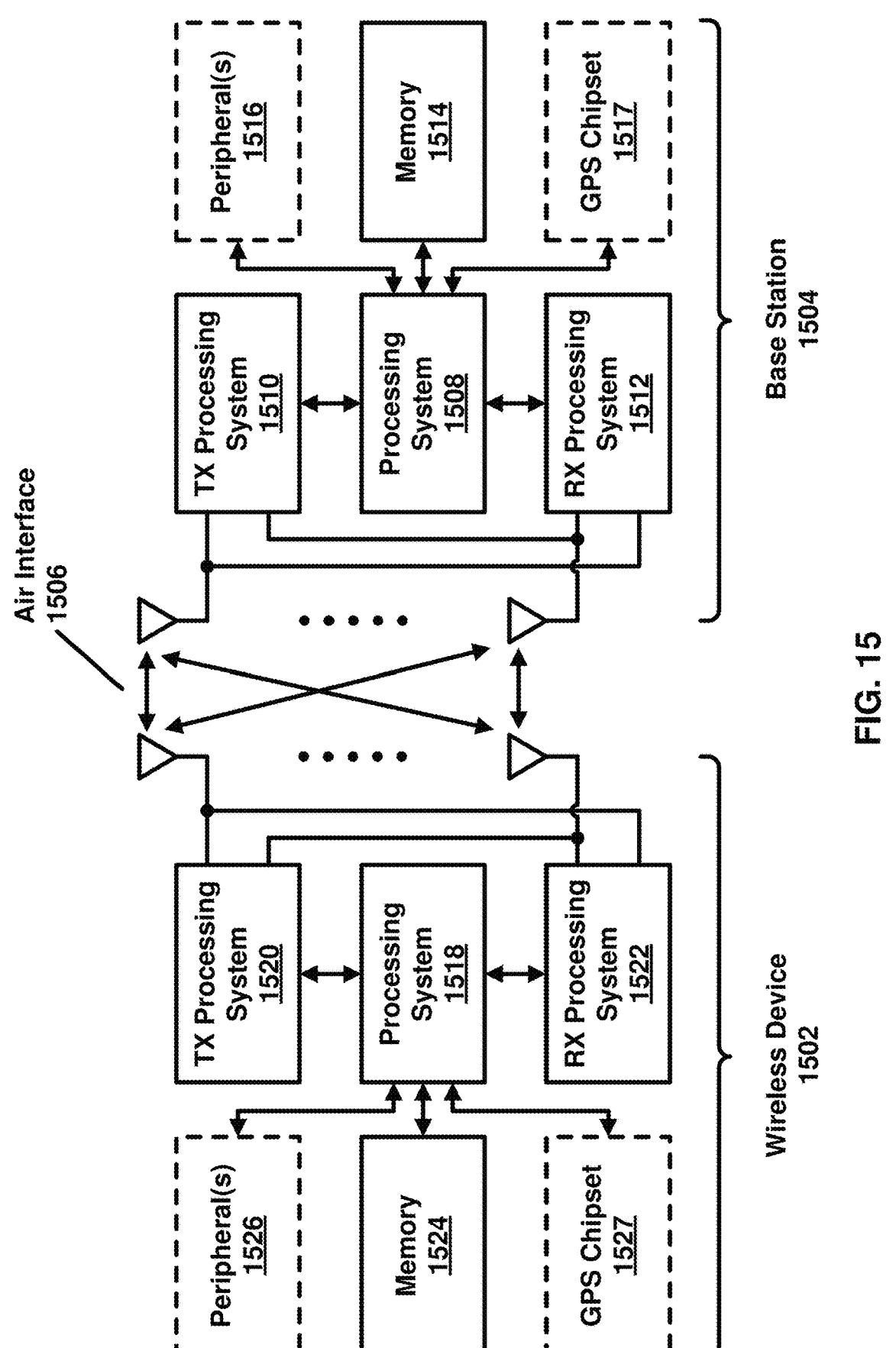
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figures 16A, 16B, 16C, 16D:
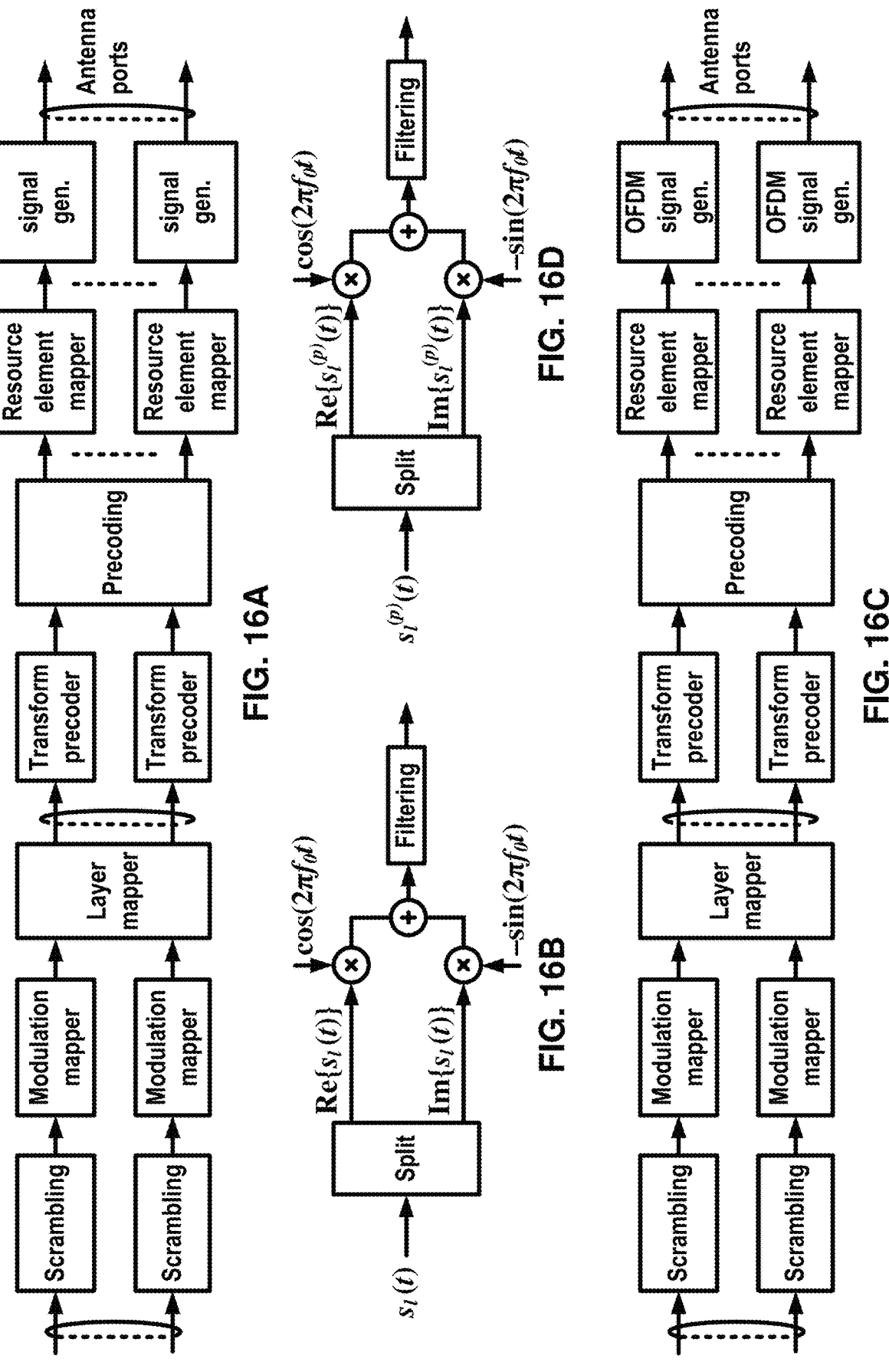
FIG. 16A, FIG. 16B, FIG. 16C, and FIG. 16D illustrate example structures for uplink and downlink transmission.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

The hybrid-ARQ (hybrid automatic repeat request, HARQ) mechanism in the MAC layer targets very fast transmissions. A wireless device may provide feedback on success (e.g., an ACK) or failure (e.g., a NACK) of a downlink transmission (e.g., a PDSCH) to a base station for each scheduled/candidate transport block. A HARQ-ACK information bit value of 0 represents a negative acknowledgement (NACK) while a HARQ-ACK information bit value of 1 represents a positive acknowledgement (ACK), according to some embodiments.

It may be possible to attain a very low error rate probability of the HARQ feedback, which may come at a cost in transmission resources such as power. For example, a feedback error rate of 0.1-1% may be reasonable, which may result in a HARQ residual error rate of a similar order. This residual error rate may be sufficiently low in many cases. In some services requiring ultra-reliable delivery of data with low latency, e.g., URLLC, this residual error rate may not be tolerable. In such cases, the feedback error rate may be decreased and an increased cost in feedback signaling may be accepted, and/or additional retransmissions may be performed without relying on feedback signaling, which comes at a decreased spectral efficiency.

HARQ protocol may be a primary way of handling retransmissions in a wireless technology, e.g., New Radio (NR). In case of an erroneously received packet, a retransmission may be required. Despite it not being possible to decode the packet, a received signal may still contain information, which may be lost by discarding the erroneously received packet. HARQ protocol with soft combining may address this shortcoming. In HARQ with soft combining, the wireless device may store the erroneously received packet in a buffer memory, and later combine the received packet with one or more retransmissions to obtain a single, combined packet/transport block that may be more reliable than its constituents. Decoding of the error-correction code operates on the combined signal. Retransmissions of code-block groups that form a transport block may be handled by the physical layer and/or MAC layer.

The HARQ mechanism typically comprises multiple stop-and-wait protocols, each operating on a single transport block. In a stop-and-wait protocol, a transmitter stops and waits for an acknowledgment after each transmitted transport block. This protocol requires a single bit indicating positive or negative acknowledgment of the transport block; however, the throughput is low due to waiting after each transmission. Multiple stop-and-wait processes may operate in parallel, e.g., while waiting for acknowledgment from one HARQ process, the transmitter may transmit data of another HARQ process. The multiple parallel HARQ processes may form a HARQ entity, allowing continuous transmission of data. A wireless device may have one HARQ entity per carrier. A HARQ entity may support spatial multiplexing of more than four layers to a single device in the downlink, where two transport blocks may be transmitted in parallel on the same transport channel. The HARQ entity may have two sets of HARQ processes with independent HARQ acknowledgments.

A wireless technology may use an asynchronous HARQ protocol in the downlink and/or uplink, e.g., the HARQ process which the downlink and/or uplink transmission relates to, may be explicitly and/or implicitly signaled. For example, the downlink control information (DCI) scheduling a downlink transmission may signal the corresponding HARQ process. Asynchronous HARQ operation may allow dynamic TDD operation, and may be more efficient when operating in unlicensed spectra, where it may not be possible to guarantee that scheduled radio resources are available at the time for synchronous retransmissions.

Large transport block sizes may be segmented into multiple codeblocks prior to coding, each with its own CRC, in addition to an overall TB CRC. Errors may be detected on individual codeblocks based on their CRC, as well as on the overall TB. The base station may configure the wireless device with retransmissions based on groups of codeblocks, e.g., codeblock groups (CBGs). If per-CBG retransmission is configured, feedback is provided pre CBG. A TB may comprise of one or more CBGs. A CBG that a codeblock belongs to may be determined based on an initial transmission and may be fixed.

In the downlink, retransmissions may be scheduled in a same way as new data. For example, retransmissions may be scheduled at any time and any frequency location within a downlink cell and/or an active downlink BWP of a cell. A downlink scheduling assignment may contain necessary HARQ-related control signaling, e.g., HARQ process number; new-data indicator (NDI); CBG transmit indicator (CBGTI) and CBG flush indicator (CBGFI) in case per-CBG retransmission is configured; and/or information to schedule the transmission of the acknowledgment (ACK/NACK) in an uplink (e.g., a PUCCH), such as timing and resource indication information.

Upon receiving a downlink scheduling assignment in the DCI, the wireless device tries to decode the TB, e.g., after soft combining with previous attempts/receptions of the TB. Transmissions and retransmissions may be scheduled in a same framework. The wireless device may determine whether the transmission is a new transmission or a retransmission based on the NDI field in the DCI. An explicit NDI may be included for the scheduled TB as part of the scheduling information in the downlink. The NDI field may comprise one or more NDI bits per TB (and/or CBG). An NDI bit may be toggled for a new transmission, and not toggled for a retransmission. In case of a new transmission, the wireless device flushes soft buffer corresponding to the new transmission before receiving/storing the new transmission. In case of a retransmission, the wireless device may perform a soft combining of the received data with stored data in the soft buffer for the corresponding HARQ process based on the downlink scheduling assignment.

A time gap/interval/offset (e.g., K1) from a downlink data reception/resource to a transmission of a HARQ ACK/NACK corresponding to the downlink data may be fixed, e.g., multiple subframes/slots/symbols (e.g., three ms, 4 slots). This scheme with pre-defined timing instants for ACK/NACK may not blend well with dynamic TDD and/or unlicensed operation. A more flexible scheme, capable of dynamically controlling the ACK/NACK transmission timing may be adopted. For example, a DL scheduling DCI may comprise a PDSCH-to-HARQ_feedback timing field to control/indicate the transmission timing of an ACK/NACK corresponding to a data scheduled by the DL scheduling DCI in an uplink transmission (e.g., PUCCH). The PDSCH-to-HARQ_feedback timing field in the DCI may be used as an index of one or more indexes of K1 values in a pre-defined and/or RRC-configured table (e.g., a HARQ timing table). The K1 value may provide information of a gap/interval/offset between a second time to transmit the HARQ ACK/NACK relative to a first time of the reception of data (e.g., physical DL shared channel (PDSCH)).

Figure 17:
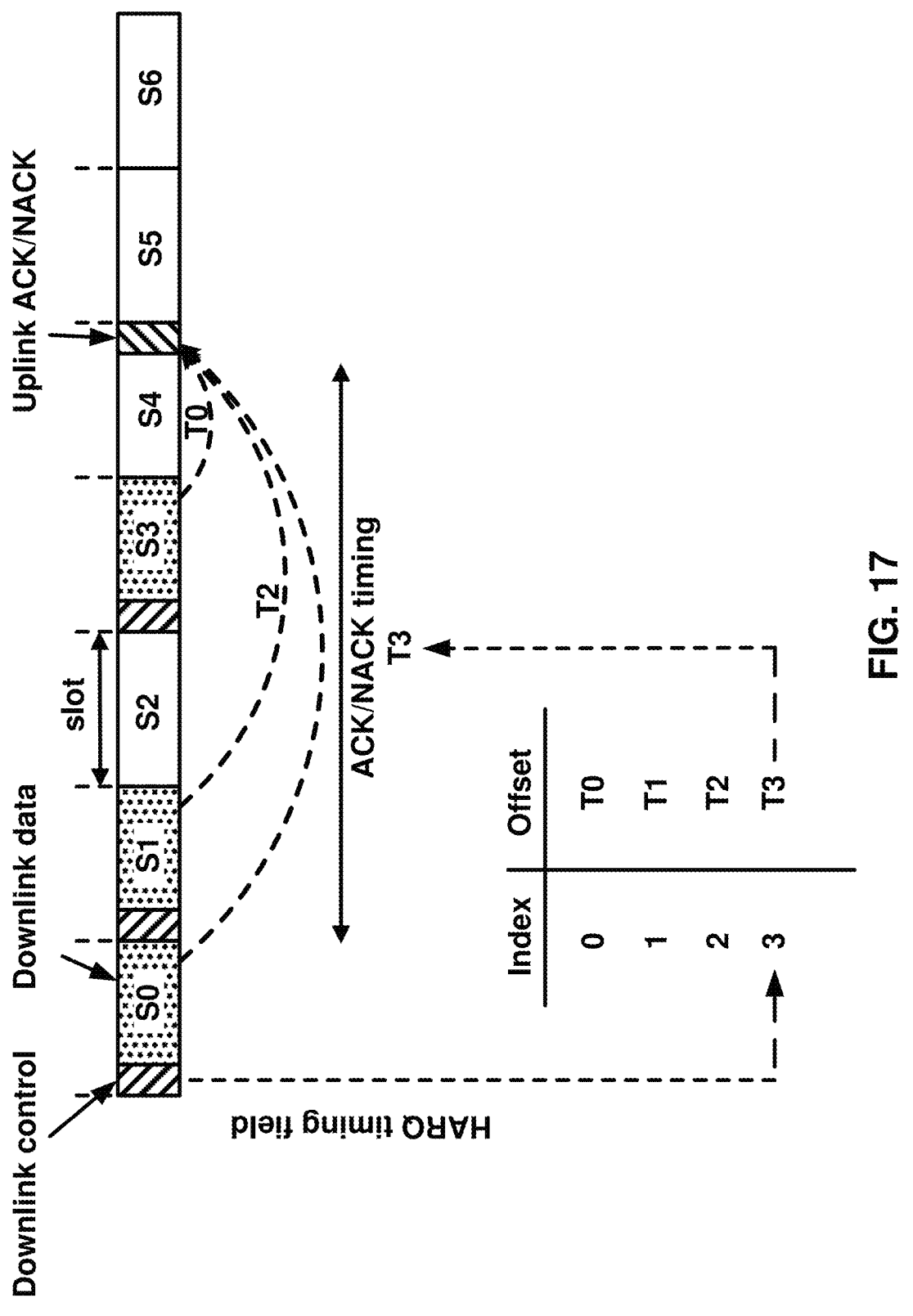
FIG. 17 shows an example of HARQ feedback timing determination, according to some embodiments.

FIG. 17 shows an example of HARQ feedback timing determination, according to some embodiments. In this example, three DCIs are received in slots S0, S1, and S3 that schedule three downlink assignments in the same slots. In each downlink assignment, different HARQ feedback timing indices are indicated, e.g., in S0: 3, in S1: 2, and in S3: 0. The indicated indices (PDSCH-to-HARQ_feedback timing field) point to the HARQ timing table, e.g., for S0: T3 in indicated that points to S4 for transmission of the uplink ACK/NACK, for S1: T2 in indicated that points to S4 for transmission of the uplink ACK/NACK, for S3: T0 in indicated that points to S4 for transmission of the uplink ACK/NACK. As a result, all three downlink assignments are acknowledged in the same slot, S4. The wireless device multiplexes the three acknowledgments and transmits the three acknowledgements in slot S4.

A wireless devices may support a baseline processing time/capability. Some wireless devices may support additional aggressive/faster processing time/capability. A wireless device may report to a base station a processing capability, e.g. per sub-carrier spacing.

A wireless device may determine a resource for HARQ ACK/NACK transmission, e.g. frequency resource and/or PUCCH format and/or code domain, based on a location of a PDCCH (e.g., a starting control channel element (CCE) index) scheduling the transmission. The scheduling PDCCH/DCI may comprise a field, e.g., PUCCH resource indicator (PRI) field, that indicates a frequency resource for an uplink transmission of the HARQ ACK/NACK transmission. For example, the PRI field may be an index selecting one of a plurality of pre-defined and/or RRC-configured PUCCH resource sets.

A wireless device may multiplex a plurality of HARQ feedback bits that are scheduled for transmission in the uplink at a same time/slot, for example, in a carrier aggregation scenario and/or when per-CBG retransmission is configured. The wireless device may multiplex multiple ACK/NACK bits of multiple TBs and/or CBGs into one multi-bit HARQ feedback message/codebook. The multiple ACK/NACK bits may be multiplexed based on a semi-static codebook and/or a dynamic codebook. A base station, via RRC configuration, may configure either the semi-static codebook or the dynamic codebook for a cell configured with PUCCH resources (e.g., a primary cell, a PUCCH cell)

The semi-static codebook may be viewed as a matrix consisting of a time domain dimension and a component-carrier (and/or CBG and/or MIMO layer) dimension, both of which may be semi-statically configured and/or pre-defined. A size of the time domain dimension may be given by a maximum and/or a minimum HARQ ACK/NACK timing indicated in the pre-defined and/or RRC-configured table of HARQ ACK/NACK timings. A size of the component-carrier domain may be given by a number of simultaneous TBs and/or CBGs across all component carriers. A codebook size may be determined based on the time domain dimension and the component-carrier dimension for a semi-static codebook, regardless of actual scheduled transport blocks/PDSCHs. A number of bits to transmit in a HARQ feedback/report is determined based on one or more RRC configuration parameters. An appropriate format (e.g., PUCCH format) for uplink control signaling may be selected based on a codebook size (e.g., a number of HARQ ACK/NACK bits). Each entry of the matrix may represent a decoding outcome, e.g. positive (ACK) or negative (NACK) acknowledgments, of the corresponding transmission. One or more of the entries of the codebook matrix may not correspond to a downlink transmission opportunity (e.g., a PDSCH occasion), for which a NACK is reported. This may increase a codebook robustness, e.g., in case of missed downlink assignments, and the base station may schedule a retransmission of the missed TB/CBG. The size of the semi-static codebook may be very large.

The dynamic codebook may be used to address the issue with the potentially large size of the semi-static codebook. With the dynamic codebook, only the ACK/NACK information of scheduled assignments, including one or more semi-persistent scheduling, may be included in the report, e.g., not all carriers as in semi-static codebook. A size of the dynamic codebook may be dynamically varying, e.g., as a function of a number of scheduled carriers and/or as a function of a number of scheduled transport blocks. To maintain a same understanding of the dynamic codebook size, which is prone to error in the downlink control signaling, a downlink assignment index (DAI) may be included in the scheduling DCI. The DAI field may comprise a counter DAI (cDAI) and a total DAI (tDAI), e.g., in case of carrier aggregation. The counter DAI in the scheduling DCI indicates a number of scheduled downlink transmissions (PDSCH reception(s)/SPS PDSCH release(s)) up to the point the DCI was received, in a carrier first, PDCCH monitoring occasion index second manner. The total DAI in the scheduling DCI indicates a total number of scheduled downlink transmissions across all carriers up to the point the DCI was received. A highest cDAI at a current time is equal to the tDAI at this time.

The base station (BS) may configure a UE with enhanced dynamic codebook for HARQ feedback operation. The BS may trigger a group of DL transmissions, e.g. PDSCHs, for example, in an enhanced dynamic codebook operation. For example, one or more fields in a DCI may indicate one or more PDSCHs/PDCCHs to be acknowledged via an indicated UL resource. For example, the group of DL transmissions may comprise one or more HARQ processes, and/or may overlap with one or more slots/subframes, and/or may derived from a dynamic time window. The DCI may be carrying a DL scheduling assignment and/or an UL grant and/or a DCI not carrying a scheduling grant. The DCI may comprise one or more HARQ feedback timing values indicating the UL resource.

A DCI scheduling a DL assignment, e.g. PDSCH, may associate the PDSCH to a group. For example, the DCI may comprise a field indicating a group index. For example, a PDSCH scheduled by a first DCI format (e.g. DCI format 1_0) may be associated with a pre-defined group (e.g. PDSCH group #0). For example, an SPS PDSCH occasion may be associated with a pre-defined group. For example, and SPS PDSCH occasion may be associated with a first group, wherein the activation DCI indicates an index of the first group. For example, an SPS release PDCCH may be associated with a pre-defined group. For example, the SPS release PDCCH may indicate an index of a group.

The base station may schedule a first PDSCH with a PDSCH-to-HARQ-feedback timing, e.g. K1 value, in a channel occupancy time (COT) with a first group index. The PDSCH-to-HARQ-feedback timing may have a non-numerical/inapplicable value. The BS may schedule one or more PDSCHs after the first PDSCH in the same COT, and may assign the first group index to the one or more PDSCHs. At least one of the one or more PDSCHs may be scheduled with a numerical K1 value.

The DCI may indicate a new ACK-feedback group indicator (NFI) for each PDSCH group. The NFI may operate as a toggle bit. For example, the UE may receive a DCI that indicates the NFI is toggled for a PDSCH group. The UE may discard one or more HARQ feedbacks for one or more PDSCHs in the PDSCH group. The one or more PDSCHs may be associated/scheduled with one or more non-numerical K1 values and/or numerical K1 values. The UE may expect DAI values of the PDSCH group to be reset.

The UE may be configured with enhanced dynamic codebook. The UE receive a first DCI format (e.g. DCI format 1_0) scheduling one or more PDSCHs. The one or more PDSCHs may be associated with a PDSCH group (e.g. a pre-defined PDSCH group, e.g. group #0). The first DCI format may not indicate an NFI value for the PDSCH group. The UE may determine the NFI value based on a second DCI format (e.g. DCI format 1_1) indicating the NFI value for the PDSCH group. The UE may detect the second DCI format since a last scheduled PUCCH and before a PUCCH occasion, wherein the second PUCCH occasion may comprise HARQ feedback corresponding to a PDSCH scheduled with the first DCI format. The last scheduled PUCCH may comprise HARQ feedback for the PDSCH group. The UE may not detect the second DCI that indicates the NFI value for the PDSCH group, and the UE may assume that the one or more PDSCHs scheduled by the first DCI format do not belong to any PDSCH group, and the UE may report the HARQ feedback of at least one PDSCH scheduled by the first DCI format since a latest PUCCH occasion.

A DCI may request/trigger HARQ feedback for one or more groups of PDSCHs, e.g. via a same PUCCH/PUSCH resource. HARQ feedbacks for multiple DL transmissions, e.g. PDSCHs, in a same group, may be transmitted/multiplexed in a same PUCCH/PUSCH resource. Counter DAI and total DAI values may be incremented/accumulated within a PDSCH group.

A UE may postpone transmission of HARQ-ACK information corresponding to PDSCH(s) in a PUCCH for K1 values that result in a time T, being the time between a last symbol of the PDSCH(s) and a starting symbol of the PUCCH, that is less than a required processing time for PUCCH transmission.

The UE may receive a downlink signal (e.g. RRC and/or DCI) scheduling a PDSCH. The UE may be configured with enhanced dynamic codebook HARQ feedback operation. The PDSCH may be scheduled with a non-numerical value for PDSCH-to-HARQ-feedback timing, e.g. K1. The UE may derive/determine a HARQ-ACK timing information for the PDSCH by a next/later DCI. The next DCI may be a DL DCI scheduling one or more PDSCHs. The next DCI may comprise a numerical K1 value, indicating one or more PUCCH/PUSCH resources for HARQ feedback transmission of one or more DL transmissions, comprising the PDSCH. The next DCI may trigger HARQ feedback transmission for one or more PDSCH groups comprising a group of the PDSCH. The UE may derive/determine the HARQ-ACK timing information for the PDSCH by a last/earlier DCI.

The UE may receive a first DCI scheduling a PDSCH with non-numerical K1 value. For (non-enhanced) dynamic HARQ-ACK codebook, the UE may determine/derive a HARQ-ACK timing for the PDSCH scheduled with non-numerical K1 value, by a second DCI. The second DCI may schedule a second PDSCH with a numerical K1 value. The UE may receive the second DCI after the first DCI.

The base station may transmit a DCI requesting/triggering HARQ feedback of a HARQ-ACK codebook containing one or more or all, DL HARQ processes (e.g., one-shot feedback request). The one-shot feedback request may be for one or more or all component carriers configured for the UE. One-shot feedback may be configured separately from a HARQ-ACK codebook configuration.

The wireless device may transmit HARQ feedback of one or more PDSCHs in response to receiving a one-shot feedback request. A last/latest PDSCH for which an acknowledgment is reported in response to receiving the one-shot feedback request, may be determined as a last PDSCH within a UE processing time capability (e.g. baseline capability, N1). The UE may report HARQ-ACK feedback for one or more earlier PDSCHs scheduled with non-numerical K1 value. The one-shot feedback may be requested in a UE-specific DCI. The one-shot feedback may request HARQ feedbacks to be reported in a PUCCH. The HARQ feedback may be piggybacked on/multiplexed in a PUSCH.

The wireless device may be configured to monitor feedback request for one-shot HARQ-ACK codebook feedback. The feedback may be requested in a DCI format (e.g., DCI format 1_1). The DCI format may or may not schedule DL transmission (e.g., PDSCH). The DCI format may comprise a first field (e.g., a frequency domain resource allocation field) indicating a first value. The UE may determine that the DCI format does not schedule a PDSCH in response to the first field indicating the first value. The UE may ignore/discard one or more second fields of the DCI format (e.g., a HARQ process number and/or NDI field) in response to the determining. The UE may be scheduled to report one-shot feedback and one or more other HARQ-ACK feedbacks in a same slot/subframe/resource, and the UE may report only the one-shot feedback.

In a one-shot codebook, one or more NDI bits may follow one or more HARQ-ACK information bits for each of one or more TBs. The HARQ-ACK information bits and the corresponding NDI may be ordered in the one-shot codebook as follows: first in an increasing order of CBG index, second in an increasing order of TB index, third in an increasing order of HARQ process ID, and fourth in an increasing order of serving cell index.

The wireless device may transmit the HARQ-ACK for a PDSCH, that is scheduled with non-numerical K1 value, via one-shot HARQ feedback. The wireless device may not include the HARQ-ACK for a PDSCH, that is scheduled with non-numerical K1 value, in a semi-static codebook. The wireless device may include the HARQ-ACK for a PDSCH, that is scheduled with non-numerical K1 value, in a semi-static codebook. With semi-static codebook, HARQ-ACK timing for a PDSCH scheduled with a non-numerical K1 may be derived based on the next DL DCI scheduling PDSCH with a numerical K1 value. A wireless device may report HARQ-ACK in the appended bit container. With dynamic codebook, HARQ-ACK timing for a PDSCH scheduled with DCI indicting a non-numerical K1 may be derived based on the next DCI scheduling PDSCH with a numerical K1 value. The wireless device may expect that DAI is reset for PDSCH transmitted later than N1 symbols before PUCCH transmission.

In an example, different types of traffic may be available for transmission to/from a wireless device in a network, e.g., Ultra-Reliable Low-Latency Communications (URLLC) and/or enhanced Mobile BroadBand (eMBB). Different types of traffic may have/be associated with different priorities, e.g., in terms of power and/or reduced latency and/or etc. The base station may scheduled transmissions associated with different typed of traffic for a wireless device at the same time. For example, the base station may schedule a first transmission associated with a URLLC traffic and a second transmission associated with eMBB traffic. In an example, the first transmission associated with a URLLC traffic may have higher priority than the second transmission associated with eMBB traffic.

In an example, the base station may schedule the first transmission/channel of low priority on first time/frequency resources. The base station may determine that a second transmission/channel of high priority has arrived/is ready for scheduling, e.g., after the first transmission/channel is scheduled. The base station may schedule the second transmission on second time/frequency resources. The second time/frequency resources may overlap with the first time/frequency resources. In the downlink, the base station may have the flexibility to prioritize a first DL transmission of high priority over a second DL transmission of low priority. However, in the uplink, the base station may need to indicate to the wireless device which of overlapping UL transmissions/channels (PUSCH and/or PUCCH) is of higher/lower priority, so that the wireless device may determine which one to transmit. The priorities may be physical layer priorities, independent/different from logical channel priorities of higher layer(s).

A PUSCH and/or PUCCH transmission, comprising repetition(s) if any, may be of low priority (e.g., associated with priority index 0 and/or a first value) or of high priority (e.g., associated with priority index 1 and/or a second value).

The wireless device may monitor PDCCH to receive a DCI scheduling PUSCH. The DCI may comprise a field (e.g., a priority indicator field) indicating a priority index for the scheduled PUSCH transmission. The scheduled PUSCH transmission may be of any priority, comprising low priority and high priority. For example, the priority indicator field may comprise a first value indicating a first priority (e.g., priority index 0, low priority). For example, the priority indicator field may comprise a second value indicating a second priority (e.g., priority index 1, high priority).

For example, the wireless device may receive RRC message(s) comprising configuration parameters of PUSCH. For a configured grant (CG) PUSCH transmission, the configuration parameters may comprise a first parameter (e.g., phy-PriorityIndex) indicating a physical layer priority for the CG PUSCH, at least for PHY-layer collision handling. For example, the first parameter may comprise a first value indicating a low priority and/or a second value indicating a high priority.

For example, for a PUSCH transmission with semi-persistent CSI report, a UE may determine a priority index from a priority indicator field, if provided, in a DCI format that activates the semi-persistent CSI report.

The wireless device may monitor PDCCH to receive a DCI scheduling PDSCH. The DCI may comprise a field (e.g., a priority indicator field) indicating a priority index for the PUCCH transmission corresponding to the scheduled PDSCH. The scheduled PDSCH reception and the triggered PUCCH transmission may be of any priority, comprising low priority and high priority. For example, the priority indicator field may comprise a first value indicating a first priority (e.g., priority index 0, low priority). For example, the priority indicator field may comprise a second value indicating a second priority (e.g., priority index 1, high priority).

For example, the wireless device may receive RRC message(s) comprising configuration parameters of PDSCH for one or more cells. The configuration parameters may comprise a parameter (e.g., pdsch-HARQ-ACK-CodebookList) indicating how many and/or what type (semi-static and/or dynamic) of HARQ-ACK codebooks the wireless device may simultaneously generate for PDSCHs. For example, the parameter may indicate to generate one HARQ-ACK codebook, and the HARQ-ACK codebook may be associated with a PUCCH of a first priority (e.g., priority index 0, low priority). For example, the parameter may indicate to generate two (or more) HARQ-ACK codebooks, and each of the HARQ-ACK codebooks may be associated with a PUCCH of a first priority (e.g., priority index 0, low priority) or a second priority (e.g., priority index 1, high priority). For example, the wireless device may determine to generate two HARQ-ACK codebooks, e.g., based on the parameter. A first HARQ-ACK codebook may be associated with a PUCCH of the first priority (e.g., priority index 0/low) and a second HARQ-ACK codebook may be associated with a PUCCH of the second priority (e.g., priority index 1/high). The wireless device may multiplex in a same HARQ-ACK codebook HARQ-ACK information associated with a same priority index. The wireless device may not multiplex in a same HARQ-ACK codebook HARQ-ACK information associated with different priority indexes.

For example, the wireless device may receive RRC message(s) comprising configuration parameters of downlink semi-persistent scheduling (SPS) and/or of PUCCH. For a PUCCH transmission comprising feedback (e.g., HARQ-ACK) information corresponding to a SPS PDSCH reception and/or a SPS PDSCH release, the configuration parameters may comprise a first parameter (e.g., harq-CodebookID) indicating a physical layer priority for the CG PUSCH, at least for PHY-layer collision handling. For example, the first parameter may comprise a first value indicating a low priority and/or a second value indicating a high priority.

In an example, the wireless device may not receive an in indication of a priority of an uplink transmission. If a priority index is not provided to the wireless device for a PUSCH or a PUCCH transmission, the wireless device may determine a first priority (e.g., priority index may be 0/low priority).

A wireless device may determine overlapping PUCCH and/or PUSCH transmissions of different priority indexes, e.g., comprising repetitions if any. The wireless device may resolve the overlapping PUCCH and/or PUSCH transmissions of same priority index (e.g., smaller priority index or larger priority index), e.g., by determining to multiplex one or more UCIs (e.g., comprising control information of same priority index) in a first PUCCH and/or first PUSCH of the overlapping PUCCHs and/or PUSCHs. In an example, a transmission of a first PUCCH of larger priority index, scheduled by a DCI format in a PDCCH reception, may overlap in time with a transmission of a second PUSCH and/or a second PUCCH of smaller priority index. The wireless device may cancel (a repetition of) the transmission of the second PUSCH and/or the second PUCCH, e.g., before a first symbol that would overlap with the first PUCCH transmission. In an example, a transmission of a first PUSCH of larger priority index, scheduled by a DCI format in a PDCCH reception, may overlap in time with a transmission of a second PUCCH of smaller priority index. The wireless device may cancel (a repetition of) the transmission of the second PUCCH before a first symbol that would overlap with the first PUSCH transmission. In an example, the overlapping may be applicable before or after resolving overlapping among channels of larger priority index, if any.

The wireless device may expect that the transmission of the first PUCCH or the first PUSCH, respectively, may not start before a gap (e.g., $T_{proc,2}+d_1$) after a last symbol of the corresponding PDCCH reception. The gap (e.g., $T_{proc,2}$) may be associated with a PUSCH preparation time for a corresponding wireless device processing capability.

A wireless device may be scheduled by a DCI format in a first PDCCH reception to transmit a first PUCCH or a first PUSCH of larger priority index that overlaps with a second PUCCH or a second PUSCH transmission of smaller priority index that, if any, may be scheduled by a DCI format in a second PDCCH. The gap (e.g., $T_{proc,2}$) may be based on a value of μ corresponding to a smallest SCS configuration of the first PDCCH, the second PDCCHs, the first PUCCH or the first PUSCH, and the second PUCCHs or the second PUSCHs.

A wireless device may transmit one or more channels, comprising repetitions if any, that may overlap in time. The wireless device may cancel (a repetition of) the PUCCH/PUSCH transmissions of smaller priority index before a first symbol overlapping with the PUCCH/PUSCH transmission of larger priority index, e.g., if (the repetition of) the PUCCH/PUSCH transmissions of smaller priority index overlap in time with the PUCCH/PUSCH transmissions of larger priority index. The one or more channels may comprise: a first PUCCH of larger priority index comprising SR and a second PUCCH or PUSCH of smaller priority index; a configured grant PUSCH of larger priority index and a PUCCH of smaller priority index; a first PUCCH of larger priority index comprising HARQ-ACK information in response to a PDSCH reception without a corresponding PDCCH (e.g., SPS PDSCH) and a second PUCCH of smaller priority index comprising SR and/or CSI, or a configured grant PUSCH with smaller priority index, or a PUSCH of smaller priority index comprising SP-CSI report(s) without a corresponding PDCCH; a PUSCH of larger priority index comprising SP-CSI reports(s) without a corresponding PDCCH and a PUCCH of smaller priority index comprising SR, and/or CSI, and/or HARQ-ACK information in response to a PDSCH reception without a corresponding PDCCH; and a configured grant PUSCH of larger priority index and a configured PUSCH of lower priority index on a same serving cell.

A wireless device may not expect to be scheduled to transmit a PUCCH or a PUSCH with smaller priority index that may overlap in time with a PUCCH of larger priority index comprising HARQ-ACK information in response to a PDSCH reception without a corresponding PDCCH. A wireless device may not expect to be scheduled to transmit a PUCCH of smaller priority index that may overlap in time with a PUSCH of larger priority index comprising SP-CSI report(s) without a corresponding PDCCH. A wireless device may not transmit a PUSCH, e.g., if the wireless device determines on a serving cell a PUSCH without UL-SCH that overlaps with a PUCCH transmission on a serving cell that comprises positive SR information.

A wireless device may multiplex UCIs associated with same priority index in a PUCCH or a PUSCH. A PUCCH or a PUSCH may have a same priority index as a priority index of UCIs that the wireless device multiplexes in the PUCCH or the PUSCH. For example, multiplexing or prioritization for overlapping channels may correspond to overlapping channels with same priority index.

Figure 18:
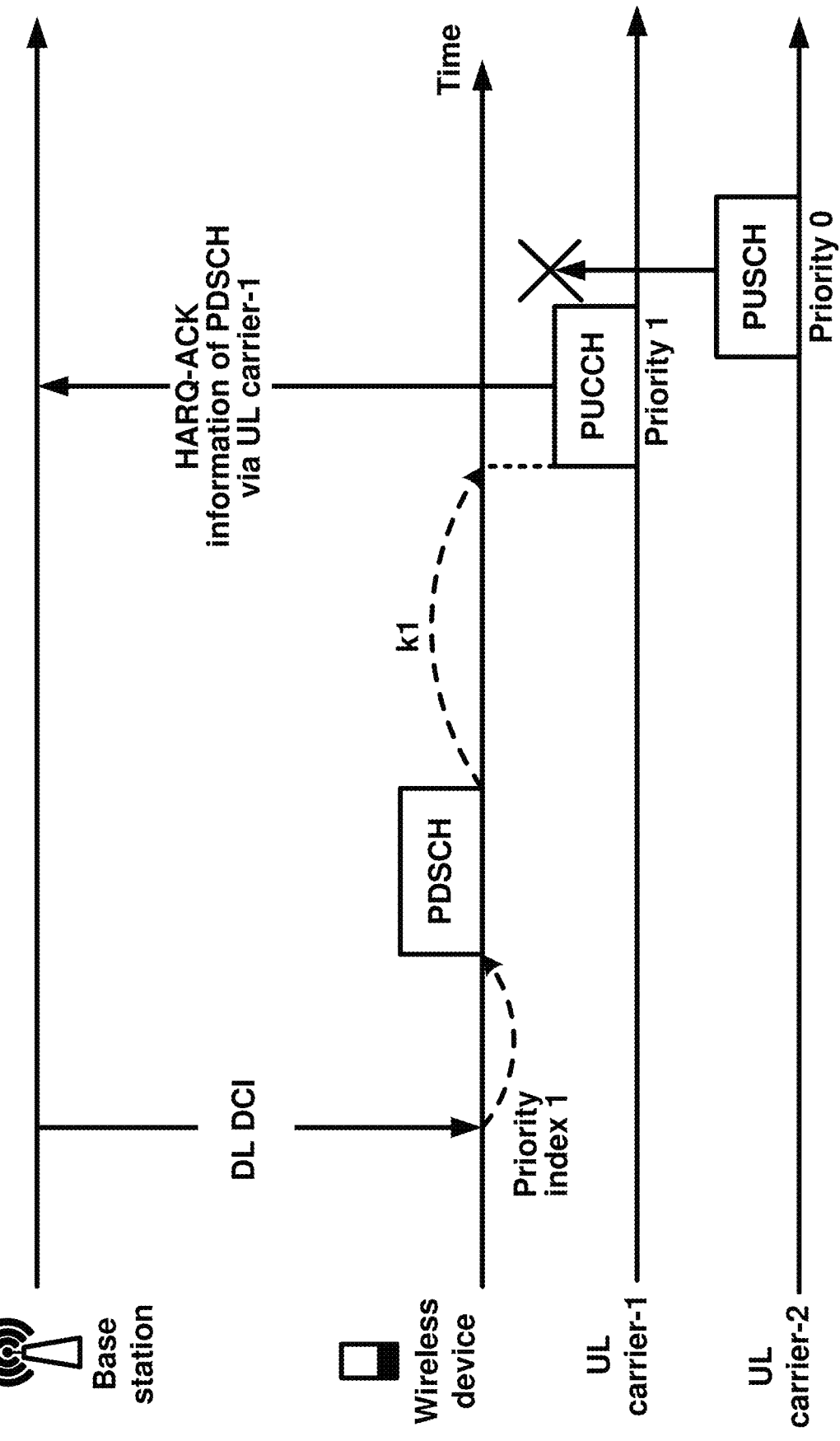
FIG. 18 shows an example of priorities of overlapping uplink transmissions, according to some embodiments.

FIG. 18 shows an example of overlapping uplink transmissions, according to some embodiments. As shown in the figure, the wireless device may receive a DCI scheduling a PDSCH and triggering a PUCCH transmission comprising the feedback information of the scheduled PDSCH. The DCI may comprise a priority indicator field indicating a first priority index for the PDSCH and the PUCCH. For example, the wireless device may determine that the PUCCH transmission is of priority index 1, based on the DCI indication. The DCI may indicate a slot for the HARQ feedback transmission. The wireless device may determine a PUCCH resource on a first UL carrier. The wireless device may determine a PUSCH/PUCCH transmission on a second UL carrier, wherein the second PUSCH/PUCCH transmission overlaps with the PUCCH transmission on the first UL carrier, comprising the HARQ feedback information. The wireless device may determine that the second PUSCH/

PUCCH transmission is of a second priority index (e.g., lower than the first priority index). For example, the wireless device may determine that the second PUSCH/PUCCH transmission is of priority index 0, based on a DCI indication and/or RRC parameter associated with the second PUSCH/ PUCCH. The wireless device may transmit the PUCCH transmission of the higher priority (e.g., associated with priority index 1). The wireless device may drop/cancel transmission of the second PUSCH/PUCCH transmission of the lower priority (e.g., associated with priority index 0).

Figure 19:
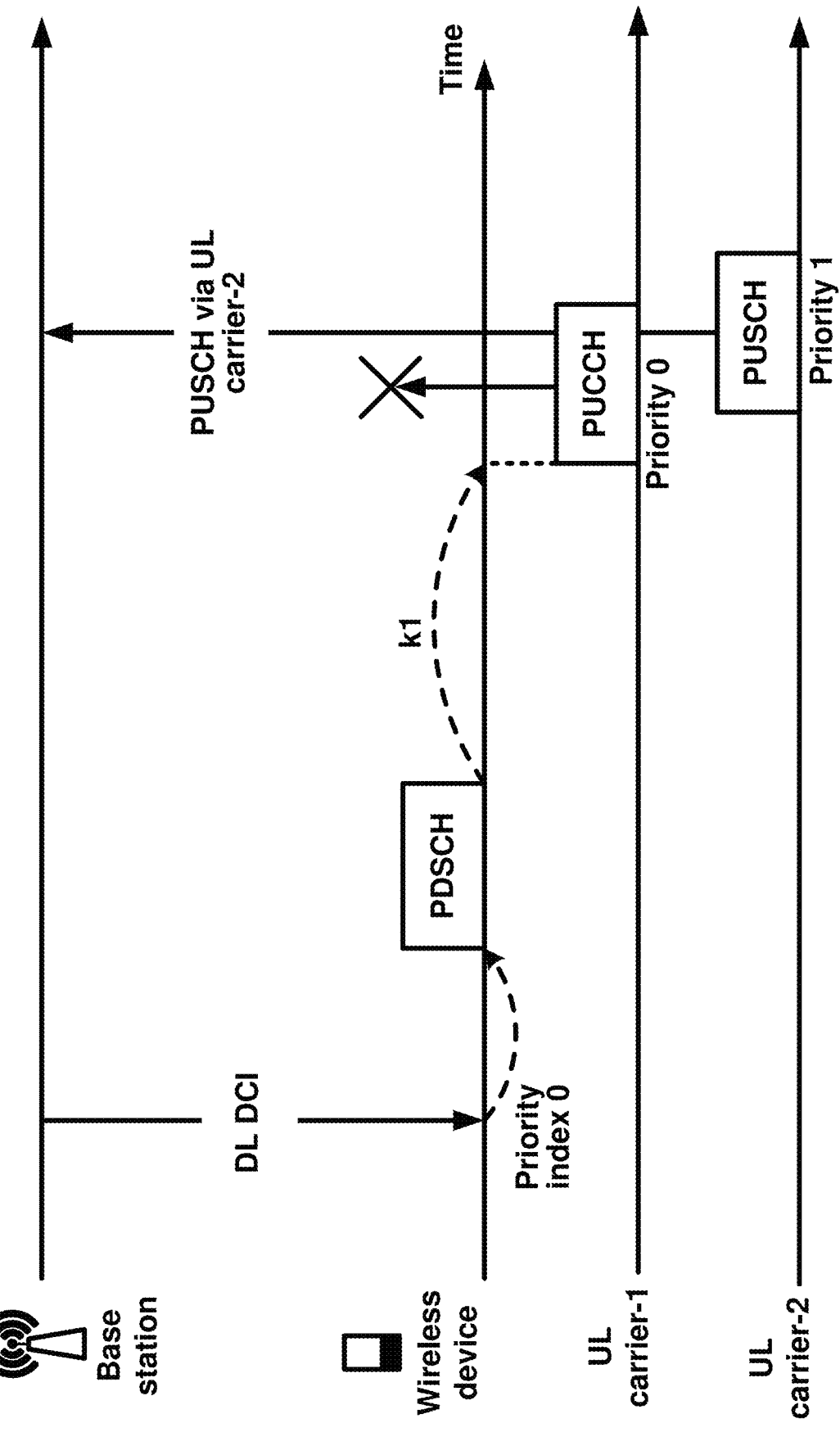
FIG. 19 shows an example of priorities of overlapping uplink transmissions, according to some embodiments.

FIG. 19 shows an example of overlapping uplink transmissions, according to some embodiments. As shown in the figure, the wireless device may receive a DCI scheduling a PDSCH and triggering a PUCCH transmission comprising the feedback information of the scheduled PDSCH. The DCI may comprise a priority indicator field indicating a first priority index for the PDSCH and the PUCCH. For example, the wireless device may determine that the PUCCH transmission is of priority index 0, based on the DCI indication. The DCI may indicate a slot for the HARQ feedback transmission. The wireless device may determine a PUCCH resource on a first UL carrier. The wireless device may determine a PUSCH/PUCCH transmission on a second UL carrier, wherein the second PUSCH/PUCCH transmission overlaps with the PUCCH transmission on the first UL carrier, comprising the HARQ feedback information. The wireless device may determine that the second PUSCH/ PUCCH transmission is of a second priority index (e.g., higher than the first priority index). For example, the wireless device may determine that the second PUSCH/PUCCH transmission is of priority index 1, based on a DCI indication and/or RRC parameter associated with the second PUSCH/ PUCCH. The wireless device may transmit the second PUSCH/PUCCH transmission of the higher priority (e.g., associated with priority index 1). The wireless device may drop/cancel transmission of the PUCCH transmission of the lower priority (e.g., associated with priority index 0).

Figure 20:
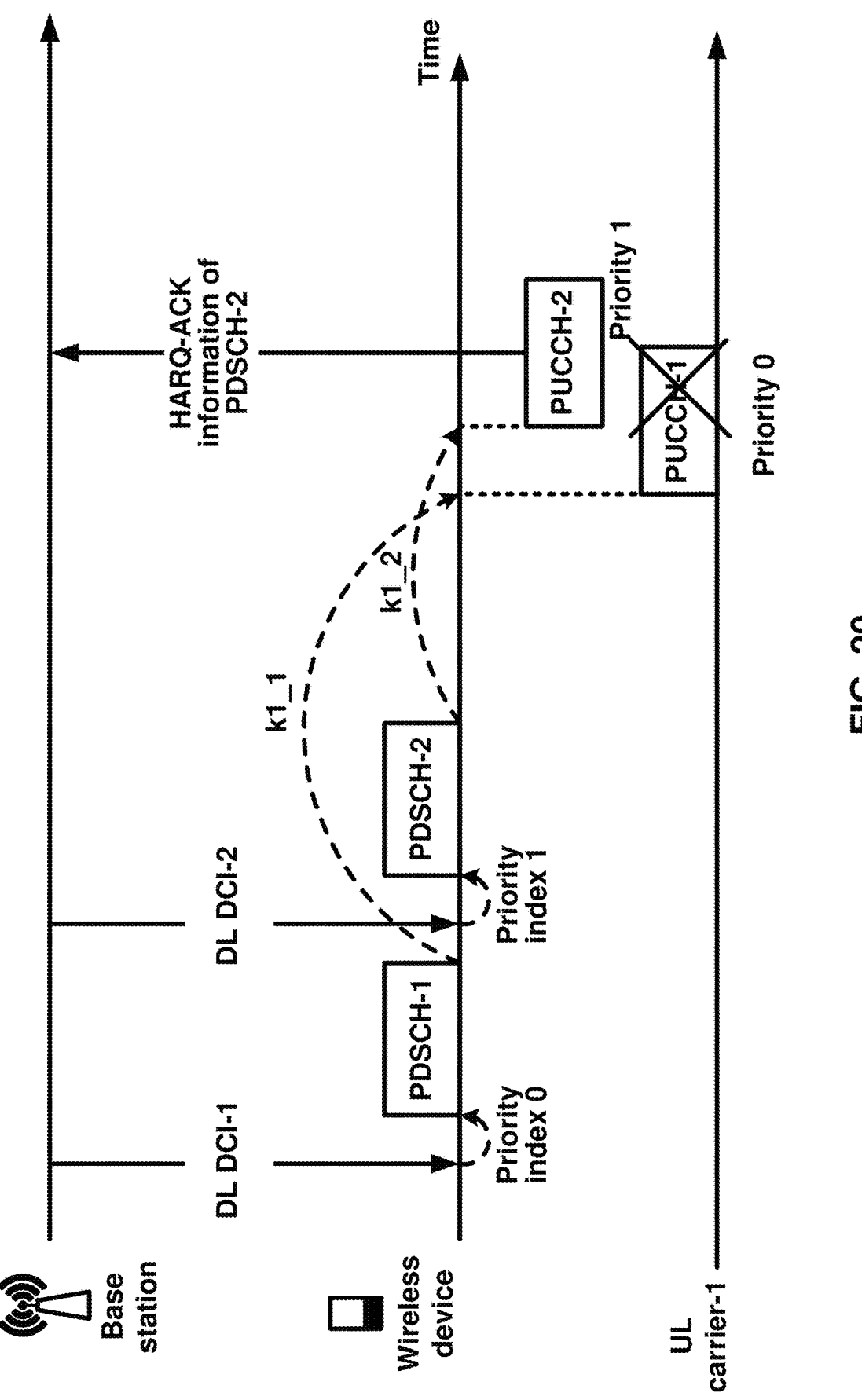
FIG. 20 shows an example of priorities of overlapping uplink transmissions, according to some embodiments.

FIG. 20 shows an example of overlapping uplink transmissions, according to some embodiments. As shown in the figure, the wireless device may receive a first DCI scheduling a first PDSCH and triggering a first PUCCH transmission comprising the first feedback information of the first PDSCH. The first DCI may comprise a priority indicator field indicating a first priority index for the first PDSCH and the first PUCCH. For example, the wireless device may determine that the first PUCCH transmission is of priority index 0, based on the first DCI indication. The first DCI may indicate a slot for the first HARQ feedback transmission. The wireless device may determine a first PUCCH resource on an UL carrier for the first HARQ feedback transmission. The wireless device may receive a second DCI scheduling a second PDSCH and triggering a second PUCCH transmission comprising the second feedback information of the second PDSCH. The second DCI may comprise a priority indicator field indicating a second priority index for the second PDSCH and the second PUCCH. For example, the wireless device may determine that the second PUCCH transmission is of priority index 1, based on the second DCI indication. The second DCI may indicate the slot for the second HARQ feedback transmission. The wireless device may determine a second PUCCH resource on the UL carrier for the second HARQ feedback transmission. The wireless device may determine that the first PUCCH transmission and the second PUCCH transmission overlap in time domain. The wireless device may determine that the second PUCCH transmission is of a higher priority index (e.g., priority index 1) than the first PUCCH transmission (of priority index 0). The wireless device may transmit the second PUCCH of the higher priority (e.g., associated with priority index 1). The wireless device may drop/cancel transmission of the first PUCCH of the lower priority (e.g., associated with priority index 0), e.g., before a first symbol that overlaps with the second PUCCH transmission.

Figure 21:
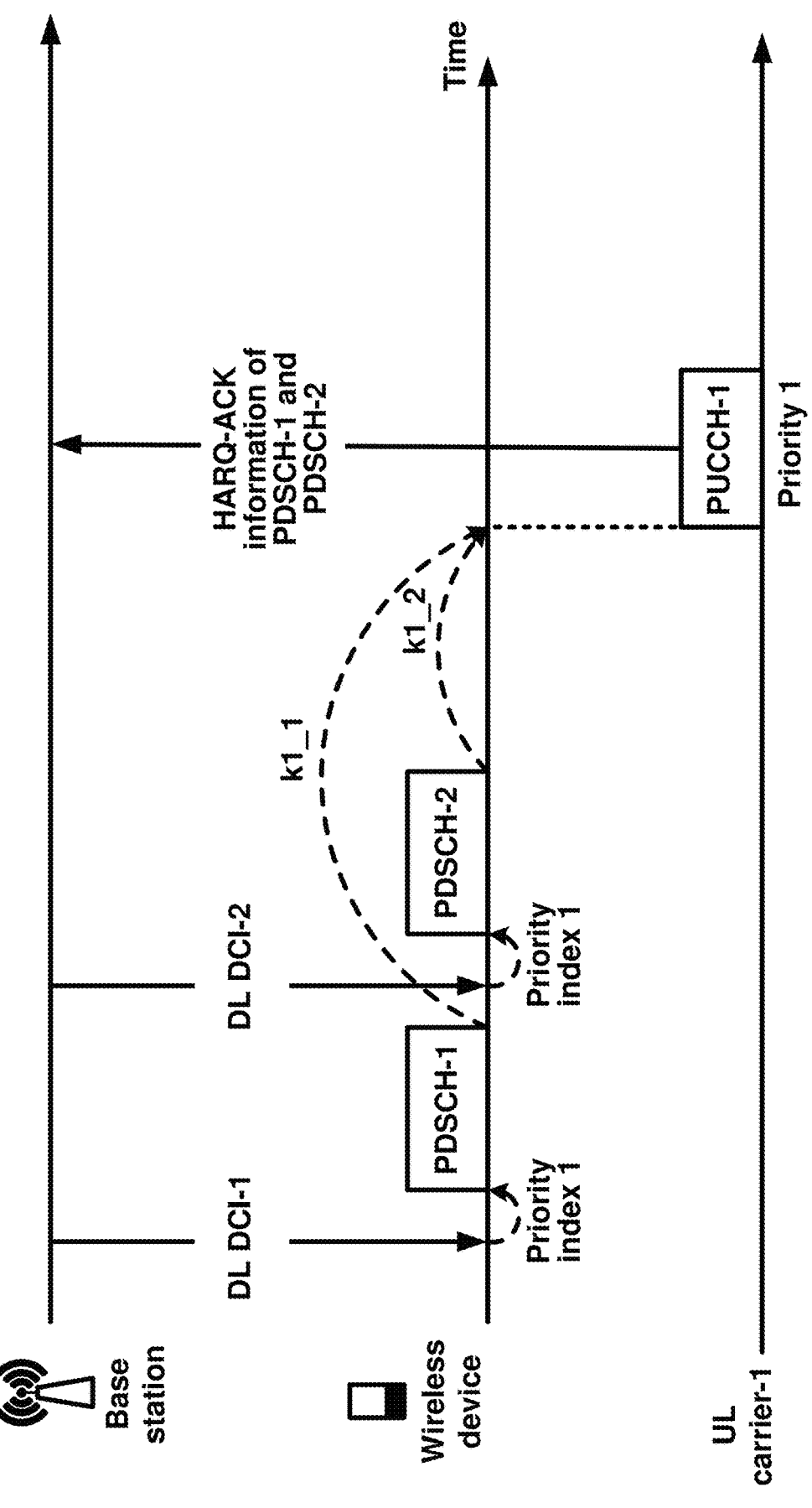
FIG. 21 shows an example of priorities of overlapping uplink transmissions, according to some embodiments.

FIG. 21 shows an example of overlapping uplink transmissions, according to some embodiments. As shown in the figure, the wireless device may receive a first DCI scheduling a first PDSCH and triggering a first PUCCH transmission comprising the first feedback information of the first PDSCH. The first DCI may comprise a priority indicator field indicating a first priority index for the first PDSCH and the first PUCCH. For example, the wireless device may determine that the first PUCCH transmission is of priority index 1, based on the first DCI indication. The first DCI may indicate a slot for the first HARQ feedback transmission. The wireless device may determine a first PUCCH resource on an UL carrier for the first HARQ feedback transmission. The wireless device may receive a second DCI scheduling a second PDSCH and triggering a second PUCCH transmission comprising the second feedback information of the second PDSCH. The second DCI may comprise a priority indicator field indicating the first priority index for the second PDSCH and the second PUCCH. For example, the wireless device may determine that the second PUCCH transmission is of priority index 1, based on the second DCI indication. The second DCI may indicate the slot for the second HARQ feedback transmission. The wireless device may determine a second PUCCH resource on the UL carrier for the second HARQ feedback transmission. In an example, the second PUCCH resource may be the first PUCCH resource. The wireless device may determine that the first PUCCH transmission and the second PUCCH transmission overlap in time domain. The wireless device may determine that the first PUCCH transmission and the second PUCCH transmission are of a same priority index (e.g., priority index 1). The wireless device determine/generate a HARQ-ACK codebook comprising the first feedback of the first PDSCH and the second feedback of the second PDSCH. The HARQ-ACK codebook may be associated with the same priority index (e.g., priority index 1). The wireless device may transmit the HARQ-ACK codebook via one of the first PUCCH and the second PUCCH.

A base station may schedule multiple Transmission Time Intervals (TTIs) for multiple uplink (e.g., PUSCH) transmissions, also referred to as multi-TTI scheduling. For example, each TTI may be scheduled using a separate UL grant (e.g., multiple DCIs) in the same PDCCH monitoring occasion. In another example, a base station may schedule multiple TTIs for multiple PUSCH transmissions, using a single UL grant (e.g., single DCI). For example, multiple (e.g., different) TBs with different HARQ process IDs may be scheduled over the multiple TTIs (e.g., multiple slots/ mini-slots/subslots/subframes). For example, a first (same) TB associated with a first HARQ process ID may be scheduled over the multiple TTIs (e.g., for multiple repetitions) using a single UL grant. The UE may rate-match the first TB across all TTIs. The UE may transmit the first TB with one or more (e.g. different) RVs in different TTIs.

In an example, a TTI may be a subframe, and/or one or more slots, and/or one or more mini-slots. A slot may comprise, e.g., 14 consecutive OFDM symbols. A mini-slot may comprise, e.g., one or more consecutive OFDM symbols, which may be shorter than a slot.

A wireless device may receive one or more RRC messages comprising configuration parameters of one or more PUSCH configurations for at least one BWP of a serving cell. A PUSCH configuration may comprise a PUSCH time domain resource allocation (TDRA) list for a DCI format (e.g. PUSCH-TimeDomainResourceAllocationListForDCI-Format0-1, PUSCH-TimeDomainResourceAllocationList-ForDCI-Format0-2). A PUSCH TDRA list may be used to configure a time domain relation between PDCCH associated with a reception of the DCI format and the PUSCH(s) scheduled by the DCI format. The PUSCH TDRA list may comprise one or more TDRA values (e.g. up to 8). Each TDRA value may indicate time domain scheduling parameters for a PUSCH, e.g. a slot offset (K2) from the PDCCH; a PUSCH mapping type; a starting symbol and length (SLIV) or a starting symbol (S) and a symbol duration of the PUSCH (L); and a number of repetitions. The network may indicate in an uplink grant in the DCI format which of the configured TDRA value(s) in the PUSCH TDRA list the wireless device may apply for the UL grant. The wireless device may determine a bit width of the DCI field (TDRA field in the DCI format) based on a number of entries in the RRC parameter, e.g. the PUSCH TDRA list configured by RRC. A first value in the DCI field may refer to a first entry/element in this RRC list.

A base station may transmit a DCI format to schedule uplink transmission, e.g., PUSCH, in each of one or more transmission time intervals (TTIs) for a UE, e.g. in an unlicensed cell (e.g., License Assisted Access (LAA) SCell and/or NR-U PCell). For example, DCI format OB is used for scheduling of PUSCH in each of multiple subframes in a LAA SCell. In another example, DCI format 4B may be used for scheduling of PUSCH with multi-antenna port transmission mode in each of multiple subframes in a LAA SCell. Such DCI format may be referred to a multi-TTI DCI format.

A multi-TTI DCI format may comprise at least the following information: identifier for DCI formats; carrier indicator; downlink feedback indication (DFI) flag, if the wireless device is configured for operation in a cell with shared spectrum channel access (unlicensed spectrum). In an example, the DCI format may not be for indicating downlink feedback, e.g. the DFI is zero. In an example, the DCI format may be used for scheduling one or multiple PUSCH in at least one cell (e.g. multi-TTI scheduling) and/or activating type 2 configured grant transmission. In the example, the DCI format may comprise at least the following information: UL/SUL indicator; BWP indicator; frequency domain resource assignment (FDRA); one or more time domain resource assignments (TDRA) values for the one or more PUSCHs scheduled by the DCI format; a modulation and coding scheme for the one or more PUSCHs; one or more new data indicators (NDIs) for the one or more PUSCHs; one or more redundancy versions (RVs) for the one or more PUSCHs; a HARQ process number/ID for a first PUSCH of the one or more PUSCHs; at least one downlink assignment index (DAI); CSI request; CBG transmission information; a beta-offset indicator indicating one or more beta-offset values for one or more UCI types comprising HARQ-ACK and/or SR and/or CSI report; a channel access CP extension and/or channel access priority class (CAPC); etc.

In an example, for multi-TTI scheduling and/or single-TTI scheduling for PUSCH, a wireless device may attempt transmitting a PUSCH at a single starting position indicated in the UL grant for this PUSCH.

The base station may schedule time-contiguous transmissions of multiple PUSCHs. The base station may schedule non-time-contiguous transmissions of multiple PUSCHs. For example, multi-TTI scheduling by a single DCI may schedule a plurality of consecutive TTIs. For example, in multi-TTI scheduling, the base station may schedule a plurality of PUSCHs that are continuous in time. A single PUSCH duration may not exceed 14 OFDM symbols. In an example, each PUSCH may be mapped to one slot and/or one mini-slots. In another example, each PUSCH may be mapped to one or more slots and/or one or more mini-slots, e.g., the one or more slots and/or the one or more mini-slots may be consecutive.

Multiple PUSCHs scheduled by the multi-TTI DCI may be contiguous. For example, the network may configure/indicate the TDRA values in the DCI such that the scheduled PUSCHs are contiguous in time. The TDRA list/table configuration (RRC configuration) may allow indicating single or multiple continuous PUSCHs in any slot of the multiple scheduled slots. Each entry/row of the TDRA table/list indicates a number of scheduled PUSCHs by a single DCI. For example, a number of scheduled PUSCHs may be signaled by a number of indicated valid SLIVs in the row/entry/element of the configured PUSCH TDRA list that is signaled/indicated in the scheduling DCI. For example, if the RRC configuration of PUSCH TDRA list (e.g. PUSCH-TimeDomainResourceAllocationList) comprises a row/entry/element indicating TDRA value for multiple contiguous PUSCHs, the slot offset (K2) may indicate the slot where the wireless device may transmit the first PUSCH of the multiple PUSCHs. Each PUSCH may have a separate starting symbol and length (e.g. SLIV) and/or mapping type.

Figure 22:
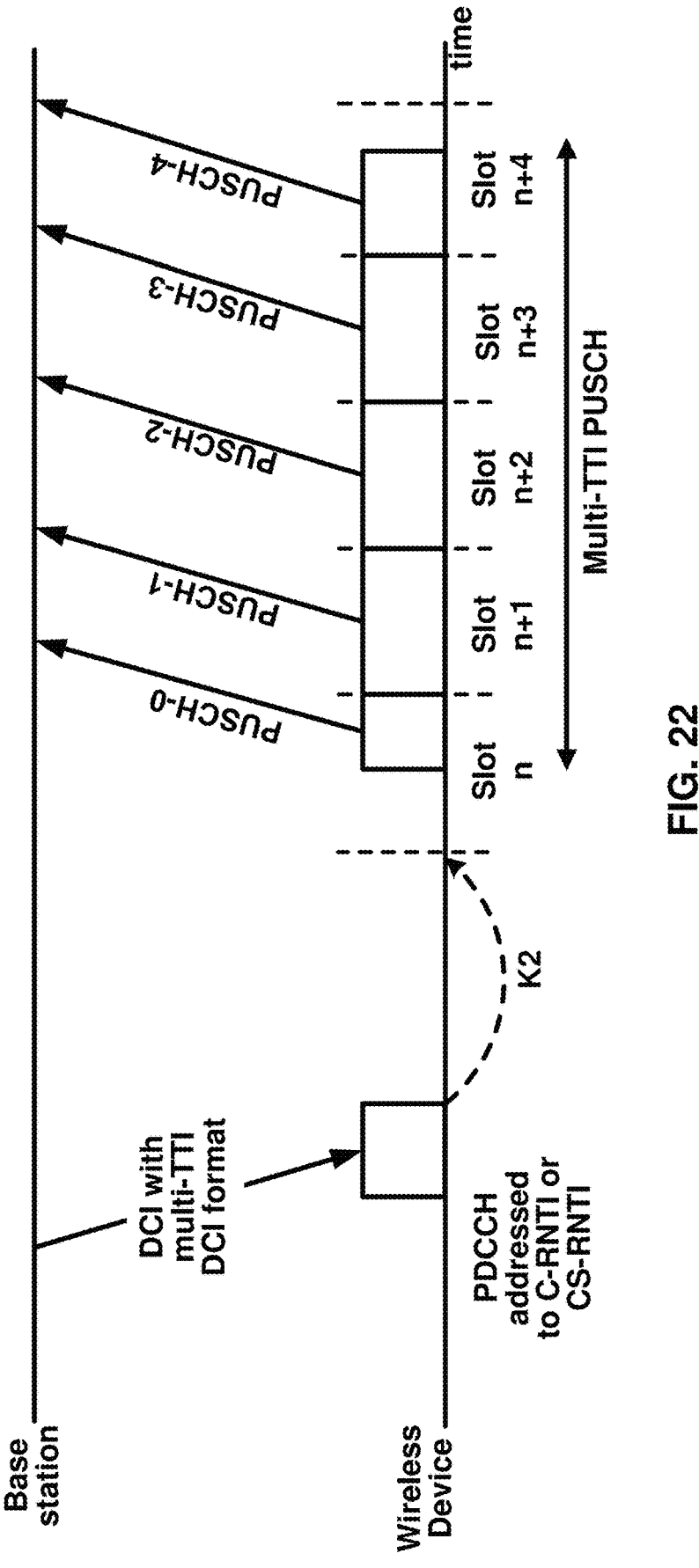
FIG. 22 shows an example of multiple PUSCH scheduling by a single DCI, according to some embodiments.

FIG. 22 shows an example of multiple PUSCH scheduling by a single DCI, according to some embodiments. As shown in the figure, the wireless device may receive a DCI format addressed to a radio network temporary identifier (e.g. C-RNTI or CS-RNTI) of the wireless device in a PDCCH monitoring occasion. The DCI format may comprise a slot offset (K2) indicating a first slot (slot n) comprising a first PUSCH (PUSCH-0). The DCI format may comprise a TDRA field indicating an entry/row of an RRC configured TDRA table, wherein the entry/row may comprise a plurality of TRDA values. For example, the TDRA field in the DCI format in FIG. 18 indicates an entry with 5 TDRA values. The wireless device determines, based on the number of TDRA values indicated by the DCI format, that 5 consecutive/contiguous PUSCHs are configured. The wireless device determines that the first PUSCH (PUSCH-0) starts in a first slot (slot n) indicated by the slot offset (K2) in the DCI format (applied to the PDCCH monitoring occasion of the DCI format). The wireless device determines four more contiguous PUSCHs in the following slots based on the TDRA values indicated by the TDRA field: PUSCH-1 in slot n+1, PUSCH-2 in slot n+2, PUSCH-3 in slot n+3, PUSCH-4 in slot n+4. The wireless device may determine a starting symbol and a length of each PUSCH based on the SLIV indicated by the corresponding TDRA value of that PUSCH. As it can be seen in the figure, PUSCH-0 starts in a symbol number other than #0 in slot n and have a length shorter than 14 symbols. PUSCH-1 and PUSCH-2 and PUSCH-3 start at symbol #0 of the corresponding slots, e.g. slot n+1 and slot n+2 and slot n+3, respectively, and have a duration/length of 14 symbols. PUSCH-4 starts at symbol #0 of slot n+4 and have a length shorter than 14 symbols. As it can be seen, as a result of the indicated TDRA values, the scheduled PUSCHs are contiguous in time and there is no time gap in between the PUSCHs. This results in requiring, if any, only one LBT procedure at the beginning of the burst/multiple PUSCHs.

The base station may schedule discontinuous HARQ IDs for scheduling multiple TBs with different HARQ process IDs in multiple TTIs. The base may indicate in the multi-TTI scheduling DCI a HARQ process ID to be applied to the first scheduled PUSCH, e.g., for the first TTI. For example, the HARQ process ID may be incremented by 1 for subsequent PUSCHs in the scheduled order. For example, modulo operation may be used if the number of scheduled PUSCHs are more than the available/configured number of HARQ IDs.

The base station may signal at least the following information in a DCI scheduling multiple PUSCHs: NDI field with 1 NDI bit per PUSCH; RV field with one or more RV bits per PUSCH; CBGTI field, e.g., per retransmitted PUSCH and/or per PUSCH and/or for a number of PUSCHs; HARQ process ID of a first PUSCH; time domain resource assignment (TDRA) field; CSI request field, e.g., for a single PUSCH; MCS field; LBT (channel access) type; channel access priority class (CAPC); etc.

The multi-TTI DCI may comprise a MCS field indicating one or more MCS indexes (e.g. entry/row of an MCS table). For example, a single MCS index may be signaled for the multiple scheduled PUSCHs. For example, the UE may apply the same behavior for a first PUSCH scheduled for initial transmission and a second PUSCH scheduled for retransmission. For example, the behavior may be: determining the TBsize based on explicitly indicated MCS (e.g., for MCS row 0-27); and/or referring to the DCI scheduling the initial PUSCH transmission to determine the TBsize (e.g., for MCS row 28-31). In an example, a single MCS (e.g., row 0-27) may be indicated in the multi-TTI DCI. For example, the UE may apply different behavior for a first PUSCH scheduled for initial transmission and a second PUSCH scheduled for retransmission. For example, for the first PUSCH scheduled for initial transmission, the UE may determine the TBsize based on the indicated MCS. For example, for the second PUSCH scheduled for retransmission, the UE may refer to the DCI scheduling the initial PUSCH transmission to determine the TBsize. For example, the UE may not expect to receive signaling of a MCS row 28-31 in a multi-TTI DCI. In another example, the MCS field of the multi-TTI DCI may comprise a bitmap. The UE may use the bitmap to determine one or more first PUSCHs to use the indicated MCS row, and one or more second PUSCHs to use a MCS row indicated by the previous DCI scheduling the same TB.

In an example, a multi-TTI DCI may indicate a CSI report request. For example, a DCI scheduling multiple PUSCHs may request a CSI report transmission. The wireless device may determine a first PUSCH/slot from the multiple PUSCHs/scheduled slots for transmission of the CSI report. For example, the wireless device may determine a last or a second last PUSCH/slot to transmit the CSI report. For example, the wireless device may determine the last PUSCH/slot to transmit the CSI report, if the number of scheduled PUSCHs is not more than two. For example, the wireless device may determine the second last (the one before the last) PUSCH/slot to transmit the CSI report, if the number of scheduled PUSCHs is more than two.

For a multi-TTI grant, a wireless device may map generated transport blocks (TBs) internally to different HARQ processes, e.g. in case of LBT failure(s). For example, the wireless device may transmit a TB, pending for transmission in a first HARQ process due to a failed LBT for a first PUSCH transmission associated with the first HARQ process, in a second HARQ process. For example, the second HARQ process may be associated with a second PUSCH for which LBT is successful. The TB may be a new TB, e.g. pending/ready for initial transmission. The wireless device may transmit a new TB on any HARQ process of the multi-TTI grant associated with a second PUSCH. The second PUSCH may have a same TBsize (TBS) and/or same RV as the first PUSCH. The NDI of the second PUSCH may indicate a new transmission. The second PUSCH may not be scheduled for a HARQ process that is associated with a retransmission, otherwise an ambiguity between the wireless device and the base station may occur in identifying the TBs across HARQ processes. So, this may only apply to HARQ processes that are associated with initial transmissions, indicated by the corresponding NDI bit(s).

The existing technology defines frequency ranges for wireless operation. For example, NR Rel-15 and Rel-16 define two frequency ranges (FRs): FR1 spanning from 410 MHz to 7.125 GHz and FR2 spanning from 24.25 GHz to 52.6 GHz. Recent studies reveal a global availability of bands beyond the currently operational frequency ranges, e.g., in the 52.6 GHz to 71 GHz range. The proximity of the higher frequency range to FR2 and the imminent commercial opportunities for high data rate communication makes it compelling for wireless technologies to address operation (e.g., NR operation) in this frequency regime. For example, 3GPP has decided to extend FR2 operation up to 71 GHz, considering both licensed and unlicensed operation, with the adoption of one or more new numerologies (e.g., larger subcarrier spacings). These high frequency bands comprise unlicensed bands (e.g., unlicensed 60 GHz band). Existing procedures (e.g., LAA/NR-U defined procedures) for operation in unlicensed spectrum may be leveraged towards operation in these high frequency unlicensed bands. For channel access, both LBT mode and no-LBT mode may be supported to cover a wide range of use cases and regulatory requirements.

Supporting larger subcarrier spacings (e.g., 120 KHz, 240 KHz, 480 KHz, and 960 KHz) may require enhancements of some existing processing timelines; e.g., processing capability for PUSCH scheduled by RAR UL grant; dynamic SFI and SPS/CG cancellation timing; timeline for HARQ-ACK information in response to a SPS PDSCH release/dormancy; minimum time gap for wake-up and SCell dormancy indication; BWP switch delay; multi-beam operation timing (timeDurationForQCL, beamSwitchTiming, beam switch gap, beamReportTiming, etc.); timeline for multiplexing multiple UCI types; minimum of P switch for search space set group switching; appropriate configuration(s) of scheduling time offsets such as k0 (for PDSCH), k1 (for HARQ), k2 (for PUSCH); PDSCH processing time (N1), PUSCH preparation time (N2), HARQ-ACK multiplexing timeline (N3); CSI processing time, Z1, Z2, and Z3, and CSI processing units; potential enhancements to CPU occupation calculation; related UE capability(ies) for processing timelines; minimum guard period between two SRS resources of an SRS resource set for antenna switching.

Due to higher processing requirements in these high frequency bands and much shorter slot durations, limitations to PDCCH monitoring may be considered. For example, increased minimum PDCCH monitoring unit may be supported to help with UE processing. Time domain scheduling enhancements for PDSCH/PUSCH may be supported, e.g., increasing minimum time-domain scheduling unit to be larger than one symbol, multi-PDSCH scheduled by one DCI (multi-TTI scheduling), mapping one TB to multiple slots (e.g., TTI bundling), etc. Scheduling each PUSCH and/or PDSCH via a separate DCI may waste resources, because many of the signaled parameters may be redundant across the respective DCIs. For example, multiple PDSCH/PUSCH (PxSCH) scheduling with a single DCI (using existing DCI formats or new DCI format(s)) may be supported to reduce scheduling overhead as well as PDCCH monitoring requirements in time domain.

For a wireless device and a serving cell, scheduling multiple PDSCHs by a single DL DCI and scheduling multiple PUSCHs by a single UL DCI may be supported. Each PDSCH/PUSCH may have individual/separate TB(s). Each PDSCH/PUSCH may be confined within a slot. A maximum number of M PDSCHs or PUSCHs may be scheduled with a single DCI (e.g., M=8 or 16 or 32). For multi-PUSCH/PDSCH scheduling, a TDRA table may be configured such that each row indicates up to X multiple PUSCHs/PDSCHs, which may be continuous and/or non-continuous in time domain. Each PUSCH/PDSCH may have a separate SLIV and mapping type. A number of the scheduled PUSCHs/PDSCHs (X) may be signaled by a number of indicated valid SLIVs in the row of the TDRA table signaled in the DCI. The TDRA table may be configured such that each row indicates up to X (e.g. 8) PUSCH/PDSCH groups. The PUSCH/PDSCH groups may be non-continuous. Each PUSCH/PDSCH group may have a separate SLIV, mapping type, and/or number of slots or PUSCHs/PDSCHs (N). Within each group, N PUSCHs/PDSHCs may occupy the same OFDM symbols indicated by the SLIV and mapping type. A number of scheduled PUSCHs/PDSCHs may be the sum of number of PUSCHs/PDSCHs in all PUSCH/PDSCH groups in the row of the TDRA table signaled in DCI (e.g., 1 to M).

For multi-PUSCH/PDSCH scheduling, CBG (re)transmission may or may not be supported. Ultra Reliable Low Latency Communications (URLLC) related fields such as priority indicator and/or open-loop power control parameter set may be indicated in the DCI for multiple scheduled PUSCHs/PDSCHs. For multiple PUSCHs/PDSCHs scheduled by a single DCI, NDI and/or RV may be signaled per PUSCH/PDSCH. A number of NDI bits and/or RV bits in the DCI may be determined based on the configured TDRA table. HARQ process ID signaled in the DCI may apply to a first scheduled PUSCH/PDSCH of the multiple PUSCHs/PDSCHs scheduled by the DCI. HARQ process ID may be incremented by 1 for subsequent PUSCHs/PDSCHs in the scheduled order (with modulo operation as needed). Same FDRA and/or MCS value indicated by the DCI may be applied to all scheduled PUSCHs/PDSCHs.

For a DCI scheduling multiple PDSCHs, a slot offset k0 (indicated by the TDRA field in the DCI) may indicate a gap between a slot of the scheduling DCI (e.g., the PDCCH reception slot) and a first slot of the multiple slots of PDSCHs scheduled by the DCI. For example, k0 may indicate the slot offset between the DCI and an earliest PDSCH scheduled by the DCI.

For multi-PDSCH scheduling, multiple HARQ-ACKs corresponding to the multi-PDSCHs may be fed back. For a DCI scheduling multiple PDSCHs, HARQ-ACK information corresponding to PDSCHs scheduled by the DCI may be multiplexed in a single PUCCH in a first slot. The first slot may be determined based on a first offset, K1. The first offset may be indicated by the DCI, e.g., by a PDSCH-to-HARQ feedback timing indicator field in the DCI. The first offset may be indicated by RRC signaling, e.g., provided by dl-DataToUL-ACK if the PDSCH-to-HARQ feedback timing indicator field is not present in the DCI. The first offset (K1) may indicate a slot offset between a slot of a last PDSCH scheduled by the DCI and a slot carrying the HARQ-ACK information corresponding to the scheduled PDSCHs.

Figure 23:
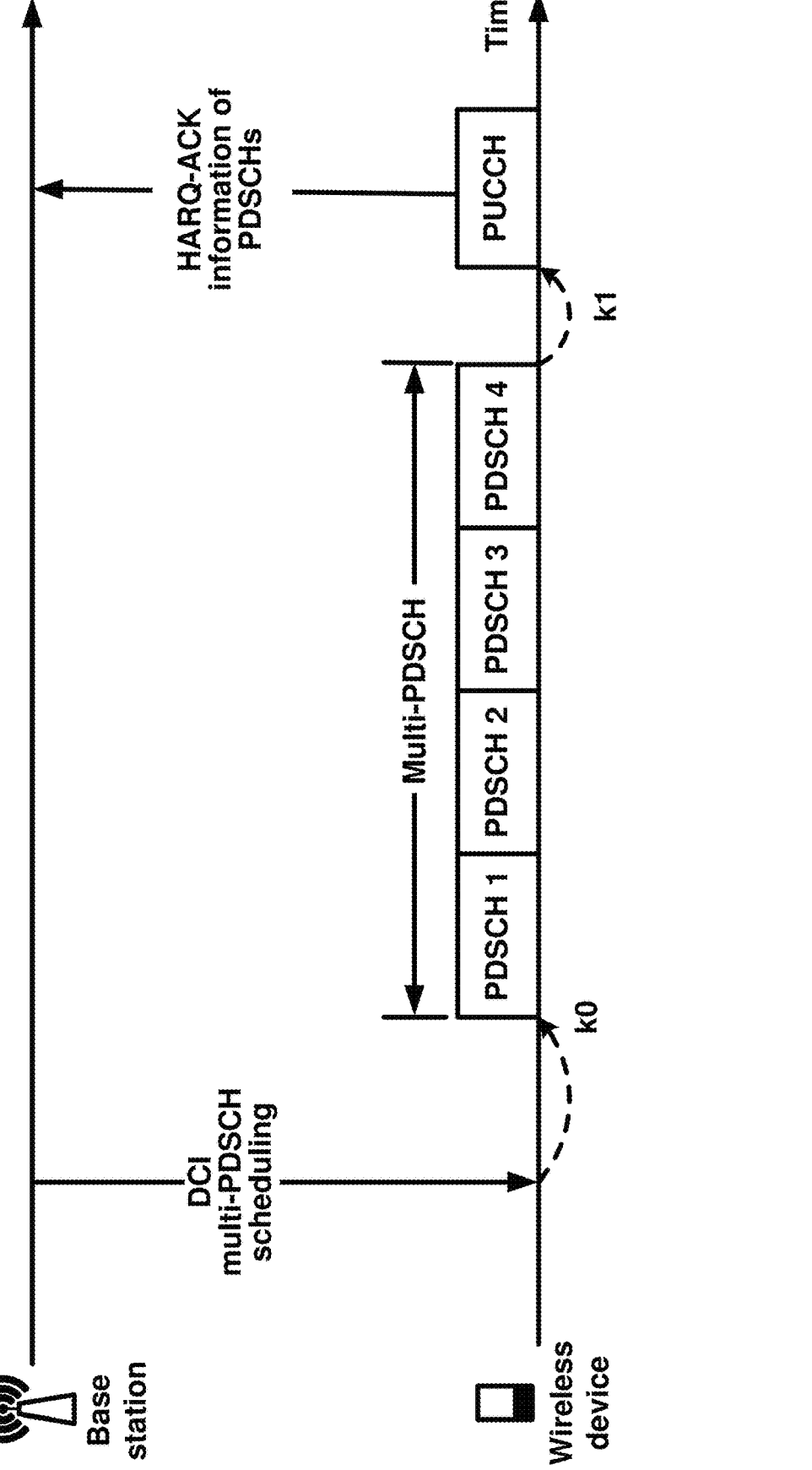
FIG. 23 shows an example of multiple PDSCH scheduling by a single DCI, according to some embodiments.

FIG. 23 shows an example of HARQ-ACK transmission associated with a DCI scheduling multiple PDSCHs, according to some embodiments. As shown in the figure, the DCI indicates a k0 slot offset and a k1 slot offset. The wireless device determines a first slot associated with a first PDSCH of the multiple scheduled PDSCHs (PDSCH 1) by applying the k0 slot offset to a slot where the DCI is received. The wireless device determines a number of scheduled PDSCHs based on the DCI, e.g., the TDRA field in the DCI. In this figure, the wireless device determines four PDSCHs scheduled by the DCI. The multiple PDSCHs may be scheduled in one or more slots starting from the first slot indicated by the k0 slot offset. The multiple PDSCHs may be in consecutive slots. The multiple PDSCHs may be continuous and/or discontinuous, e.g., a non-zero gap may or may not be between adjacent PDSCHs scheduled by the DCI. The wireless device may determine a second slot for HARQ-ACK transmission of the multiple PDSCHs via a PUCCH based on the k1 slot offset. The wireless device may apply the k1 slot offset to a slot of the last scheduled PDSCH (PDSCH 4) to determine the second slot. The wireless device may transmit HARQ-ACK information associated with all the scheduled PDSCHs via the PUCCH resource in the second slot.

A PDSCH processing time may be considered, e.g., a first symbol of the PUCCH comprising the HARQ-ACK information of PDSCHs scheduled by the DCI, may not start earlier than a time gap after a last symbol of a PDSCH reception associated with the HARQ-ACK information (e.g., the last PDSCH). The time gap may be given by the UE PDSCH processing capability in the corresponding frequency band.

In an example, a scheduler (e.g., base station) may be prohibited to indicate a HARQ feedback timing earlier than a PDSCH processing time for a last PDSCH of the multi-PDSCH scheduled by a single DCI. However, flexibility of HARQ feedback scheduling may be degraded. Moreover, an impact on HARQ feedback latency especially for the earliest scheduled PDSCHs may be problematic, e.g., for URLLC traffic.

In an example, HARQ-ACK information corresponding to different PDSCHs scheduled by a single DCI may be carried by different PUCCH(s), e.g., in different slots. In an example, the DCI may indicate HARQ-ACK timing earlier than the PDSCH processing time for the last PDSCH(s). In an example, the wireless device may postpone HARQ feedback of one or more of the multiple PDSCHs scheduled by a DCI. The base station may trigger feedback of the postponed HARQ-ACKs later, e.g., using a second DCI (as in non-numerical K1 indication).

In existing technologies, a single DCI may schedule a single downlink reception, e.g., PDSCH. The downlink reception may comprise repetition(s) of the transport block; however, physical-layer priority(ies) of the repetition(s) are the same. The scheduling DCI may comprise a field (e.g., 1 bit) indicating the priority of the scheduled PDSCH reception as well as the triggered PUCCH transmission comprising feedback of the scheduled PDSCH. In existing technologies, there may be a fixed one-to-one mapping between a PDSCH reception and a respective PUCCH transmission indicated by a DCI, and thus, a single priority index may apply to both the scheduled PDSCH reception and the respective PUCCH transmission.

With the introduction of multi-PDSCH scheduling, a single DCI may schedule multiple PDSCHs (e.g., up to 8, 16, or 32). By applying the existing technologies, however, the network would be scheduling only PDSCHs of a same priority, which is highly restrictive and reduces scheduling flexibility. In an example, the network may schedule multiple PDSCHs of different priorities. For example, the base station may determine arrival of one or more first transport blocks associated with a first priority (e.g., a low priority service/application) for a wireless device, and the base station may schedule the one or more first transport blocks over one or more first PDSCHs of the multiple PDSCHs scheduled by the DCI. The base station may determine arrival of one or more second transport blocks associated with a second priority (e.g., a high priority service/application) for the wireless device, and may schedule the one or more second transport blocks over one or more second PDSCHs of the multiple PDSCHs scheduled by the DCI. The base station may use a single DCI for scheduling both types of services with different priorities, e.g., due to reduced PDCCH monitoring and/or scheduling overhead.

In multi-PDSCH scheduling, there may not be a one-to-one mapping between a PDSCH reception and a respective PUCCH transmission indicated by a DCI. Thus, the single priority index indicated by the scheduling DCI in the existing technologies may not be sufficient/efficient for the multi-PDSCH scheduling. For example, one or more first PDSCHs of the multiple PDSCHs may be of a first priority and one or more second PDSCHs of the multiple PDSCHs may be of a second priority. Currently, the scheduling DCI may not be able to indicate priority indexes, independently, for each of the multiple PDSCHs scheduled by the DCI. For example, if the DCI indicates a single priority index for all the PDSCHs scheduled by the DCI, this DCI implementation would incur scheduling restrictions and/or a significantly reduced flexibility for the network. For example, only same priority traffic may be scheduled using a DCI which may schedule multiple PDSCH receptions over an increased number of slots, and for scheduling a traffic with different priority, which may be higher priority, the base station may have to wait until after the multiple PDSCH receptions are over. This prolonged wait time may be very inefficient and may increase a latency in downlink communications. There is a need for a DCI format scheduling multiple PDSCHs to indicate priority indexes for each of the PDSCHs independently and/or in a way that scheduling PDSCHs of different priorities is made possible by a single DCI.

By applying the existing technologies, HARQ feedback associated with PDSCHs of different priorities may not be transmitted in a same PUCCH, e.g., only higher priority feedback may be transmitted via the PUCCH and the lower priority feedback may be dropped. If the multi-PDSCH scheduling DCI triggers a single PUCCH transmission for HARQ feedback of all the scheduled PDSCHs, based on the existing technologies, one or more HARQ feedback of PDSCHs of lower priority may be dropped/cancelled—which is contradictory to the scheduling purpose. There is a need for an enhanced solution enabling efficient transmission of HARQ feedback of all of the multiple PDSCHs of different priorities via one or more PUCCH transmissions triggered by the scheduling DCI. Embodiments may enable HARQ feedback transmission of the multiple PDSCHs, of different priorities, scheduled by a DCI via one or more PUCCH transmissions.

In uplink, a DCI may schedule multiple PUSCHs. The number of the scheduled PUSCHs by a single DCI may be very large (e.g., up to 32 or more), especially for large SCSs. In existing technology, the DCI may comprise a priority indicator field (e.g., 1 bit), indicating a single priority index. The single priority index indicated by the scheduling DCI in the existing technologies may not be sufficient/efficient for the multi-PUSCH scheduling. For example, one or more first PUSCHs of the multiple PUSCHs may be of a first priority and one or more second PUSCHs of the multiple PUSCHs may be of a second priority. Currently, the scheduling DCI may not be able to indicate priority indexes, independently, for each of the multiple PUSCHs scheduled by the DCI. For example, if the DCI indicates a single priority index for all the PUSCHs scheduled by the DCI, this may result in a scheduling restriction and/or a significantly reduced flexibility for the network. For example, only same priority traffic may be scheduled using a DCI which may schedule multiple PUSCH transmissions over an increased number of slots, and for scheduling a traffic with different priority, which may be higher priority, the base station may have to wait until after the multiple PUSCH transmissions are over. This prolonged wait time may be very inefficient and may increase a latency in uplink communications. Therefore, there is a need for a DCI format scheduling multiple PUSCHs to indicate priority indexes for each of the PUSCHs independently and/or in a way that scheduling PUSCHs of different priorities is made possible by a single DCI.

Embodiments may propose one or more solutions for enhanced priority indication for uplink transmission, comprising PUSCH and PUCCH, in a multi-PxSCH (PDSCH/PUSCH) scheduling scenario. Based on the example embodiments, the base station may schedule multiple PDSCHs/PUSCHs with different priorities such that different types of traffic are communicated with reduced delay. For example, embodiments may enable priority indication by the multi-PxSCH scheduling DCI, for each of the scheduled PxSCHs independently. Embodiments may enable scheduling low and high priority PxSCHs by a DCI, while indicating priority indexes for the scheduled PxSCHs by grouping the PxSCHs (implicitly and/or explicitly). The embodiments may enable the wireless device to determine a priority index of one or more PUCCH transmissions comprising HARQ feedback of multiple PDSCHs scheduled by a DCI, wherein the priority indexes of the multiple PDSCHs are different. Embodiments strive to avoid a significantly increased overhead for the scheduling DCI.

Per one or more embodiments of the present disclosure, a wireless device may receive one or more RRC messages from a base station. The one or more RRC messages may comprise a system information block, e.g., SIB 1. The one or more RRC messages may comprise configuration parameters of one or more serving cells. The one or more serving cells may comprise a primary cell and/or at least one secondary cell of a master cell group and/or a secondary cell group. The one or more serving cells may be activated. The one or more serving cells may comprise downlink carrier and/or uplink carrier. The one or more serving cells may comprise a first uplink carrier (e.g., normal UL—NUL) and/or a second uplink carrier (e.g., supplementary UL—SUL).

The configuration parameters may indicate one or more DL BWPs for a downlink carrier/cell. A first DL BWP may be active DL BWP of the cell. The configuration parameters may indicate a first SCS for the first DL BWP. For example, the base station may configure different DL BWPs of a same cell or different cells with same or different SCSs.

The configuration parameters may indicate one or more search spaces for a DL BWP of a cell. The one or more search spaces may comprise PDCCH monitoring occasions/candidates. For example, the configuration parameters may indicate: a monitoring slot periodicity; a monitoring slot offset; a duration for each occurrence upon every period (number of consecutive slots); monitoring symbols within a monitoring slot; and a number of candidates (e.g., aggregation level). In an example, the configuration parameters of the search spaces may indicate a lower number of candidate PDCCHs in time domain (e.g., in a frame duration), such that sparser/less often monitoring is needed at the UE side. In an example, a first SCS of a DL BWP associated with the search spaces may be large (e.g., 480 KHz or 960 KHz). In an example, a second SCS of a DL/UL carrier for which the PDCCH can schedule receptions/transmissions (e.g., cross-carrier scheduling) may be large, e.g., larger than the first SCS of the DL BWP associated with the search space.

The configuration parameters may comprise PDSCH configuration parameters for a DL BWP of a cell. The PDSCH configuration parameters may indicate a time domain resource allocation (TDRA) table/list for scheduling PDSCH on the corresponding DL BWP. The PDSCH configuration parameters may indicate a number of PDSCHs (e.g., a maximum number) that a single DCI may schedule for a cell at the same time. In an example, the wireless device may determine a bit width (size) of a DCI field based on the number of entries in the TDRA table/list. A first value in the DCI field may refer to a first element/entry/row in the TDRA table/list. For example, an element/entry/row of the TDRA table may indicate a first slot offset from the scheduling DCI to the PDSCH (k0), a PDSCH mapping type, a starting symbol in the slot and a length (e.g. number of symbols from the starting symbol—SLIV), and/or a repetition number. In an example, a number of valid entries in a row of the TDRA table (e.g., valid SLIVs) may indicate a number of PDSCHs scheduled by the DCI.

The configuration parameters may indicate one or more UL BWPs for an uplink carrier of a cell. A first UL BWP may be active UL BWP of the carrier. The configuration parameters may indicate a first SCS for the first UL BWP. For example, the base station may configure different UL BWPs of a same carrier/cell or different carriers/cells with same or different SCSs.

The configuration parameters may comprise one or more PUCCH configurations. The one or more PUCCH configurations may indicate one or more PUCCH resources on an UL BWP of an UL carrier/cell. A PUCCH configuration may indicate one or more PUCCH resource sets, each comprising one or more PUCCH resources. The configuration parameters may indicate for each PUCCH resource an id, a starting PRB, a frequency hopping indication, and a PUCCH format (e.g., format 0, 1, 2, 3, or 4). The configuration parameters may indicate for each PUCCH format an initial cyclic shift, a number of symbols, a starting symbol index within a slot, and/or a number of PRBs. The configuration parameters may indicate a list of timing for given PDSCH to the DL ACK (e.g., HARQ-ACK—dl-DataToUL-ACK/dl-DataToUL-ACK-r16/dl-DataToUL-ACK-DCI-1-2-r16). For example, the list of timing for PDSCH to DL ACK may comprise a plurality of value (e.g., up to 8 or 16 values) from a set of integers (e.g., −1 to 15 or 31). In an example, the value −1 may correspond to "non-numerical value" for the case where the ACK/NACK feedback timing is not explicitly included at the time of scheduling PDSCH.

In an example, the wireless device may monitor one or more PDCCH candidates of a search space. The wireless device may monitor the one or more PDCCH candidates for a DCI with a first size. The wireless device may determine the size of the DCI based on the configuration parameters received via RRC message(s). The wireless device may receive the DCI in a PDCCH monitoring occasion.

The DCI may schedule multiple PDSCHs. For example, the DCI may comprise a time domain resource assignment (TDRA) field indicating multiple time resources (e.g., SLIVs) for the multiple PDSCHs. The DCI may indicate an offset (k0) to a first slot of a first PDSCH of the multiple PDSCHs. The multiple PDSCHs may be scheduled in consecutive slots starting from the first slot. The multiple PDSCHs may be scheduled in non-consecutive slots. The multiple PDSCHs may be contiguous in time domain (e.g., no gap between two PDSCHs of the multiple PDSCHs). The multiple PDSCHs may be non-contiguous in time domain (e.g., one or more symbols/slots of gap between at least two PDSCHs of the multiple PDSCHs).

The DCI may comprise a field (e.g., PDSCH-to-HARQ-feedback timing indicator) indicating a slot offset for HARQ feedback transmission of one or more PDSCHs scheduled by the DCI. The wireless device may determine a bit width/size of the field based on a number of entries in a higher layer parameter, for example, a first configuration parameter indicated by RRC message(s) (e.g., dl-Data-ToUL-ACK list/table). The field may indicate a first slot offset value (k1−1).

In an example, the wireless device may receive an RRC message comprising configuration parameters of cell. The configuration parameters may comprise at least a first parameter that indicates whether a multi-PDSCH scheduling DCI schedules PDSCHs of a same priority and/or different priorities. The wireless device may determine the size of a respective DCI format based on the at least a first parameter. For example, if the at least a first parameter is not configured and/or indicates a first value, the wireless device may determine that the multi-scheduling DCI schedules only same priority PDSCHs, and/or that the priority indicator field in the DCI format is of a first size (e.g., one bit). For example, if the at least a first parameter is configured and/or indicates a second value, the wireless device may determine that the multi-scheduling DCI may schedule PDSCHs of different priorities, and/or that the priority indicator field in the DCI format is of a second size (e.g., M bits, wherein M is determined based on a (maximum) number of scheduled PDSCHs). The at least a first parameter may comprise a parameter (e.g., pdsch-HARQ-ACK-CodebookList) indicating how many and/or what type (semi-static and/or dynamic) of HARQ-ACK codebooks the wireless device may simultaneously generate for PDSCHs, wherein a first HARQ-ACK codebook may be associated with PDSCHs of a first priority index and a second HARQ-ACK codebook may be associated with PDSCHs of a second priority index.

The at least a first parameter may comprise a parameter indicating a number of (DL) HARQ processes of the cell. For example, if a number of configured HARQ processed for the cell is below or equal to a threshold, the wireless device may determine that the multi-PDSCH scheduling DCI may schedule PDSCHs of the same priority. For example, if the number of configured HARQ processed for the cell is above or equal to the threshold, the wireless device may determine that the multi-PDSCH scheduling DCI may schedule PDSCHs of the different priorities. The threshold may be (pre-)defined and/or (pre-)configured.

The wireless device may determine a size (bit width) of a field in the DCI (e.g., the priority indicator field) based on a number of entries in a higher layer parameter and/or the first parameter. The higher layer parameter may indicate a maximum number of PDSCHs that the DCI may schedule for a cell at a time. The first parameter may indicate a number of codebooks used for HARQ feedback transmission of the multiple PDSCHs scheduled by the DCI. The wireless device may determine the size of the field in the DCI based on a CORESET/search space/PDCCH configuration associated with the DCI reception, e.g., whether PDCCH TTI-bundling (e.g., PDCCH monitoring over a multi-slot span) is configured or not. The wireless device may determine the size of the field in the DCI based on a SCS of the CORESET/search space/PDCCH configuration associated with the DCI reception.

In an example, the wireless device may determine a number of priorities (e.g., 1: only same priority index {0} or {1}, or 2: different priority indexes {0,1}) of multiple PDSCHs scheduled by a DCI based on the number of entries in the higher layer parameter and/or the first parameter. In an example, the wireless device may determine a number of priorities of multiple PDSCHs scheduled by a DCI based on a (maximum) number of PDSCHs scheduled by the DCI. For example, the wireless device may determine single (same) priority index for the multiple PDSCHs, if a (maximum) number of the multiple PDSCHs indicated by the DCI is below (or equal to) a threshold. For example, the wireless device may determine two or more (different) priority indexes the multiple PDSCHs, if the (maximum) number of the multiple PDSCHs indicated by the DCI is above (or equal to) the threshold. The threshold may be a fixed number (e.g., 4 or 8). The threshold may be pre-configured by RRC signaling. The threshold may depend on a SCS of the scheduling cell (e.g., the SCS of the search space where the DCI is received). The threshold may depend on a first SCS of the scheduling cell (e.g., the SCS of the search space where the DCI is received) and/or a second SCS of the scheduled cell (e.g., the SCS of the DL BWP of the carrier where the PDSCHs are scheduled, e.g., determined by the carrier indicator field in the DCI). The threshold may depend on a SCS of an UL carrier and/or one or more PUCCH configurations on one or more UL carriers. The wireless device may determine the threshold and/or the number priorities of multiple PDSCHs scheduled by a DCI, based on a CORESET/search space/PDCCH configuration associated with the DCI reception, e.g., whether PDCCH TTI-bundling (e.g., PDCCH monitoring over a multi-slot span) is configured or not, and/or based on the SCS of the CORESET.

In an example, the priority information indicated by the DCI may comprise one or more information fields in the DCI format. For example, the wireless device may determine a number of priorities (e.g., 1: only same priority index {0} or {1}, or 2: different priority indexes {0,1}) of multiple PDSCHs scheduled by a DCI based on the one or more information fields in the DCI. For example, the wireless device may determine a single/same priority index for the multiple PDSCHs, if at least a first field in the DCI (e.g., TDRA and/or FDRA and/or MCS and/or RV and/or NDI and/or PRI and/or DAI and/or PDSCH group index and/or requested PDSCH group index and/or HARQ feedback timing indicator) indicates a first value. For example, the wireless device may determine two or more (different) priority indexes for the multiple PDSCHs, if at least a first field in the DCI (e.g., TDRA and/or FDRA and/or MCS and/or RV and/or NDI and/or PRI and/or DAI and/or PDSCH group index and/or number of requested PDSCH group(s) and/or HARQ feedback timing indicator) indicates a second value. For example, the wireless device may determine the number of priorities based on the number of PDSCHs scheduled by the DCI and/or zero or non-zero gaps between two of the PDSCHs.

In an example, a DCI scheduling multiple PDSCHs may indicate priority information associated with the multiple PDSCHs. For example, the DCI scheduling multiple PDSCHs may comprise a field, e.g., priority indicator field, indicating one or more priority indexes for/associated with the multiple PDSCHs. For example, the priority indicator field may indicate a priority index for each of the multiple PDSCHs, respectively. The wireless device may determine a priority index associated with each of the multiple PDSCHs scheduled by the DCI, based on the priority indicator field in the DCI.

A priority index may indicate whether the associated PDSCH (/PUSCH) is of a first priority and/or of a second priority. For example, the priority index may comprise a first value (e.g., 0) indicating a first priority (e.g., low). The priority index may comprise a second value (e.g., 1) indicating a second priority (e.g., high).

For example, the priority indicator field may be a bitmap. The wireless device may determine a size/length of the bitmap based on the (maximum) number of the multiple PDSCHs scheduled by the DCI. For example, the size/length of the bitmap may be equal to the (maximum) number of the multiple PDSCHs scheduled by the DCI. For example, the size/length of the bitmap may be equal to half the (maximum) number of the multiple PDSCHs scheduled by the DCI. Each bit of the bitmap may correspond to at least one of the multiple PDSCHs. For example, a first bit may indicate a priority index of a first PDSCH of the multiple PDSCHs. For example, the first bit may indicate the priority index of the first PDSCH and a second PDSCH of the multiple PDSCHs. For example, the first PDSCH and the second PDSCH may be in a same slot (e.g., for two or more transmission (MIMO) layers). For example, the first PDSCH and the second PDSCH may be consecutive PDSCHs. For example, the wireless device may map the bits of the bitmap, e.g., from MSB to LSB, to consecutive PDSCHs in an increasing order of time. For example, PDSCHs may be ordered in time domain from lowest slot index and/or starting symbol to highest slot index and/or starting symbol. For example, the wireless device may map the bits of the bitmap, e.g., from MSB to LSB, to PDSCHs in an increasing order of transmission layers per PDSCH transmission occasion, followed by frequency, followed by time. For example, the wireless device may expect that each PDSCH transmission occasion (in time and frequency) comprises/is limited to two transmission layers. For example, PDSCHs may be ordered in frequency domain from a lowest (starting) PRB/RB index to a highest PRB/RB index in the BWP. For example, the wireless device may map the bits of the bitmap, e.g., from MSB to LSB, to PDSCHs in an increasing order of frequency, followed by transmission layer, followed by time. For example, the wireless device may map the bits of the bitmap, e.g., from MSB to LSB, to PDSCHs in an increasing order of time, followed by transmission layer, followed by frequency. For example, the wireless device may map the bits of the bitmap, e.g., from MSB to LSB, to PDSCHs in an increasing order of transmission layer, followed by time, followed by frequency.

Figure 24:
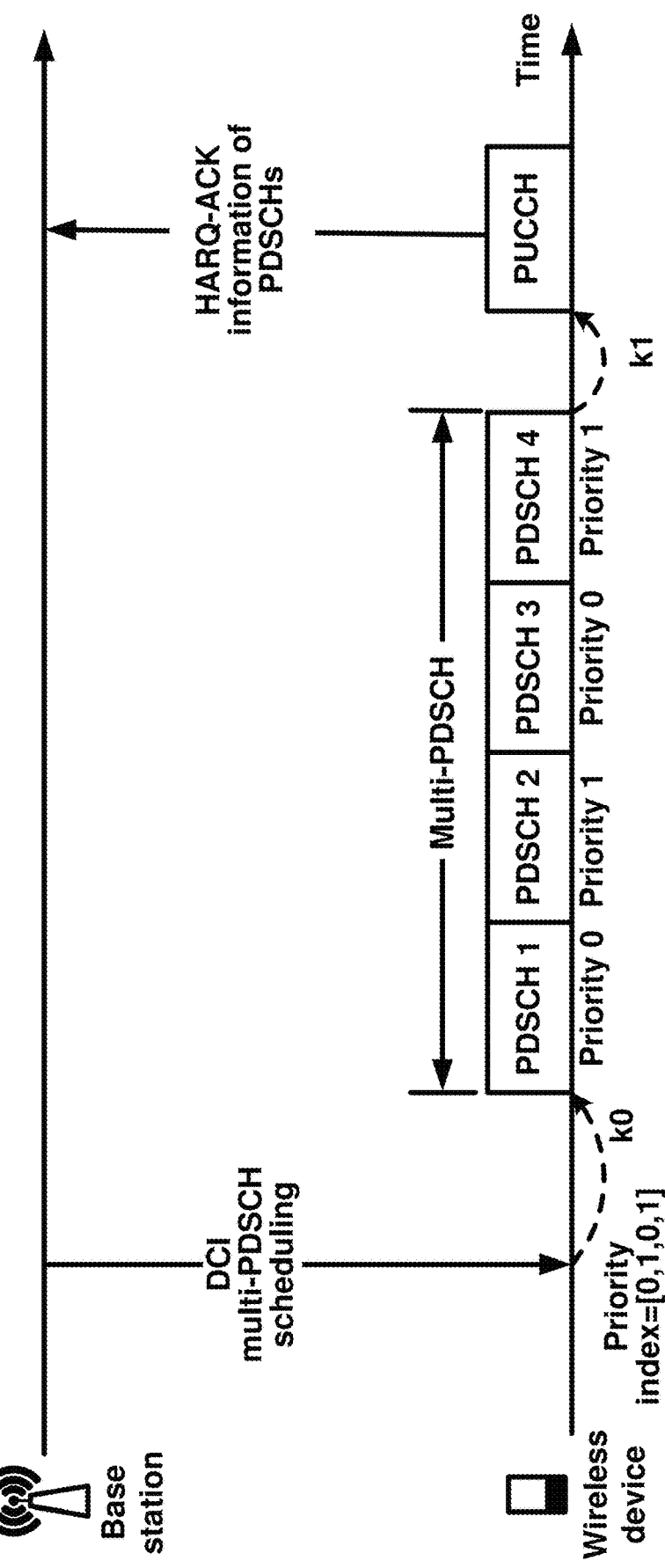
FIG. 24 shows an example of HARQ-ACK transmission associated with a DCI scheduling multiple PDSCHs, according to some embodiments.

FIG. 24 shows an example of priority index indication for multi-PDSCH scheduling, according to some embodiments. As shown in the figure, the wireless device may receive a DCI. The DCI may be a multi-PDSCH scheduling DCI. For example, the DCI may schedule multiple/a plurality of PDSCHs (e.g., four PDSCHs as in FIG. 23 and FIG. 24). The multiple PDSCHs may be for a cell. The multi-PDSCH scheduling DCI (e.g., DCI) may comprise a priority indicator field. The priority indicator field may indicate a bitmap indicating priority indexes of the multiple PDSCHs. In an example, the bits of the bitmap are sequentially mapped to PDSCHs in an increasing order of time ($1^{st}$ bit (0) to PDSCH1, $2^{nd}$ bit (1) to PDSCH2, $3^{rd}$ bit (0) to PDSCH3, and last bit (1) to PDSCH4).

In an example, the DCI may comprise at least one field indicating one or more PDSCHs, of the multiple PDSCHs, that are of a first priority index (e.g., priority index 1, high priority). For example, the at least one field may indicate one or more index of one or more PDSCHs of the multiple PDSCHs. For example, in FIG. 24, an index of the first PDSCH is 1 (PDSCH1), an index of the second PDSCH is 2 (PDSCH2), an index of the third PDSCH is 3 (PDSCH3), and an index of a last PDSCH is 4 (PDSCH4). The wireless device may determine an index of a PDSCH based on an order of the multiple PDSCHs in time domain, wherein each time domain occasion may comprise two indexes corresponding to two transmission layers. For example, if each of the PDSCH transmission occasions scheduled by the DCI as shown in FIG. 24, may comprise two PDSCHs, one per transmission layer. For example, a first PDSCH and a second PDSCH may correspond to the first occasion (shown as PDSCH1), and may be associated with a same index (e.g., 1) or different indexes (e.g., 1 and 2). The wireless device may determine the PDSCH indexes, numbered in an increasing order of time/frequency/transmission layer (e.g., PDSCH1 and/or PDSCH2 and/or PDSCH3 and/or PDSCH4 in FIG. 24). The wireless device may determine that the one or more PDSCHs are of the first priority index based on the at least one field. The wireless device may determine that one or more second PDSCHs, of the multiple PDSCHs, are of the second priority index, wherein the one or more second PDSCHs are the remainder of the multiple PDSCHs excluding the one or more first PDSCHs.

For example, if a priority index is not indicated by the multi-PDSCH scheduling DCI for a PDSCH of the multiple PDSCHs, the wireless device determines/assumes that the PDSCH is of a second priority index (e.g., priority index 0, low priority).

In an example, the wireless device may determine that a first portion/subset of the multiple PDSCHs scheduled by a DCI are of a first priority. The wireless device may determine that a second portion/subset (different from the first portion) of the multiple PDSCHs scheduled by the DCI are of a second priority. For example, the first/second portion/subset of the PDSCHs may be pre-defined, e.g., first/second half. For example, the first/second portion/subset of the multiple PDSCHs may be first/last M PDSCHs of the multiple PDSCHs, wherein M may pre-defined and/or pre-configured. For example, the first/second portion/subset of PDSCHs may comprise consecutive PDSCHs. For example, the first/second portion/subset of PDSCHs may comprise non-consecutive PDSCHs, e.g., alternative slots/PDSCHs. The wireless device may receive an RRC message comprising configuration parameters that indicate/define the first and/or second portion/subsection of the multiple PDSCHs scheduled by a DCI.

Figure 25:
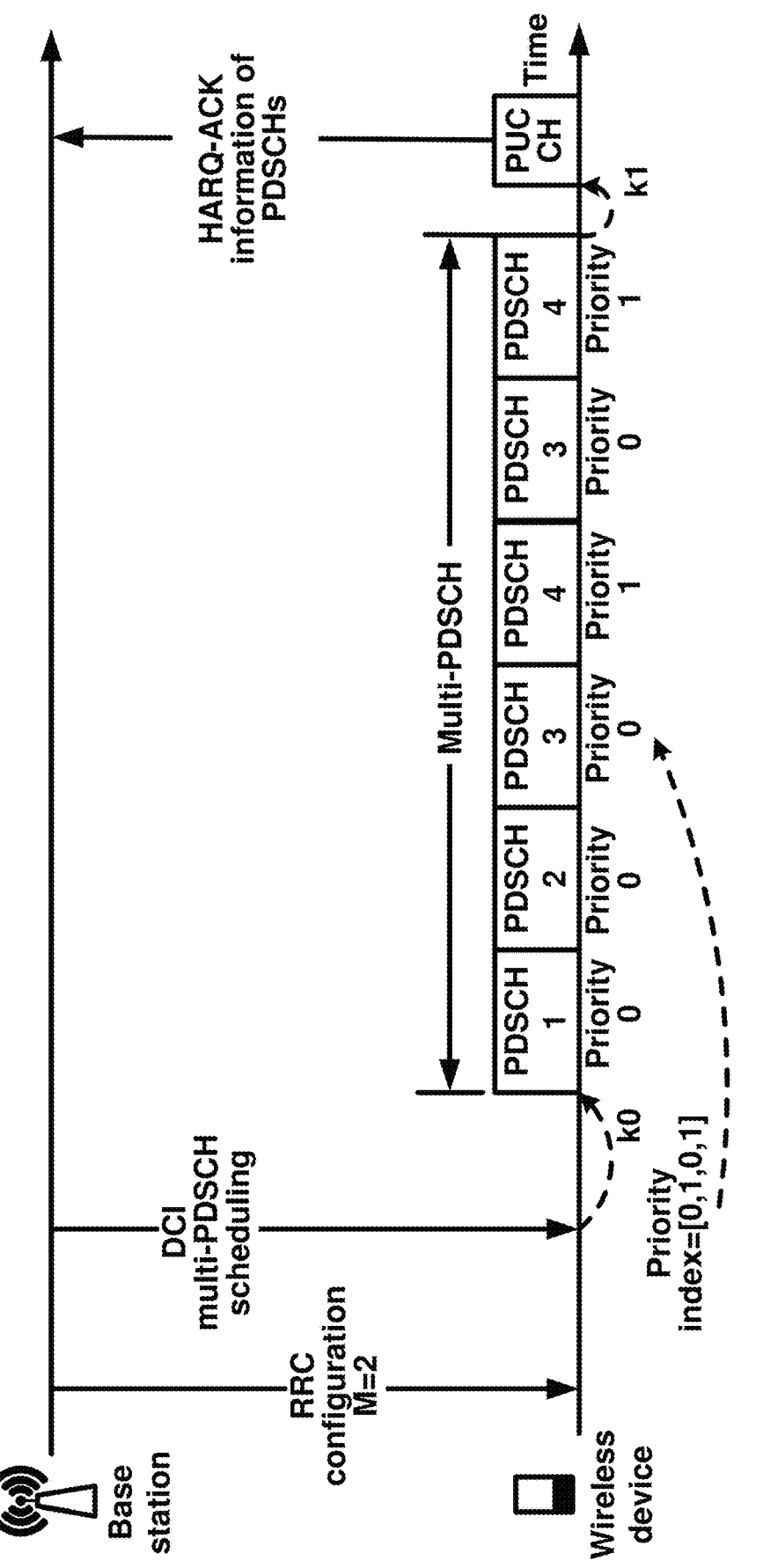
FIG. 25 shows an example of HARQ-ACK transmission associated with a DCI scheduling multiple PDSCHs, according to some embodiments.

FIG. 25 shows an example of priority index indication for multi-PDSCH scheduling, according to some embodiments. As shown in the figure, the wireless device may receive a DCI. The DCI may be a multi-PDSCH scheduling DCI. For example, the DCI may schedule multiple/a plurality of PDSCHs (e.g., six PDSCHs as in FIG. 25). In an example, the wireless device may receive an RRC message indicating a value M. The value M may indicate a number of first/last PDSCHs of multiple PDSCHs scheduled by a DCI whose priority is pre-defined or pre-configured. For example, in FIG. 25, RRC indicates M=2. The wireless device may determine that a first M PDSCHs of the multiple PDSCHs are of a first priority index, e.g., based on an RRC parameter. For example, in FIG. 25, the wireless device may determine that PDSCH1 and PDSCH2 are of priority index 0. In an example, priority indexes of the subset/portion of the multiple PDSCHs (e.g., M first/last PDSCHs) may be configured/indicated by RRC (e.g., a sequence {0,1} for M=2). The wireless device may determine priority indexes for the rest of the multiple PDSCHs scheduled by the DCI based on the priority indicator field in the DCI. As shown in FIG. 25, the DCI may indicate four priority indexes for the last four PDSCHs.

The wireless device may receive an RRC message comprising configuration parameters that indicate/define the first and/or second portion/subsection of the multiple PDSCHs scheduled by a DCI. The configuration parameters may indicate TDRA table for multiple PDSCHs. For example, a TDRA (entry) of the TDRA table may indicate a priority index for each slot of multiple slots, where each slot of the multiple slots corresponds to each PDSCH of the multiple PDSCHs. The configuration parameters may indicate HARQ processes, (e.g., nrofHARQ-ProcessesForPDSCH may indicate 2 or 4 or 8 or 16 DL/UL HARQ processes for a serving cell). For example, one or more first HARQ processes configured by RRC may be associated with the first portion/subset of PDSCHs scheduled by the DCI. For example, the configuration parameters may comprise one or more HARQ process identifiers, where a PDSCH, associated with a HARQ process identifier of the one or more HARQ process identifier, is considered as a first priority. For example, one or more second HARQ processes configured by RRC may be associated with the second portion/subset of PDSCHs scheduled by the DCI.

A DCI scheduling multiple PDSCHs may comprise a priority indicator field (e.g., one bit), indicating the priority index of the first portion/subset of PDSCHs. The priority index of the second portion/subset of PDSCHs may be pre-defined and/or pre-configured. The DCI may comprise a priority indicator field (e.g., one bit), indicating the priority index of the second portion/subset of PDSCHs. The DCI may comprise a priority indicator field (e.g., two bits), indicating the priority index of the first and the second portion/subset of PDSCHs, e.g., each bit of the priority indicator field may correspond to each portion/subset of the PDSCHs. For example, a first bit(s) of the priority indicator field may indicate priority index(es) of first portion/subset of PDSCHs. For example, a second bit(s) of the priority indicator field may indicate priority index(es) of second portion/subset of PDSCHs.

In an example, a DCI scheduling multiple PDSCHs may indicate priority information associated with the multiple PDSCHs. For example, the DCI scheduling multiple PDSCHs may comprise at least one field indicating one or more priority indexes for/associated with the multiple PDSCHs. For example, the at least one field may indicate priority indexes for each of the multiple PDSCHs (e.g., implicitly).

For example, the time domain resource assignment (TDRA) field in the DCI may indicate the priority index of each of the multiple PDSCHs. For example, the RRC configuration parameters of PDSCH may configure/indicate a TDRA table, wherein each row of the TDRA table indicates symbols (starting symbol and/or symbol duration) of each of the multiple PDSCHs. The TDRA table may indicate a priority index for each of the multiple PDSCHs. For example, the priority index (same as SLIV) may be built in/comprised in the TDRA table.

For example, the TDRA table/list configured by RRC may indicate which of the multiple PDSCHs indicated by a row of the table (to which the DCI TDRA field points to) may be of higher/lower priority (e.g., of priority index 1 or 0). The wireless device may determine a size of the priority indicator field of the DCI based on the configured TDRA table.

FIG. 26 shows an example of a time domain resource allocation table for multi-PDSCH scheduling, according to some embodiments. As shown in the figure, each TDRA index/row indicates one or more (e.g., up to M) PDSCHs to be scheduled by a DCI. The maximum number of PDSCH (M) may be pre-defined/pre-configured. For each PDSCH in a row/entry of the list (associated with a TDRA index), a mapping type and/or starting symbol and symbol duration/SLIV and/or priority indicator may be configured (indicated by parameters in an RRC message). For example, the priority indicator may indicate a priority index of the associated PDSCH (0 or 1). As shown in the figure, if the priority indicator field in the DCI indicates TDRA index 2, M PDSCHs are scheduled. The first two PDSCHs may be of priority index 0, while the last PDSCH may be of priority index 1.

For example, as shown in FIG. 26, the TDRA list/table may comprise a priority indicator enabler that may represent/indicate whether the associated PDSCH can be of a first priority or not; e.g., 0 may indicate that the corresponding PDSCH may only be of priority index 0, and/or 1 may indicate that the corresponding PDSCH may be of priority index 0 or 1 (e.g., the scheduling DCI may indicate 0 or 1). For example, the priority indicator field in the DCI may only indicate the priority index for the PDSCHs whose associated priority enabler in the RRC message is set to 1. The wireless device may determine a size/length of the priority indicator field of the DCI format based on the TDRA table, e.g., based on the priority indicator enabler in the TDRA table. For example, the size/length of the priority indicator field of the DCI format may be equal to maximum of sum of the priority indicator enablers associated with each of the entries of the list.

For example, the DCI scheduling multiple PDSCHs may comprise at least one field indicating one or more priority indexes for/associated with the multiple PDSCHs. The at least one field may indicate priority indexes for each of the multiple PDSCHs (e.g., implicitly). In an example, the at least one field may comprise a HARQ process number/id. The wireless device may determine a HARQ process number for each of the multiple PDSCHs. In an example, a first HARQ process may be associated with a first priority index. For example, wireless device may receive an RRC message comprising configuration parameters indicating a number of (DL) HARQ process (e.g., 16 HARQ processes may be configured for a cell). For example, the configuration parameters may indicate one or more first HARQ processes to be of a first priority, and/or one or more second HARQ processes to be of a second priority. For example, the wireless device may determine the one or more first/second HARQ processes based on a rule. For example, the one or more first HARQ processes may comprise a first half/portion/subset of the HARQ processes. For example, the one or more second HARQ processes may comprise a second half/portion/subset of the HARQ processes. For example, HARQ process #1 to HARQ process #8 (half) may be of a first priority index, and HARQ process #9 to HARQ process #16 may be of second priority index. For example, the RRC message may comprise a parameter, e.g., bitmap, indicating the priority indexes associated with each HARQ process. For example, a length of the bitmap may be equal to the number of the configured HARQ processes. For example, each bit of the bitmap may indicate whether the respective HARQ process is of a first/second priority order or not.

The wireless device may determine priority index of each of the multiple PDSCHs scheduled by a DCI based on at least one field in the DCI. In an example, the at least one field may comprise the FDRA and/or NDI and/or RV and/or HARQ process number and/or DAI and/or HARQ feedback timing indicator (k1) and/or PUCCH resource indicator and/or TPC command and/or one-shot HARQ-ACK request and/or PDSCH group index and/or NFI and/or number of requested PDSCH group(s) and/or DMRS sequence and/or channel access and/or combination thereof. For example, RRC configuration parameters may configure/indicate association between one or more of the above information/parameters/fields and priority indexes (e.g., similar to TDRA and/or HARQ processes described above). In an example, the association between the information/field/parameter and the priority indexes may be pre-defined.

For example, a first PRI/HARQ timing indicator (k1) indicated by the DCI may correspond to one or more first PDSCHs. For example, a second PRI/k1 indicated by the DCI may correspond to one or more second PDSCHs. the DCI may indicate two priority indexes. A first priority index indicated by the DCI may correspond to the one or more first PDSCHs associated with the first PRI/k1. A second priority index indicated by the DCI may correspond to the one or more second PDSCHs associated with the second PRI/k1. For example, the wireless device may determine the one or more first and second PDSCHs based on the first and second PRI/k1, respectively. The wireless device may determine priority indexes of the one or more first and second PDSCHs based on the first and second priority index values indicated by the DCI, respectively.

In an example, the wireless device may determine priority indexes of multiple PDSCHs scheduled by a DCI based on the HARQ feedback timing indicator indicated by the DCI. For example, the wireless device may determine that one or more PDSCHs of the multiple PDSCHs that are in the same slot and/or before a slot indicated by the HARQ feedback timing indicator are of a first priority. For example, the wireless device may determine that one or more second PDSCHs of the multiple PDSCHs that are in the same slot and/or after the slot indicated by the HARQ feedback timing indicator are of a second priority.

In an example, the RRC message may comprise configuration parameter(s) indicating that an enhanced dynamic codebook is configured for the UE. The multi-PDSCH scheduling DCI may indicate a PDSCH group index for each of the multiple PDSCHs. In an example, the configuration parameters may indicate an association between a PDSCH group and a priority index. For example, PDSCHs of a first PDSCH group may be of a first priority and/or PDSCHs of a second PDSCH group may be of a second priority index. The association may be pre-defined (e.g., PDSCH group 0/1 may be priority index 0/1). The wireless device may determine a priority index of a first PDSCH of multiple PDSCHs scheduled by a DCI based on a PDSCH group index of the first PDSCH, wherein the DCI indicates the PDSCH group index.

Based on the embodiments, the wireless device may determine to transmit HARQ feedback of which of the scheduled PDSCHs (of the multi-PDSCH scheduling) via a PUCCH transmission triggered/indicated by the multi-PDSCH scheduling DCI. The DCI may trigger at least one PUCCH transmission comprising HARQ feedback of the multiple PDSCHs. For example, as shown in FIG. 24, the PUCCH transmission triggered by the multi-PDSCH scheduling DCI, may comprise HARQ feedback of one or more of the multiple PDSCHs.

The wireless device may determine one or more PDSCHs, of the multi-PDSCH scheduling, whose feedback is transmitted via the triggered PUCCH, based on the priority indicator field. For example, (only) HARQ feedback of PDSCHs of a first priority index (e.g., priority index 1, higher priority) may be reported via the triggered PUCCH transmission. For example, HARQ feedback of PDSCHs of a second priority index (e.g., priority index 0, lower priority) may be postponed (e.g., assumed to be associated with non-numerical/inapplicable HARQ feedback timing indicator (nnk1)). For example, HARQ feedback of PDSCHs of a second priority index may be reported via a second PUCCH transmission. For example, the second PUCCH transmission may be triggered by the multi-PDSCH scheduling DCI. For example, the second PUCCH transmission may be triggered by a second DCI scheduling PDSCH(s), e.g., received after the multi-PDSCH scheduling DCI. For example, the second PUCCH may be next available/valid PUCCH transmission after the first PUCCH transmission. For example, the first PUCCH transmission may (only) comprise a first HARQ-ACK codebook associated with the first priority index, and the second PUCCH transmission may (only) comprise a second HARQ-ACK codebook associated with the second priority index.

Per one or more embodiments of the present disclosure, the wireless device may transmit HARQ feedback of the multiple PDSCHs scheduled by a DCI in a first slot indicated by the DCI. For example, the multiple PDSCHs may be associated with a first priority (e.g., of a first priority index) and a second priority (e.g., a second priority index). For example, the wireless device may generate a first HARQ-ACK codebook comprising HARQ feedback of one or more first PDSCHs of the multiple PDSCHs. The one or more first PDSCHs may be of a first priority (e.g., a first priority index). The first HARQ-ACK codebook may be associated with the first priority (e.g., the first priority index). The wireless device may generate a second HARQ-ACK codebook comprising HARQ feedback of one or more second PDSCHs of the multiple PDSCHs. The one or more second PDSCHs may be of a second priority (e.g., a second priority index). The second HARQ-ACK codebook may be associated with the second priority index.

The multi-PDSCH scheduling DCI may comprise a HARQ feedback timing indicator indicating a first slot. In an example, the wireless device may determine the first slot based on the HARQ feedback timing indicator. The DCI may comprise one or more PUCCH resource indicator (PRI) fields. The DCI may indicate one or more PUCCH resources. For example, the wireless device may determine a first PUCCH resource in the first slot. The wireless device may determine a second PUCCH resource in the first slot. The second PUCCH resource may be the first PUCCH resource, e.g., based on a whether a first parameter (with a first value) is configured by RRC or not and/or based on one or more information fields in the DCI.

The wireless device may multiplex the first HARQ-ACK codebook in the first PUCCH resource. The wireless device may multiplex the second HARQ-ACK codebook in the second PUCCH resource. In an example, the wireless device may transmit the first HARQ-ACK codebook via the first PUCCH resource and/or the second HARQ-ACK codebook via the second PUCCH resource in the first slot. In an example, the first PUCCH resource and the second PUCCH resource may not overlap in time. In an example, the first PUCCH resource and the second PUCCH resource may be one same or different uplink carriers. In an example, the first PUCCH transmission may be of the first priority index. In an example, the second PUCCH transmission may be of the second priority index.

In an example, the wireless device may transmit in a first slot the HARQ-ACK codebook, from the first HARQ-ACK codebook and the second HARQ-ACK codebook, that is associated with PDSCHs of a first/higher priority index. In an example, the wireless device may not expect to receive a multi-PDSCH scheduling DCI, scheduling PDSCHs with different priority indexes and triggering a single PUCCH transmission.

In an example, the wireless device may generate a third HARQ-ACK codebook in response to receiving a multi-PDSCH scheduling DCI. The third HARQ-ACK codebook may comprise a first HARQ-ACK codebook comprising HARQ feedbacks of one or more first PDSCHs of the multiple PDSCHs. The one or more first PDSCHs may be of a first priority index. The third HARQ-ACK codebook may comprise a second HARQ-ACK codebook comprising HARQ feedbacks of one or more second PDSCHs of the multiple PDSCHs. The one or more second PDSCHs may be of a second priority index. For example, the third HARQ-ACK codebook may comprise the first HARQ-ACK codebook followed/concatenated by the second HARQ-ACK codebook. For example, when a HARQ-ACK codebook is associated with PDSCHs of more than one priority index, the placement of HARQ-ACK feedback for the two (or more) priority indexes may be ordered based on increasing priority (index).

For example, the HARQ-ACK codebook transmitted via a PUCCH triggered by a multi-PDSCH DCI may be associated with the first priority index and the second priority index, e.g., in response to the multiple PDSCHs scheduled by the DCI being of the first priority index and the second priority index. The PUCCH transmission comprising the (combined) HARQ-ACK codebook may be of a priority index which is a maximum of the priority indexes associated with the HARQ feedbacks/respective PDSCHs.

In an example, the configuration parameters received in an RRC message may indicate that the wireless device reports HARQ feedbacks of multiple PDSCHs scheduled by a single DCI via a plurality of PUCCH resources (e.g., in two or more slots, via two or more PUCCH transmissions). For example, if the configuration parameters comprise a first parameter and/or if the first parameter indicates a first value/entry, the wireless device may determine two or more slots for HARQ feedback transmission of a multi-PDSCH scheduling. The RRC message may comprise a configuration parameter. The configuration parameter may indicate that one or more additional PUCCH resources/slots may be indicated for HARQ feedback transmission of the multiple PDSCHs scheduled by a DCI.

The wireless device may receive a DCI scheduling multiple (a plurality of) PDSCHs in a cell. The wireless device may determine two or more slots for HARQ feedback transmission of the multiple PDSCHs, e.g., based on RRC parameter(s) and/or information field(s) in the DCI. For example, the wireless device may determine to transmit the HARQ feedback of the multiple PDSCHs in two or more slots, via two or more PUCCH transmissions/resources. Based on existing technologies, the wireless device may not be able to determine a priority index of more than one PUCCH transmissions triggered by a DL DCI. Embodiment may enable a wireless device to determine the priority indexes of more than one PUCCH transmissions based on the multi-PDSCH scheduling DCI.

In an example, the multi-PDSCH scheduling DCI may comprise a HARQ feedback timing indicator field indicating two slots, a first slot and a second slot, for HARQ feedback information of the multiple PDSCHs. The wireless device may determine a first PUCCH resource in the first slot and a second PUCCH resource in the second slot. The first PUCCH transmission in the first slot may comprise HARQ feedback information of one or more first PDSCHs of the multiple PDSCHs. The second PUCCH transmission in the second slot may comprise HARQ feedback information of one or more second PDSCHs of the multiple PDSCHs.

The DCI may comprise a priority indicator field. The priority indicator field may indicate a first priority index for the first PUCCH transmission in the first slot. The priority indicator field may indicate a second priority index for the second PUCCH transmission in the second slot. For example, a first bit (MSB) of the priority indicator field in the DCI may indicate a priority index for the first PUCCH transmission. For example, a second bit (LSB) of the priority indicator field in the DCI may indicate a priority index for the second PUCCH transmission. The priority indexes of the two PUCCH transmissions may or may not be the same.

In an example, the first PUCCH transmission may be earlier than the second PUCCH transmission. For example, the first slot may be earlier than the second slot. In an example, the first slot/PUCCH transmission may be associated with a first HARQ feedback timing value indicated by the DCI (e.g., from MSB of the HARQ feedback timing indicator field). In an example, the second slot/PUCCH transmission may be associated with a second HARQ feedback timing value indicated by the DCI (e.g., from LSB of the HARQ feedback timing indicator field).

In an example, the wireless device may report HARQ feedback of one or more first PDSCHs, of multiple PDSHCs, that are of the first priority index using the first PUCCH transmission. In an example, the wireless device may report HARQ feedback of one or more second PDSCHs, of multiple PDSHCs, that are of the second priority index using the second PUCCH transmission.

Figure 27:
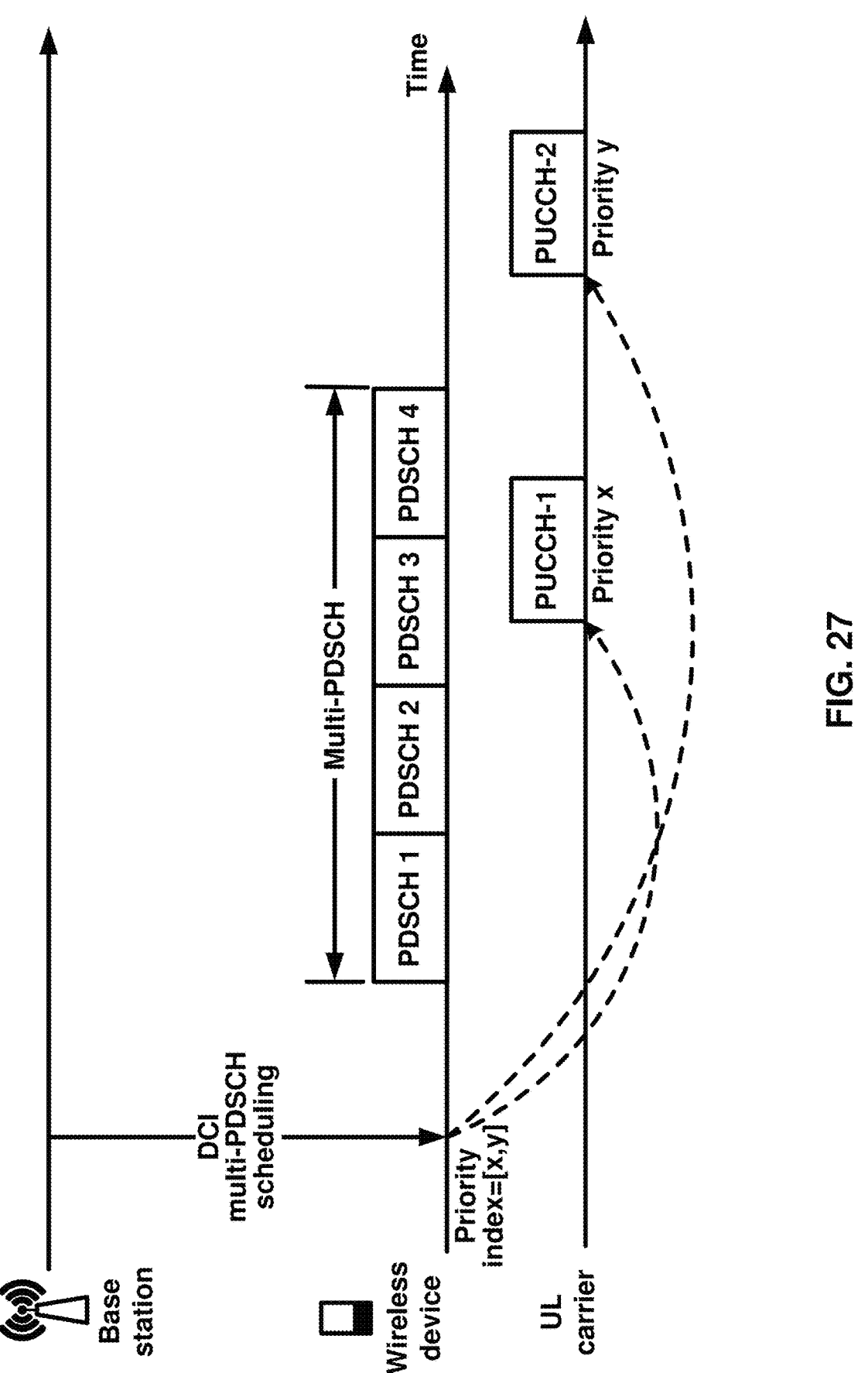
FIG. 27 shows an example of multiple HARQ feedback transmission associated with a multi-PDSCH scheduling, according to some embodiments.

FIG. 27 shows an example of priority index indication for multi-PDSCH scheduling with two PUCCH transmissions triggered, according to some embodiments. As shown in the figure, a first value (x) indicated by the priority indicator field in the DCI may indicate a priority index for the first (e.g., earlier) PUCCH. A second value (y) indicated by the priority indicator field in the DCI may indicate a priority index for the second (e.g., later) PUCCH. For example, the wireless device may determine, e.g., based on timing of the PUCCHs, to transmit the HARQ feedback of PDSCH1 and PDSCH2 via the first PUCCH (PUUCH-1), and to transmit the HARQ feedback of PDSCH3 and PDSCH4 via the second PUCCH (PUCCH-2).

Figure 28:
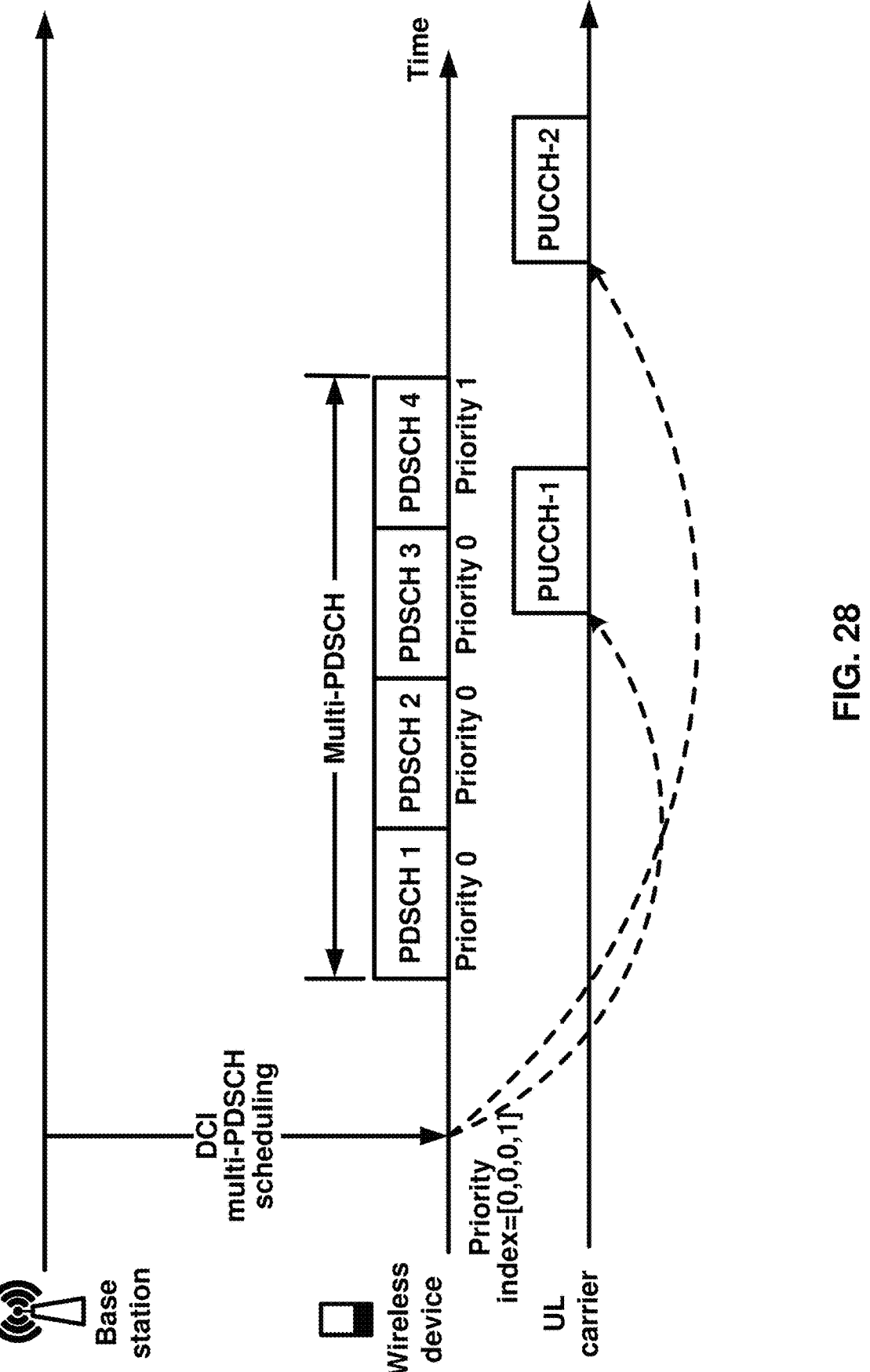
FIG. 28 shows an example of multiple HARQ feedback transmission associated with a multi-PDSCH scheduling, according to some embodiments.

FIG. 28 shows an example of priority index indication for multi-PDSCH scheduling with two PUCCH transmissions triggered, according to some embodiments. In this example, the DCI comprises a priority indicator field that indicates priority indexes for each of the multiple PDSCHs. The wireless device may map the PDSCHs to the PUCCHs, e.g., based on timing. For example, PDSCH1 and PDSCH2 may be mapped to PUCCH-1. For example, PDSCH3 and PDSCH4 may be mapped to PUCCH-2. The wireless device may determine a priority index of each of the PUCCHs based on the associated PDSCHs mapped to it. For example, the UE may determine that PUCCH-1 is of priority 0. PUCCH-1 may comprise HARQ feedback of PDSCH1 and PDSCH2. For example, the UE may determine that PUCCH-2 is of priority 1. PUCCH-2 may comprise HARQ feedback of PDSCH4. The wireless device may drop/cancel/ not transmit HARQ feedback of PDSCH 3 because it overlaps with a higher priority HARQ feedback.

In an example, the wireless device may not expect the priority indexes of the two PUCCH transmissions to be the same. In an example, the DCI may comprise a priority indicator field (e.g., one bit), indicating a priority index for the first PUCCH transmission in the first slot. For example, the wireless device may determine that the first PUCCH transmission is of the first priority index based on the priority indicator in the DCI. The wireless device may determine that the second PUCCH transmission is of a second priority index, based on the first priority index. For example, the second priority index of the second PUCCH transmission may be opposite/complementary of the first priority index of the first PUCCH transmission, wherein the DCI may indicate the first priority index.

In an example, the wireless device may not expect to receive a multi-PDSCH scheduling DCI, scheduling PDSCHs with different priority indexes and triggering a single PUCCH transmission.

One or more embodiments presented above may apply to both uplink and downlink, e.g., multi-PxSCH scheduling. For example, one or more embodiments may apply to multi-PUSCH scheduling in the uplink.

In an example, a DCI scheduling multiple PUSCHs may indicate priority information associated with the multiple PUSCHs. For example, the DCI scheduling multiple PUSCHs may comprise a field, e.g., priority indicator field, indicating one or more priority indexes for/associated with the multiple PUSCHs. For example, the priority indicator field may indicate priority indexes for each of the multiple PUSCHs.

A priority index may indicate whether the associated PUSCH is of a first priority and/or of a second priority. For example, the priority index may comprise a first value (e.g., 0) indicating a first priority (e.g., low). The priority index may comprise a second value (e.g., 1) indicating a second priority (e.g., high).

For example, the priority indicator field may be a bitmap. The wireless device may determine a size/length of the bitmap based on the (maximum) number of the multiple PUSCHs scheduled by the DCI. For example, the size/length of the bitmap may be equal to the (maximum) number of the multiple PUSCHs scheduled by the DCI. For example, the size/length of the bitmap may be equal to half the (maximum) number of the multiple PUSCHs scheduled by the DCI. Each bit of the bitmap may correspond to at least one of the multiple PUSCHs. For example, a first bit may indicate a priority index of a first PUSCH of the multiple PUSCHs. For example, the first bit may indicate the priority index of the first PUSCH and a second PUSCH of the multiple PUSCHs. For example, the first PUSCH and the second PUSCH may be in a same slot (e.g., for two or more spatial filters/layers). For example, the first PUSCH and the second PUSCH may be consecutive PUSCHs. For example, the wireless device may map the bits of the bitmap, e.g., from MSB to LSB, to consecutive PUSCHs in an increasing order of time. For example, the wireless device may map the bits of the bitmap, e.g., from MSB to LSB, to PUSCHs in an increasing order of spatial layer, followed by frequency, followed by time. For example, the wireless device may map the bits of the bitmap, e.g., from MSB to LSB, to PUSCHs in an increasing order of frequency, followed by spatial layer, followed by time. For example, the wireless device may map the bits of the bitmap, e.g., from MSB to LSB, to PUSCHs in an increasing order of time, followed by spatial layer, followed by frequency. For example, the wireless device may map the bits of the bitmap, e.g., from MSB to LSB, to PUSCHs in an increasing order of spatial layer, followed by time, followed by frequency.

Figure 29:
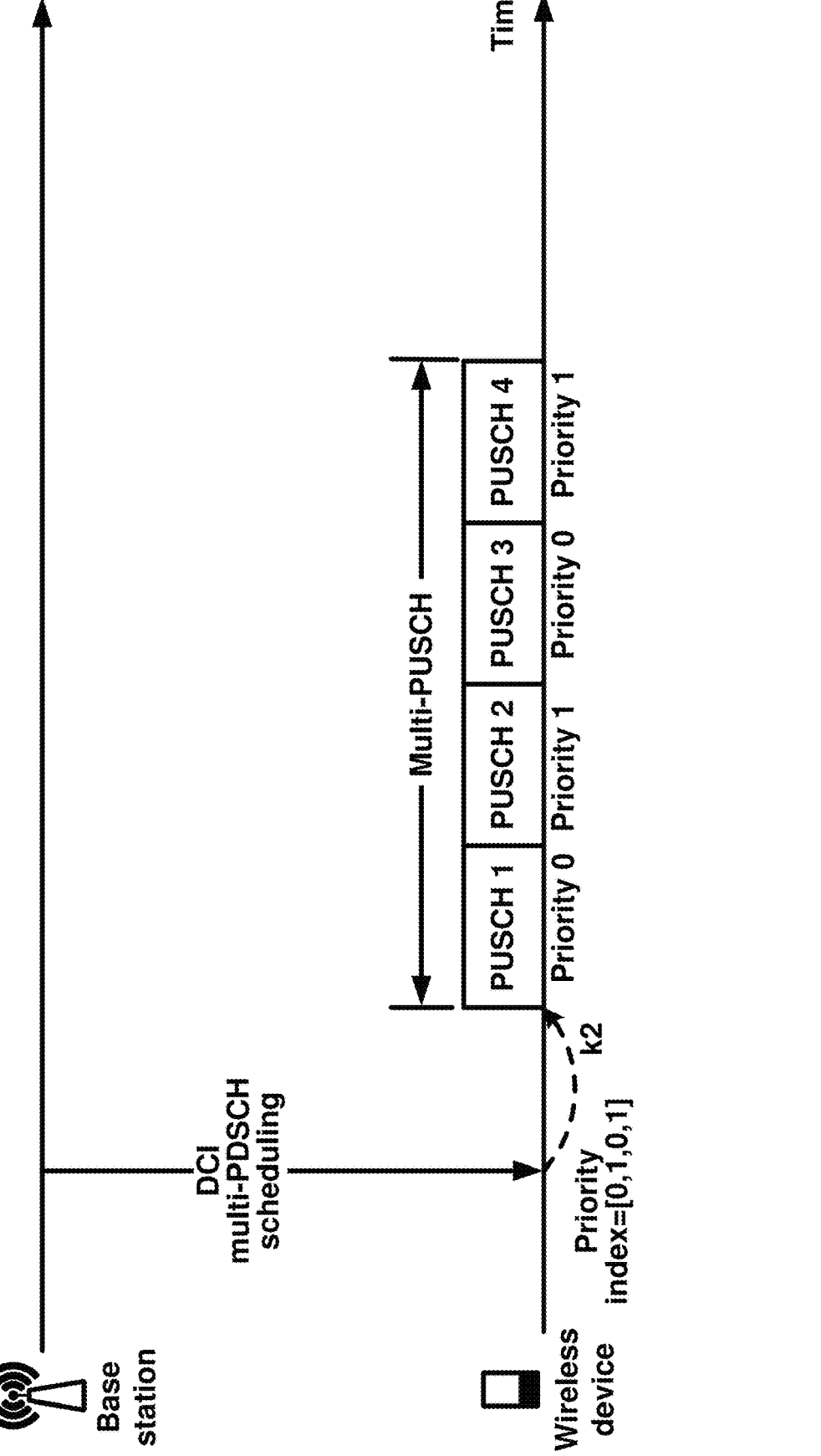
FIG. 29 shows an example of priority indication for multiple PUSCH scheduling by a single DCI, according to some embodiments.

FIG. 29 shows an example of priority index indication for multi-PUSCH scheduling, according to some embodiments. As shown in the figure, the multi-PUSCH scheduling DCI may comprise a priority indicator field. The priority indicator field may indicate a bitmap indicating priority indexes of the multiple PUSCHs. In an example, the bits of the bitmap are sequentially mapped to PUSCHs in an increasing order of time ($1^{st}$ bit (0) to PUSCH1, $2^{nd}$ bit (1) to PUSCH2, $3^{rd}$ bit (0) to PUSCH3, and last bit (1) to PUSCH4).

In an example, the DCI may comprise at least one field indicating one or more PUSCHs, of the multiple PUSCHs, that are of a first priority index (e.g., priority index 1, high priority). For example, the at least one field may indicate the PUSCH indexes, numbered in an increasing order of time/frequency/spatial layer. The wireless device may determine that the one or more PUSCHs are of the first priority index based on the at least one field. The wireless device may determine that one or more second PUSCHs, of the multiple PUSCHs, are of the second priority index, wherein the one or more second PUSCHs are the remainder of the multiple PUSCHs excluding the one or more first PUSCHs.

For example, if a priority index is not indicated by the multi-PUSCH scheduling DCI for a PUSCH of the multiple PUSCHs, the wireless device determines/assumes that the PUSCH is of a second priority index (e.g., priority index 0, low priority).

In an example, the wireless device may determine that a first portion/subset of the multiple PUSCHs scheduled by a DCI are of a first priority. The wireless device may determine that a second portion/subset (different from the first portion) of the multiple PUSCHs scheduled by the DCI are of a second priority. For example, the first/second portion/subset of the PUSCHs may be pre-defined, e.g., first/second half. For example, the first/second portion/subset of the PUSCHs may be first/last M PUSCHs of the multiple PUSCHs, wherein M may pre-defined and/or pre-configured. For example, the first/second portion/subset of PUSCHs may comprise consecutive PUSCHs. For example, the first/second portion/subset of PUSCHs may comprise non-consecutive PUSCHs, e.g., alternative slots/PUSCHs.

The wireless device may receive an RRC message comprising configuration parameters that indicate/define the first and/or second portion/subsection of the multiple PUSCHs scheduled by a DCI. The configuration parameters may indicate TDRA for multiple PUSCHs. The configuration parameters may indicate HARQ processes. For example, one or more first HARQ processes configured by RRC may be associated with the first portion/subset of PUSCHs scheduled by the DCI. For example, one or more second HARQ processes configured by RRC may be associated with the second portion/subset of PUSCHs scheduled by the DCI.

The multi-PUSCH scheduling DCI may comprise a priority indicator field (e.g., one bit), indicating the priority index of the first portion/subset of PUSCHs. The priority index of the second portion/subset of PUSCHs may be pre-defined and/or pre-configured. The DCI may comprise a priority indicator field (e.g., one bit), indicating the priority index of the second portion/subset of PUSCHs. The DCI may comprise a priority indicator field (e.g., two bits), indicating the priority index of the first and the second portion/subset of PUSCHs, e.g., each bit of the priority indicator field may correspond to each portion/subset of the PUSCHs. For example, a first bit(s) of the priority indicator field may indicate priority index(es) of first portion/subset of PUSCHs. For example, a second bit(s) of the priority indicator field may indicate priority index(es) of second portion/subset of PUSCHs.

In an example, a DCI scheduling multiple PUSCHs may indicate priority information associated with the multiple PUSCHs. For example, the DCI scheduling multiple PUSCHs may comprise at least one field indicating one or more priority indexes for/associated with the multiple PUSCHs. For example, the at least one field may indicate priority indexes for each of the multiple PUSCHs (e.g., implicitly).

For example, the time domain resource assignment (TDRA) field in the DCI may indicate the priority index of each of the multiple PUSCHs. For example, the RRC configuration parameters of PUSCH may configure/indicate a TDRA table, wherein each row of the TDRA table indicates symbols (starting symbol and/or symbol duration) of each of the multiple PUSCHs. The TDRA table may indicate a priority index for each of the multiple PUSCHs. For example, the priority index (same as SLIV) may be built in/comprised in the TDRA table.

For example, the TDRA table/list configured by RRC may indicate which of the multiple PUSCHs indicated by a row of the table (to which the DCI TDRA field points to) may be of higher/lower priority (e.g., of priority index 1 or 0). The wireless device may determine a size of the priority indicator field of the DCI based on the configured TDRA table.

For example, the DCI scheduling multiple PUSCHs may comprise at least one field indicating one or more priority indexes for/associated with the multiple PUSCHs. The at least one field may indicate priority indexes for each of the multiple PUSCHs (e.g., implicitly). In an example, the at least one field may comprise a HARQ process number/id. The wireless device may determine a HARQ process number for each of the multiple PUSCHs. In an example, a first HARQ process may be associated with a first priority (e.g., a first priority index). For example, wireless device may receive an RRC message comprising configuration parameters indicating a number of (UL) HARQ process. For example, the configuration parameters may indicate one or more first HARQ processes to be of a first priority, and/or one or more second HARQ processes to be of a second priority. For example, the wireless device may determine the one or more first/second HARQ processes based on a rule. For example, the one or more first HARQ processes may comprise a first half/portion/subset of the HARQ processes. For example, the one or more second HARQ processes may comprise a second half/portion/subset of the HARQ processes.

The wireless device may determine priority index of each of the multiple PUSCHs scheduled by a DCI based on at least one field in the DCI. In an example, the at least one field may comprise the FDRA and/or NDI and/or RV and/or HARQ process number and/or DMRS sequence and/or channel access and/or combination thereof. For example, RRC configuration parameters may configure/indicate association between one or more of the above information/parameters/fields and priority indexes (e.g., similar to TDRA and/or HARQ processes described above). In an example, the association between the information/field/parameter and the priority indexes may be pre-defined.

73

What is claimed is:

1. A wireless device comprising:
one or more processors; and
memory storing instructions that, when executed by the one or more processors, cause the wireless device to:
  receive a downlink control information (DCI) indicating:
    time resources for receiving a plurality of physical downlink shared channels (PDSCHs) across slots in a cell;
    a first priority index; and
    a first physical uplink control channel (PUCCH) for transmitting feedback information of PDSCHs associated with the first priority index;
  determine, based on a time resource of each PDSCH of the plurality of PDSCHs, that:
    one or more first PDSCHs of the plurality of PDSCHs are associated with the first priority index; and
    one or more second PDSCHs of the plurality of PDSCHs are associated with a second priority index;
  transmit, based on the first priority index, first feedback information of the one or more first PDSCHs via the first PUCCH of the first priority index; and
  transmit, based on the second priority index, second feedback information of the one or more second PDSCHs via a second PUCCH of the second priority index.

2. The wireless device of claim 1, wherein the DCI comprises a priority indicator field with a value indicating the first priority index.

3. The wireless device of claim 2, wherein the priority indicator field indicates a number of priority indexes that is less than a number of the plurality of PDSCHs.

4. The wireless device of claim 1, wherein the one or more second PDSCHs are different from the one or more first PDSCHs.

5. The wireless device of claim 1, wherein the one or more second PDSCHs are determined as being the plurality of PDSCHs excluding the one or more first PDSCHs.

6. The wireless device of claim 1, wherein the second priority index is absent from the DCI.

7. The wireless device of claim 1, wherein the DCI further indicates the second priority index.

8. The wireless device of claim 1, wherein the DCI comprises a priority indicator field with a second value indicating the second priority index.

9. A base station comprising:
one or more processors; and
memory storing instructions that, when executed by the one or more processors, cause the base station to:
  transmit, to a wireless device, a downlink control information (DCI) indicating:
    time resources for receiving a plurality of physical downlink shared channels (PDSCHs) across slots in a cell;
    a first priority index; and
    a first physical uplink control channel (PUCCH) for transmitting feedback information of PDSCHs associated with the first priority index;
  determine, for the wireless device and based on a time resource of each PDSCH of the plurality of PDSCHs, that:
    one or more first PDSCHs of the plurality of PDSCHs are associated with the first priority index; and

one or more second PDSCHs of the plurality of PDSCHs are associated with a second priority index:
  receive, from the wireless device and based on the first priority index, first feedback information of the one or more first PDSCHs via the first PUCCH of the first priority index; and
  receive, from the wireless device and based on the second priority index, second feedback information of the one or more second PDSCHs via a second PUCCH of the second priority index.

10. The base station of claim 9, wherein the DCI comprises a priority indicator field with a value indicating the first priority index.

11. The base station of claim 10, wherein the priority indicator field indicates a number of priority indexes that is less than a number of the plurality of PDSCHs.

12. The base station of claim 9, wherein the one or more second PDSCHs are different from the one or more first PDSCHs.

13. The base station of claim 9, wherein the second priority index is absent from the DCI.

14. The base station of claim 9, wherein the DCI further indicates the second priority index.

15. A non-transitory computer-readable medium comprising instructions that, when executed by one or more processors, cause the one or more processors to:
  receive a downlink control information (DCI) indicating:
    time resources for receiving a plurality of physical downlink shared channels (PDSCHs) across slots in a cell;
    a first priority index; and
    a first physical uplink control channel (PUCCH) for transmitting feedback information of PDSCHs associated with the first priority index;
  determine, based on a time resource of each PDSCH of the plurality of PDSCHs, that:
    one or more first PDSCHs of the plurality of PDSCHs are associated with the first priority index; and
    one or more second PDSCHs of the plurality of PDSCHs are associated with a second priority index;
  transmit, based on the first priority index, first feedback information of the one or more first PDSCHs via the first PUCCH of the first priority index; and
  transmit, based on the second priority index, second feedback information of the one or more second PDSCHs via a second PUCCH of the second priority index.

16. The non-transitory computer-readable medium of claim 15, wherein the DCI comprises a priority indicator field with a value indicating the first priority index.

17. The non-transitory computer-readable medium of claim 16, wherein the priority indicator field indicates a number of priority indexes that is less than a number of the plurality of PDSCHs.

18. The non-transitory computer-readable medium of claim 15, wherein the one or more second PDSCHs are different from the one or more first PDSCHs.

19. The non-transitory computer-readable medium of claim 15, wherein the one or more second PDSCHs are determined as being the plurality of PDSCHs excluding the one or more first PDSCHs.

20. The non-transitory computer-readable medium of claim 15, wherein the DCI further indicates the second priority index.

* * * * *